United States Patent
Xu

(10) Patent No.: US 9,983,492 B2
(45) Date of Patent: May 29, 2018

(54) CONTINUOUS REACTION APPARATUS AND APPARATUS FOR PRODUCING A TONER

(71) Applicant: MITSUBISHI CHEMICAL CORPORATION, Chiyoda-ku (JP)

(72) Inventor: Yuqing Xu, Joetsu (JP)

(73) Assignee: MITSUBISHI CHEMICAL CORPORATION, Chiyoda-ku (JP)

(*) Notice: Subject to any disclaimer, the term of this patent is extended or adjusted under 35 U.S.C. 154(b) by 0 days. days.

(21) Appl. No.: 15/368,034

(22) Filed: Dec. 2, 2016

(65) Prior Publication Data
US 2017/0153561 A1 Jun. 1, 2017

Related U.S. Application Data

(63) Continuation of application No. PCT/JP2015/065931, filed on Jun. 2, 2015.

(30) Foreign Application Priority Data

Jun. 4, 2014 (JP) .................................. 2014-115847
Jun. 27, 2014 (JP) .................................. 2014-132065

(51) Int. Cl.
*G03G 9/08* (2006.01)
*B01J 8/10* (2006.01)
(Continued)

(52) U.S. Cl.
CPC .......... *G03G 9/081* (2013.01); *B01F 7/00466* (2013.01); *B01F 7/00633* (2013.01);
(Continued)

(58) Field of Classification Search
CPC .......... B01J 2/04; B01J 2/06; B01J 2/08; B01J 2/10; B01J 2/12; B01J 8/10; B01J 8/20;
(Continued)

(56) References Cited

U.S. PATENT DOCUMENTS 3,212,859 A * 10/1965 Mitacek ............... B01F 1/0011
261/84
2001/0004975 A1 6/2001 Nakao et al.
(Continued)

FOREIGN PATENT DOCUMENTS

EP 0 434 124 A1 6/1991
JP 50-77876 7/1975
(Continued)

OTHER PUBLICATIONS

International Search Report dated Sep. 1, 2015 in PCT/JP2015/065931, filed on Jun. 2, 2015.

*Primary Examiner* — Lessanework Seifu
(74) *Attorney, Agent, or Firm* — Oblon, McClelland, Maier & Neustadt, L.L.P.

(57) ABSTRACT

Provided is a continuous reaction apparatus which can precisely control the path of flow of the liquid reaction mixture in the reaction vessel. Further, provided is a continuous reaction apparatus which can efficiently mix the liquid reaction mixture in the reaction vessel. The continuous reaction apparatus comprises a plurality of mixing vessel units and a plurality of partition units. These units are connected in the state of being alternately stacked on one another. Each mixing vessel unit has an agitating blade disposed in the inner space thereof. The relationship between the inner diameter D1 of the mixing vessel unit, the height H of the mixing vessel unit, and the outer diameter d1 of the agitating blade satisfies the formula (1): $10 \geq (D1/H) \geq 1.5$, and the formula (2): $0.99 \geq (d1/D1) \geq 0.7$. The agitating blade is a circular disc-type agitating blade.

17 Claims, 34 Drawing Sheets

(51) Int. Cl.
    *B01J 8/20* (2006.01)
    *B01J 19/18* (2006.01)
    *B01F 7/26* (2006.01)
    *B01F 7/00* (2006.01)
    *B01F 15/06* (2006.01)
    *B01J 2/12* (2006.01)
    *B01J 2/10* (2006.01)

(52) U.S. Cl.
    CPC .............. *B01F 7/26* (2013.01); *B01F 15/068* (2013.01); *B01J 2/10* (2013.01); *B01J 2/12* (2013.01); *B01J 8/10* (2013.01); *B01J 8/20* (2013.01); *B01J 19/1862* (2013.01); *B01F 2015/062* (2013.01); *B01F 2215/0059* (2013.01)

(58) Field of Classification Search
    CPC ... B01J 19/1862; G03G 9/081; G03G 9/0806; B01F 7/00466; B01F 7/00458; B01F 7/00633; B01F 7/00641
    USPC .......................................................... 422/225
    See application file for complete search history.

(56) References Cited

U.S. PATENT DOCUMENTS

| | | |
|---|---|---|
| 2006/0286478 A1 | 12/2006 | Chung et al. |
| 2012/0021351 A1 | 1/2012 | Mang et al. |
| 2012/0183898 A1 | 7/2012 | Faucher et al. |
| 2012/0208122 A1 | 8/2012 | Faucher et al. |
| 2012/0208123 A1 | 8/2012 | Faucher et al. |

FOREIGN PATENT DOCUMENTS

| | | |
|---|---|---|
| JP | 59-196733 | 11/1984 |
| JP | 4-271828 | 9/1992 |
| JP | 2001-107059 | 4/2001 |
| JP | 2001-205077 | 7/2001 |
| JP | 2001-239140 | 9/2001 |
| JP | 2003-316074 | 11/2003 |
| JP | 2003-316075 | 11/2003 |
| JP | 2006-350340 | 12/2006 |
| JP | 2007-156244 | 6/2007 |
| JP | 2008-069266 | 3/2008 |
| JP | 2012-27466 | 2/2012 |
| JP | 2012-148274 | 8/2012 |
| JP | 2012-166191 | 9/2012 |
| JP | 2013-56322 | 3/2013 |

\* cited by examiner

CONTINUOUS REACTION APPARATUS AND APPARATUS FOR PRODUCING A TONER

FIELD OF THE INVENTION

The present invention relates to a continuous reaction apparatus and an apparatus for producing a toner.

BACKGROUND ART

A toner for electrostatic image development is used in, for example, a printer, a copying machine, and a facsimile machine. The toner for electrostatic image development is used in the image formation for imaging an electrostatic image. For example, in the image formation by an electrophotographic method, an electrostatic latent image is first formed on a photosensitive drum. Then, the electrostatic latent image is developed using a toner. Subsequently, the developed image is transferred to, for example, transfer paper, and the image is fixed by heat.

Generally, a toner for electrostatic image development is produced as follows.

A binder resin and a colorant are first dry-mixed together. If necessary, into the resultant mixture are further dry-mixed, for example, a charge control agent, a release agent, and a magnetic material. Then, the resultant mixture is melt-kneaded by means of, for example, an extruder, followed by pulverization and classification. Thus, toner particles are obtained. Such a method for producing toner particles is called a melt-kneading pulverization method. An external additive is added to the toner particles obtained by this method for the purpose of imparting to the particles various performances, such as fluidity. For example, solid fine particles of, e.g., silica are added as an external additive. Consequently, the external additive is deposited on the surface of the toner particles.

In recent years, demands have been made on images formed by a copying machine or a printer wherein the images should have higher resolution. For meeting such demands, toner particles having a narrow particle size distribution are needed. However, in the above-mentioned melt-kneading pulverization method, it is difficult to control the particle diameter of the toner particles produced. Further, a great amount of coarse powder and fine powder having a particle diameter outside the desired range are by-produced. Therefore, the method poses a problem in that by-products having a particle diameter outside the desired range must be removed by classification.

As a method for solving the above-mentioned problems, a suspension polymerization method and an emulsion polymerization flocculation method are known.

In the suspension polymerization method, a polymerizable monomer, a polymerization initiator, and a colorant and others are suspended or dispersed in an aqueous medium. Then, these components are polymerized to produce toner particles.

In the emulsion polymerization flocculation method, a polymerizable monomer is added to an aqueous medium containing a polymerization initiator and an emulsifying agent, and the resultant mixture is emulsified. A colorant and, if necessary, a charge control agent and others are added to the polymer primary particle emulsion obtained by polymerizing the polymerizable monomer, thus causing the polymer primary particles to suffer flocculation. Then, the resultant flocculate particles are fused to produce toner particles.

These methods are called a polymerization method. The polymerization method is advantageous in that it is easy to control the particle diameter of the toner particles to be produced, and in that it is possible to produce a toner which has a small particle diameter and a narrow particle size distribution and which exhibits excellent image quality. Further, the polymerization method does not include a pulverization step, and therefore a binder resin having a low softening point can be used in the method. Thus, a toner having improved low-temperature fixing properties can be produced by the polymerization method.

On the other hand, the melt-kneading pulverization method is advantageous in that it is possible to continuously feed raw materials, so that a toner can be efficiently produced. Further, the kneading apparatus used in the method exhibits a high self-cleaning effect, and therefore the type of the toner to be produced can be switched merely by changing the type of the raw material fed, making it possible to continuously produce a toner.

In contrast, when a toner is produced by a polymerization method, such as a suspension polymerization method, an emulsion polymerization flocculation method, or a dissolution suspension method, the method of producing a toner in a batch-wise manner has been employed. By changing the method in a batch-wise manner to a method in a continuous manner, the production efficiency can be improved, and further products having uniform quality can be obtained if the production conditions are stable. For this reason, a technique for continuously producing a toner by the polymerization method is being developed.

For example, patent documents 1 and 2 disclose a method for continuously producing a toner by a suspension polymerization method. Also, with respect to the emulsion polymerization flocculation method having a number of production steps, studies have been made on the method of continuously performing the production steps. For example, patent document 3 discloses a method for continuously producing polymer primary fine particles of a latex. Patent documents 4 to 9 disclose an emulsion polymerization flocculation method in which a granulation step comprising a flocculation step and a fusion step is continuously performed.

A fluid inside the continuous reaction apparatus is subjected to reaction while flowing through the path of transfer. The transfer time for the fluid inside the apparatus and uniformly mixing the fluid being transferred are important. For example, in the granulation step in the emulsion (polymerization) flocculation method, for controlling the particle diameter and particle size distribution, it is necessary to strictly control the flocculation time for particles and to uniformly mix the liquid inside the apparatus.

Patent document 4 discloses a continuous producing apparatus in which the reaction mixture is agitated using a pin type blade or an anchor blade in a single reaction vessel having no partition. However, this apparatus is disadvantageous in that it is difficult to control the path of transfer of the reaction mixture in the reaction vessel. Further, the passing time of the reaction mixture is likely to be irregular. Therefore, it is difficult to strictly control the flocculate particle diameter.

Patent document 5 discloses a continuous producing apparatus in which the reaction mixture is mixed and dispersed in a single reaction vessel while transferring the reaction mixture using a screw. The transfer of the mixture using a screw is advantageously used for stably securing the path of transfer and passing time. However, the transfer using a screw has a poor mixing shearing effect. For this reason, for example, in the case of emulsion (polymerization) flocculation method, it is difficult to uniformly disperse a flocculate mixture having a certain viscosity. Further, the shearing force of the screw is small, and therefore it is difficult to precisely control the particle diameter of the flocculate particles.

Patent documents 6 and 9 disclose a continuous producing apparatus having a plurality of partitioned spaces in a single reaction vessel. Each space formed in this apparatus has an agitating blade therein. For realizing uniform mixing and reaction, this apparatus controls the path of transfer of the reaction mixture and the time during which the reaction mixture passes through the reaction vessel.

Patent documents 7 and 8 disclose a continuous producing apparatus having a plurality of reaction vessels having an agitating blade and being connected in series. In this apparatus, a plurality of reaction vessels are arranged, and hence the path of transfer of the reaction mixture can be selected freely to some extent. Therefore, by using this apparatus, a disadvantage of nonuniformity of the transfer time can be removed to some extent. However, for obtaining the intended reaction effect, a great number of reaction vessels are needed, leading to a problem in that the apparatus inevitably is complicated or increased in size. Further, when using this apparatus, it is expected that assembling of the apparatus, dealing with problems, and maintenance of the apparatus are difficult.

PRIOR ART REFERENCES

Patent Documents

Patent document 1: JP 2003-316074A
Patent document 2: JP 2003-316075A
Patent document 3: JP 2008-69266A
Patent document 4: JP 2007-156244A
Patent document 5: JP 2006-350340A
Patent document 6: JP 2012-27466A
Patent document 7: JP 2012-148274A
Patent document 8: JP 2012-166191A
Patent document 9: JP 2013-56322A

SUMMARY OF THE INVENTION

Problems to be Solved by the Invention

An object of the present invention is to provide a continuous reaction apparatus which can precisely control the path of flow of the liquid reaction mixture in the reaction vessel.

Another object of the present invention is to provide a continuous reaction apparatus which can efficiently mix the liquid reaction mixture in the reaction vessel.

Still another object of the present invention is to provide a continuous reaction apparatus having such a simple structure that the maintenance of the apparatus is easy.

Means for Solving the Problems

The present invention is as follows.

A continuous reaction apparatus comprises a plurality of mixing vessel units and partition units, the mixing vessel units and partition units being alternately stacked on one another, each mixing vessel unit having an agitating blade disposed in the inner space thereof,
wherein the relationship between the inner diameter D1 and height H of the mixing vessel unit and the outer diameter d1 of the agitating blade satisfies the following formulae (1) and (2):

$$10 \geq (D1/H) \geq 1.5 \quad (1)$$

$$0.99 \geq (d1/D1) \geq 0.7 \quad (2),$$

wherein the agitating blade is a circular disc-type agitating blade.

It is preferred that a fluid passage hole through which an agitation shaft of the agitation blade passes is formed in the center portion of the partition unit.

It is preferred that the circular disc-type agitating blade is a disc turbine, a blade turbine, or a disperser blade.

It is preferred that the relationship between the minimum inner diameter D2 of the size of the passage hole, the maximum inner diameter D1 of the mixing vessel units disposed on both sides of the partition unit, and the outer diameter d2 of the agitation shaft satisfies the following formulae (3) and (4):

$$0.1 \leq (D2/D1) \leq 0.5 \quad (3)$$

$$0.5 \leq (d2/D2) \leq 0.9 \quad (4).$$

It is preferred that the relationship between the minimum inner diameter D2 of the passage hole and the inner diameter D3 of the passage hole in the side of the partition unit positioned on the upstream side as viewed in the flow direction of a reaction mixture satisfies the following formula (5):

$$D3 \geq D2 \quad (5).$$

It is preferred that the agitation shaft is provided with a feed-assisting agitating blade located upstream of the position of the minimum inner diameter of the passage hole, as viewed in the flow direction of the reaction mixture,
wherein the relationship between the inner diameter D3 of the passage hole in the side of the partition unit positioned on the upstream side as viewed in the flow direction of the reaction mixture, the minimum inner diameter D2 of the passage hole, and the outer diameter d3 of the feed-assisting agitating blade satisfies the following formulae (6) and (7):

$$0.9D2 \leq d3 \leq D3 \quad (6)$$

$$0.5 \geq (((D2+D3)/2)-d3)/(d3-d2) \geq 0 \quad (7).$$

It is preferred that the continuous reaction apparatus comprises a partition unit for controlling the temperature of the reaction mixture.

It is preferred that the partition unit has a hollow structure inside thereof, and is capable of allowing a heat transfer medium having a temperature controlled to flow through the inside of the partition unit to control the temperature of the partition unit.

It is preferred that the partition unit has inside thereof an electrically heat generator and a temperature sensor for controlling the temperature.

It is preferred that the continuous reaction apparatus has a reagent feed pipe which passes through the inside of the partition unit from the outer wall of the partition unit to be connected to the inner wall of the passage hole.

It is preferred that the continuous reaction apparatus comprises a filtration partition unit, wherein the filtration partition unit has disposed on one side or both sides thereof a filter or filters capable of filtering a particle dispersion.

It is preferred that the continuous reaction apparatus has a plurality of the filtration partition units, and is capable of, while continuously feeding cleaning water from a cleaning water inlet formed in the mixing vessel unit, continuously subjecting the reaction mixture to filtration by the filtration partition units to clean the reaction mixture.

It is preferred that the continuous reaction apparatus has a flow rate controller for controlling the flow rates of the cleaning water and a filtrate.

The present invention is directed to a continuous reaction system comprising a plurality of continuous reaction apparatuses from any one of the above-mentioned continuous reaction apparatuses, wherein the continuous reaction apparatuses are connected in series.

The present invention is directed to a method for producing fine particles, wherein the method comprises the step of continuously producing fine particles by a wet process using any one of the above-mentioned continuous reaction apparatuses. It is preferred that the fine particles are toner particles.

The present invention is directed to an apparatus for producing a toner for electrostatic image development, having any one of the above-mentioned continuous reaction apparatuses, wherein the apparatus for producing a toner comprises:

a continuous mixing/dispersing section for continuously mixing raw material liquids;

a continuous flocculation section for continuously causing the resultant mixture to suffer flocculation to form flocculate particles;

a continuous fusion section for fusing the flocculate particles by heat to control the shape of particles, forming toner matrix particles;

a cleaning section for cleaning the dispersion of toner matrix particles;

a drying section for drying the toner matrix particles; and an external addition section for adding an external additive to the toner matrix particles to produce toner particles.

A continuous reaction apparatus comprises a cylindrical reaction vessel which reacts a reaction mixture while mixing the reaction mixture, the reaction vessel having formed in one end thereof an inlet for continuously feeding the reaction mixture, the reaction vessel having formed in another end thereof a withdrawal outlet for continuously withdrawing the reaction mixture, the reaction vessel having an agitating blade disposed inside thereof, the agitating blade comprising an agitation shaft and a plurality of circular disc-type agitating blades, wherein the circular disc-type agitating blades are fitted to the agitation shaft in a state that the circular disc-type agitating blades are stacked on one another, wherein each circular disc-type agitating blade comprises two types of blades which are a passage blade and a mixing blade, wherein the passage blade is a blade having a passage hole near a connecting portion to the agitation shaft, wherein the mixing blade is a blade having no passage hole near the connecting portion to the agitation shaft, wherein the passage blade and the mixing blade are alternately fitted to the agitation shaft.

In the continuous reaction apparatus, when the outer diameter of the agitation shaft is taken as $d1$ and the outer diameter of the circular disc of the passage blade is taken as $d31$, the one or more passage holes are present inside the region of a circle having a radius of $(d1+d31)/4$ from the center of the passage blade.

In the continuous reaction apparatus, the passage blade has a circular disc, the circular disc having a flow control-assisting fin in a plate form disposed at the outer periphery portion of the circular disc, wherein the flow control-assisting fin is located inside the outer periphery edge portion of the circular disc, wherein, when the outer diameter of the agitation shaft is taken as $d1$ and the outer diameter of the circular disc is taken as $d31$, the flow control-assisting fin is located outside the region of a circle having a radius of $(d1+d31)/4$ from the center of the circular disc, wherein the four or more flow control-assisting fins are disposed on the circular disc and the intervals between the flow control-assisting fins are equal, wherein an angle $\alpha 31$ of the flow control-assisting fin to the circular disc is 45 to 90°.

In the continuous reaction apparatus, the passage blade has a circular disc, the circular disc having a flow control-assisting fin in a plate form disposed at the outer periphery portion of the circular disc, wherein an angle $\alpha 32$ of the flow control-assisting fin to a segment of a line connecting the center of the agitation shaft and the center of the flow control-assisting fin is 0 to 90°.

In the continuous reaction apparatus, the mixing blade is a disc turbine, a blade turbine, or a disperser.

In the continuous reaction apparatus, the reaction vessel is in a shape of straight cylinder having the same inner diameter from the upper end to the lower end, or in a shape of cylinder having a plurality of ring structures in which the inner wall surface expands outwards, wherein, when the minimum inner diameter of the reaction vessel is taken as $D1$ and the maximum inner diameter of the reaction vessel is taken as $D2$, the relationship of the following formula (1) is satisfied:

$$D2 \geq D1 \geq 0.8D2 \quad (1).$$

In the continuous reaction apparatus, when the minimum inner diameter of the reaction vessel is taken as $D1$, the maximum inner diameter of the reaction vessel is taken as $D2$, the outer diameter of the passage blade is taken as $d31$, and the outer diameter of the mixing blade is taken as $d21$, the relationship of the following formulae (2), (3), and (4) is satisfied:

$$0.99D1 \geq d31 \geq 0.8D1 \quad (2)$$

$$0.99D2 \geq d21 \geq 0.7D2 \quad (3)$$

$$d31 \geq d21 \quad (4).$$

In the continuous reaction apparatus, the reaction vessel is in a shape of cylinder having a plurality of ring structures in which the inner wall surface expands outwards, wherein the passage blade is located in a position at the same height as the height of the portion of the reaction vessel having the minimum inner diameter.

In the continuous reaction apparatus, the reaction vessel has a plurality of mixing vessel units having a jacket structure, wherein the mixing vessel units are arranged in series.

In the continuous reaction apparatus, the reaction vessel comprises a plurality of inlets for feeding a liquid, and the inlets are formed in the side wall of the reaction vessel.

A continuous granulation system comprises a plurality of continuous reaction apparatuses from any one of the above-mentioned continuous reaction apparatuses, wherein the continuous reaction apparatuses are connected in series.

A method for producing a toner comprises the step of continuously producing toner particles by a wet process using any one of the above-mentioned continuous reaction apparatuses.

An apparatus for producing a toner comprises any one of the above-mentioned continuous reaction apparatuses.

An apparatus for producing a toner for electrostatic image development comprises:

a continuous mixing/dispersing section for continuously mixing raw material liquids;

a continuous flocculation section for continuously causing the resultant mixture to suffer flocculation to form flocculate particles;

a continuous fusion section for fusing the surface of the flocculate particles by heat to control the shape of particles, forming toner particles;

a cleaning section for cleaning the dispersion of toner matrix particles;

a drying section for drying the toner matrix particles;

an external addition section for adding an external additive to the toner matrix particles to produce toner particles; and any one of the above-mentioned continuous reaction apparatuses.

Effects of the Invention

According to the present invention, there can be provided a continuous reaction apparatus which can precisely control the path of flow of the liquid reaction mixture in the reaction vessel. According to the present invention, there can be provided a continuous reaction apparatus which can efficiently mix the liquid reaction mixture in the reaction vessel. According to the present invention, there can be provided a continuous reaction apparatus having such a simple structure that the maintenance of the apparatus is easy.

MODE FOR CARRYING OUT THE INVENTION

First Embodiment of the Present Invention

Hereinbelow, the continuous reaction apparatus of the present invention will be described in detail.

Figure 1:
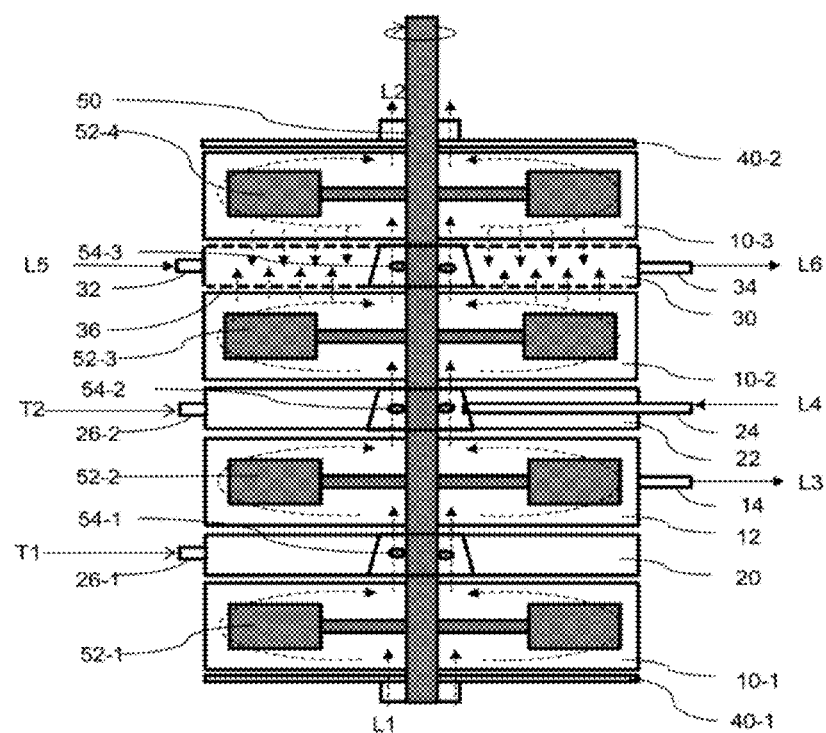
FIG. 1 A cross-sectional view of the continuous reaction apparatus.

FIG. 1 is a vertical cross-sectional view of the continuous reaction apparatus of the present invention.

Figure 2:
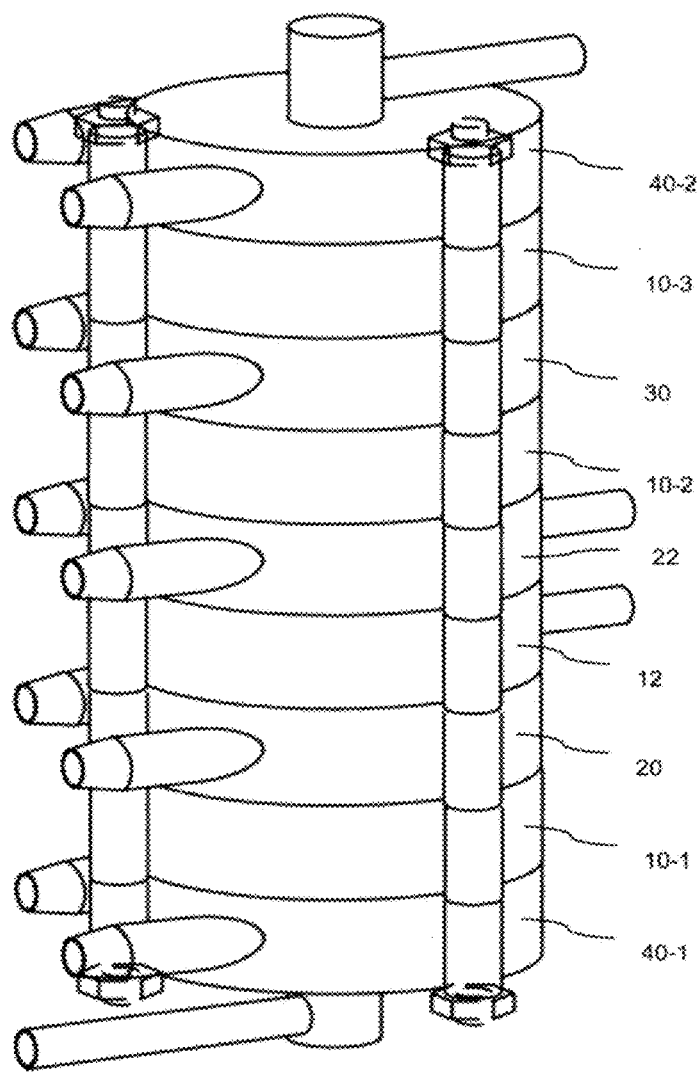
FIG. 2 A perspective view of the continuous reaction apparatus.

FIG. 2 is a perspective view of the continuous reaction apparatus of the present invention.

Figure 3:
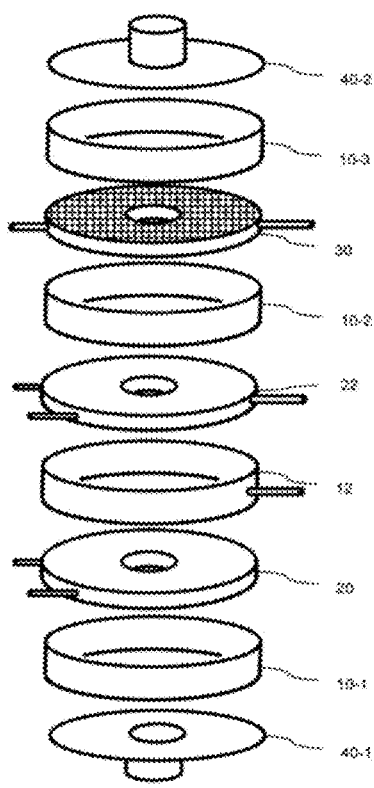
FIG. 3 An exploded perspective view of the continuous reaction apparatus.

FIG. 3 is an exploded perspective view of the continuous reaction apparatus of the present invention.

Figure 4:
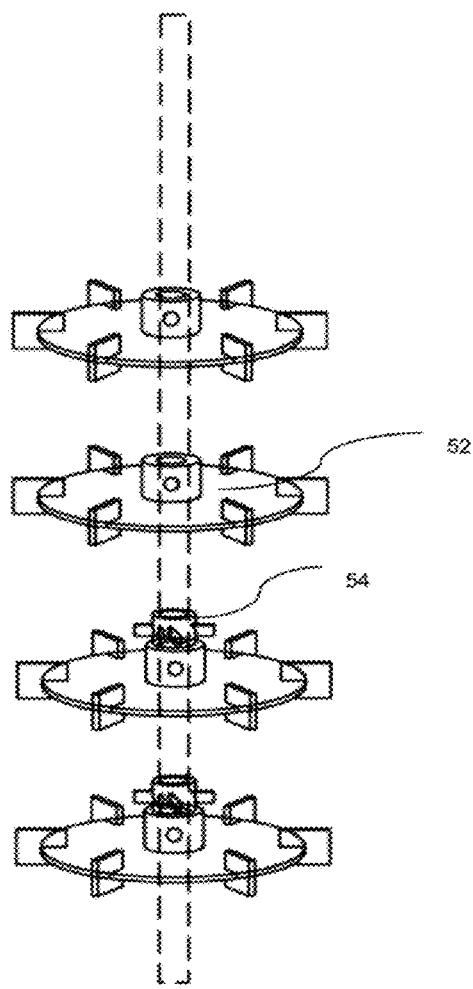
FIG. 4 A perspective view of the agitating blade for continuous reaction apparatus.

FIG. 4 is a perspective view of the agitating blade used in the continuous reaction apparatus of the present invention.

Figure 5:
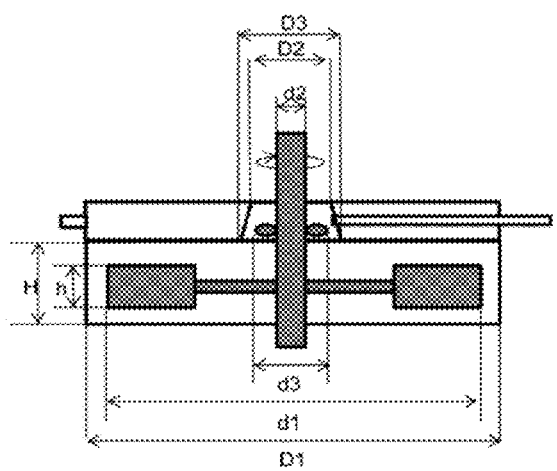
FIG. 5 A cross-sectional view of the mixing vessel unit and partition unit.

FIG. 5 is a cross-sectional view of the partition unit and mixing vessel unit used in the continuous reaction apparatus of the present invention.

Figure 6:
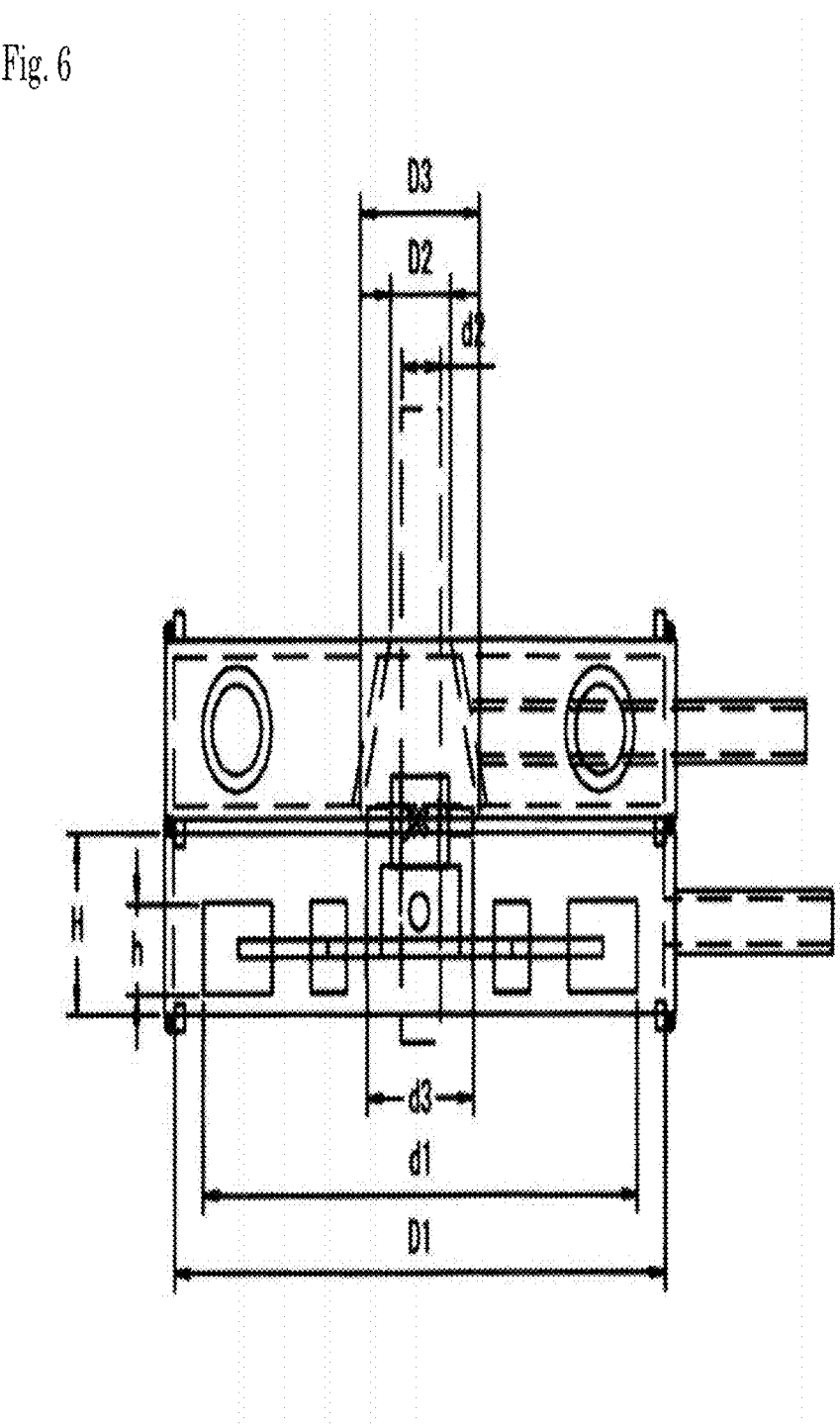
FIG. 6 A detailed cross-sectional view of the mixing vessel unit and partition unit.

FIG. 6 is a detailed cross-sectional view of the partition unit and mixing vessel unit used in the continuous reaction apparatus of the present invention.

As shown in FIGS. 1 to 3, the continuous reaction apparatus of the present invention has a construction in which a plurality of mixing vessel units and a plurality of partition units are stacked on one another. The mixing vessel units and the partition units individually have a plurality of types. The mixing vessel units and partition units have different functions for the respective types. The mixing vessel units and partition units of the same type may be alternately stacked on one another. The mixing vessel units and partition units having different functions may be alternately stacked on one another according to the purpose.

The mixing vessel unit is described in detail below.

With respect to the form of the mixing vessel unit in the present invention, there is no particular limitation. As the mixing vessel unit in the present invention, for example, a general vessel for stirring or mixing can be used. Especially, a cylindrical mixing vessel is preferred. In the present invention, the temperature of a reaction mixture can be controlled by the below-mentioned partition unit. As an auxiliary for the partition unit, a cylindrical vessel having a jacket capable of flowing therethrough a heat transfer medium having a controlled temperature may be used. A heat insulating material may be wrapped around the outer wall of the mixing vessel unit.

It is preferred that inner diameter D1 of the mixing vessel unit, height H of the inner space, and outer diameter d1 of the disc agitating blade satisfy the following formulae (1) and (2). That is, the mixing vessel unit is preferably of a flattened type.

$$10 \geq (D1/H) \geq 1.5 \quad (1)$$

$$0.99 \geq (d1/D1) \geq 0.7 \quad (2)$$

By using the flattened-type mixing vessel unit and the below-mentioned disc type agitating blade in combination, it is easy to control the path of flow of the reaction mixture. By disposing the partition units having a temperature controlling function on both sides of the mixing vessel unit, not only can a large heat-exchange area be secured, but also the temperature of the reaction mixture can be more precisely controlled.

With respect to the type of the mixing vessel unit, there are general mixing vessel unit 10 and sampling mixing vessel unit 12 for feeding a reagent or for sampling.

Sampling mixing vessel unit 12 has sampling port 14 for feeding a reagent, or for sampling the reaction mixture in the mixing vessel. Sampling port 14 is formed in the cylindrical outer wall of the mixing vessel unit. Sampling port 14 is formed at around the center of the height of the mixing vessel unit. With respect to the number of sampling port 14, one sampling port may be formed per mixing vessel unit, but, if necessary, a plurality of sampling ports may be formed per mixing vessel unit.

Each mixing vessel unit has agitating blade 52 disposed therein. For controlling the path of flow of the reaction mixture, agitating blade 52 is preferably of a circular disc type. The reaction mixture enters inside of the mixing vessel unit from near an agitation shaft and flows along both surfaces of the circular disc-type agitating blade, and then flows the outer periphery portion of the circular disc-type agitating blade. By virtue of this, short-pass is unlikely to occur in the path of flow of the reaction mixture. In addition, a more stable and long path of flow can be secured.

For improving the mixing effect of the circular disc-type agitating blade, it is preferred that the circular disc-type agitating blade is provided with a mix-assisting fin at the end of the blade. As a mix-assisting fin, for example, a disc turbine of a circular disc structure having a high shearing force, a curved disc turbine, a blade turbine, or a disperser blade can be used. With respect to height h of the mix-assisting fin, there is no particular limitation. It is preferred that the relationship between height h of the mix-assisting fin and height H of the inner space of the mixing vessel unit satisfies the following formula.

$$0.2H \leq h \leq 0.8H$$

When height h of the mix-assisting fin is larger than 0.8H, there is a danger that the flow of the reaction mixture is inhibited. Conversely, when height h of the mix-assisting fin is smaller than 0.2H, the shearing force and mixing effect of the mix-assisting fin are likely to become poor, causing nonuniform mixing and stagnation of the reaction mixture.

The partition unit is described in detail below.

The partition unit is disposed between the two mixing vessel units. The partition unit is a unit in a circular disc form having a satisfactory thickness. The circular disc has formed in the center portion thereof a passage hole for passing therethrough an agitation shaft and the reaction mixture.

It is preferred that the size of the passage hole formed in the center portion of the partition unit satisfies the formulae (3) and (4) below. In the formulae (3) and (4) below, the meanings of the characters are as follows.

Minimum inner diameter of the passage hole: D2

Maximum inner diameter of the mixing vessel units disposed on both sides of the partition unit: D1

Diameter of the agitation shaft: d2

$$0.1 \leq (D2/D1) \leq 0.5 \quad (3)$$

$$0.5 \leq (d2/D2) \leq 0.9 \quad (4)$$

When the passage hole is increased in size, the gap between the passage hole and the agitation shaft is increased, so that the passing speed of the reaction mixture is reduced. When the passing speed of the reaction mixture is reduced, back flow of the reaction mixture is likely to occur, causing the path of flow to be irregular. Conversely, when the gap between the passage hole and the agitation shaft is too small, the flow rate of the reaction mixture is reduced, leading to a problem of the occurrence of clogging.

The shape of the passage hole may be a cylinder or a truncated cone. When the shape of the passage hole is a cylinder, the inner diameters of the passage hole on both sides of the partition unit are the same. When the shape of the passage hole is a truncated cone, the inner diameters of the passage hole on both sides of the partition unit are different from each other.

When, as viewed in the passage direction of the reaction mixture as a flow direction, the inner diameter of the passage hole in the side of the partition unit positioned on the upstream side is larger than the inner diameter of the passage hole in the side of the partition unit positioned on the downstream side, an effect is obtained such that back flow of the reaction mixture is prevented. When back flow of the reaction mixture can be prevented, the direction of the flow is advantageously controlled. Therefore, it is preferred that the size of the passage hole satisfies the formula (5) below. In the formula (5) below, the meanings of the characters are as follows.

Inner diameter of the passage hole in the side of the partition unit positioned on the upstream side as viewed in the flow direction of the reaction mixture: D3

Minimum inner diameter of the passage hole: D2

$$D3 \geq D2 \quad (5)$$

With respect to the type of the partition unit, there are partition unit 20 capable of controlling a temperature, partition unit 22 capable of controlling a temperature and feeding a reagent, and partition unit 30 having a filtration function.

Partition unit 20 capable of controlling a temperature has a hollow structure. The temperature of the unit can be controlled using an electrically heat generator disposed inside of partition unit 20. Alternatively, the temperature of the unit can be controlled by flowing a heat transfer medium through the inside of partition unit 20 from inlet or outlet 26. A thermostatic chamber for controlling the temperature of a heat transfer medium (for example, warm water) can be placed outside of partition unit 20. Taking into consideration the space where the apparatus is placed, it is preferred to use an electrically heat generator. The reason for this is that the size of the partition unit can be reduced. Taking the accuracy of the temperature control into consideration, it is preferred to use a temperature controller using a heat transfer medium, such as warm water. In practice, according to the environment or conditions in which the apparatus is used, the partition units of the above two heating systems can be appropriately selected and used.

Partition unit 22 capable of feeding a reagent has the same structure as that of the above-mentioned partition unit 20 for temperature control. Partition unit 22 further has reagent feed pipe 24. Reagent feed pipe 24 passes from the outer wall of partition unit 22 through the space between the upper and lower sides of partition unit 22, and is connected to the inner wall of the passage hole formed in the center portion of partition unit 22.

A liquid reagent fed from the outside is passed through the inside of unit 22 via feed pipe 24. Then, the liquid reagent is passed through a hole formed in the inner wall of the passage hole, and mixed with the reaction mixture passing through the inside of the passage hole. Then, the liquid reagent is transferred to the next mixing vessel unit.

The temperature of the liquid reagent passing through the inside of partition unit 22 via feed pipe 24 can be adjusted to a temperature close to the temperature of the reaction mixture by a heat transfer medium flowing the inside of the unit or an electrically heat generator. Thus, the reaction mixture suffers a reduced change in temperature upon mixing the reaction mixture with the liquid reagent, making it possible to precisely control the reaction.

Partition unit 30 having a filtration function has a filter or filters disposed on one side or both sides of the partition unit. Filtrate withdrawal port 34 is formed in the outer wall of partition unit 30. The liquid component can be withdrawn from the reaction mixture in the reaction vessel unit by filtration under reduced pressure using a filter. The filtrate can be discharged out of the apparatus through filtrate withdrawal port 34. Conversely, water or a liquid reagent can be fed into the reaction vessel unit from filtrate withdrawal port 32 through a filter using partition unit 30 having a filtration function. By feeding water from filtrate withdrawal port 32, it is possible to clean the filter for filtration. With respect to the filter, there is no particular limitation, but filter cloth or a filter plate made of a ceramic may be used. By using partition unit 30 having a filtration function, the concentration of the particle component in the reaction mixture can be precisely controlled.

Further, a cleaning liquid can be fed from sampling port 14 formed in the outer wall of the mixing vessel unit, or feed pipe 24 disposed in the partition unit. While feeding the cleaning liquid, the concentration of the soluble component in the reaction mixture in the continuous reaction apparatus can be controlled using the filtration function of filtration partition unit 30.

Figure 7:
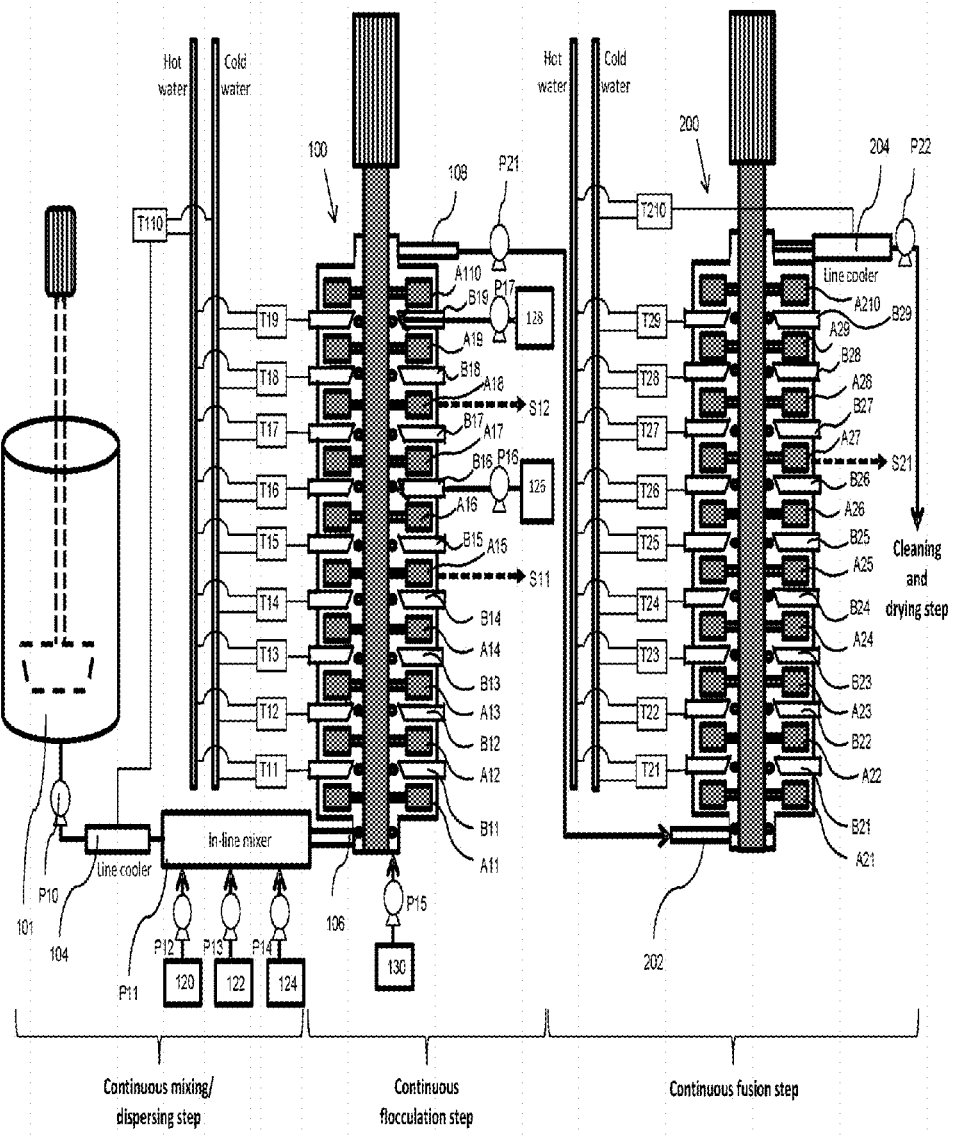
FIG. 7 A diagrammatic view of the continuous toner production apparatus.

As shown in FIGS. 5 to 7, a plurality of mixing vessel units having a cleaning water inlet and filtration partition units may be alternately stacked on one another. By connecting the mixing vessel units and filtration partition units in the state of being alternately stacked on one another, a continuous cleaning apparatus for cleaning can be constructed.

An agitation shaft penetrates the passage hole formed in the center portion of the partition unit. For promoting the flow of the reaction mixture near the passage hole, especially when the reaction mixture has a high viscosity, it is preferred that feed-assisting agitating blade 54 (54-1 to 54-3) having a feeding effect is disposed near the passage hole. It is preferred that feed-assisting agitating blade 54 is disposed at the position upstream of the height of the center of the passage hole. The expression "upstream" means upstream as viewed in the direction of flow of the reaction mixture, and this applies to the followings.

It is preferred that inner diameter D3 of the passage hole on the upstream side, minimum inner diameter D2 of the passage hole, and outer diameter d3 of the feed-assisting agitating blade satisfy the following formula (6) (see FIGS. 5 and 6).

$$0.9D2 \leq d3 \leq D3 \quad (6)$$

When outer diameter d3 of the feed-assisting agitating blade is larger than D3, the feed-assisting agitating blade is placed outside the passage hole. In this case, due to the limitation of the space for placing the blade, it may be difficult to place the feed-assisting agitating blade. Further, only part of the flow of the reaction mixture agitated by the feed-assisting agitating blade can pass through the passage hole, leading to a problem in that the path of flow of the reaction mixture becomes irregular. Therefore, outer diameter d3 of the feed-assisting agitating blade is preferably D3 or less.

Conversely, when outer diameter d3 of the feed-assisting agitating blade is smaller than 0.9D2, the feed-assisting agitating blade is small relative to the passage hole. In this case, the effect of promoting the flow of the reaction mixture by the feed-assisting agitating blade becomes poor.

Further, it is preferred that a distance between the end of the feed-assisting agitating blade and the wall of the passage hole satisfies the following formula (7).

$$0.5 \geq (((D2+D3)/2)-d3)/(d3-d2) \geq 0 \quad (7)$$

When the gap between the end of the feed-assisting agitating blade and the wall of the passage hole is too large relative to the size of the blade of the feed-assisting agitating blade, the feeding effect obtained by agitation becomes poor and, meanwhile, there is a fear that back flow occurs.

By using the feed-assisting agitating blade, the path of flow of the reaction mixture between the mixing vessel unit and another mixing vessel unit can be controlled. In addition, the force for transferring the reaction mixture through the passage hole can be increased. Further, when a reagent is fed to the passage hole from the reagent feed inlet, an effect can be effected such that mixing the fed reagent with the reaction mixture is promoted.

With respect to the type of the feed-assisting agitating blade, there is no particular limitation. As the feed-assisting agitating blade, for example, a propeller blade or a screw blade can be used.

The above-mentioned mixing vessel units, partition units, and agitating blades are stacked on one another. The units with the required number according to the purpose of use and the reaction time are stacked. Thus, an intended continuous reaction apparatus can be constructed.

The continuous reaction apparatus may be either of a vertical type or of a horizontal type.

When the apparatus is small in size, a vertical type is preferred because the area in which the apparatus is placed can be reduced.

With respect to the setting angle of the continuous reaction apparatus, the apparatus may slope at an angle in the range of from the right angle to 40 degrees to the horizontal.

When the apparatus is large in size, a horizontal type is preferred, taking the maintenance of the apparatus into consideration.

With respect to the flow direction of the reaction mixture, there is no particular limitation. However, when the apparatus is of a vertical type, it is preferred that the reaction mixture flows from the lower portion toward the upper portion.

With respect to the material for the continuous reaction apparatus of the present invention, there is no particular limitation.

The inner surface of the mixing vessel unit or the both surfaces of the partition unit are preferably substantially stainless steel and/or glass, except for those of a filter type. Particularly, the inner surface of the mixing vessel unit or the both surfaces of the partition unit are preferably smooth stainless steel and/or glass. The inner surface of the mixing vessel unit and the both surfaces of the partition unit are preferably the above-mentioned material. In this case, it is possible to prevent, for example, the reaction mixture fed or reaction product from depositing on the wall surface of the vessel.

Hereinbelow, the continuous reaction apparatus having a plurality of mixing vessel units and partition units having different functions and being alternately stacked on one another will be described in detail with reference to FIG. 1. Further, the functions of the individual mixing vessel units and partition units and the flow of the reaction mixture will be described in detail.

Reaction mixture L1 is fed by a feed pump from around the agitation shaft to the inside of first mixing vessel unit 10-1. The fed reaction mixture flows along the disc of disc turbine blade 52-1, and moves to the outer periphery portion of the inner space of the mixing vessel unit due to an action of centrifugal force. The reaction mixture which has moved to the outer periphery portion is agitated by disc turbine blade 52-1, and further moves through the upper portion of the inner space of the mixing vessel unit to around the agitation shaft. The temperature of partition unit 20 disposed on mixing vessel unit 10-1 is controlled by outer thermostatic chamber T1. The temperature of reaction mixture L1 is controlled by partition unit 20. Reaction mixture L1 is fed by feed-assisting agitating blade 54-1 to second mixing vessel unit 12 through the passage hole in the center portion of partition unit 20. The reaction mixture moves along the outer periphery of disc turbine blade 52-2 placed in second mixing vessel unit 12, and is transferred to around the passage hole of partition unit 22 disposed on second mixing vessel unit 12. The temperature of partition unit 22 is controlled by outer thermostatic chamber T2. Sample liquid L3 can be withdrawn through sampling port 14 formed in second mixing vessel unit 12. Physical properties of the reaction mixture (sample liquid L3) can be measured by an analysis apparatus. Based on the results of the measurement, the temperatures of outer thermostatic chambers T1, T2 can be controlled. Reagent L4 can be fed through reagent feed pipe 24 disposed at partition unit 22. The reaction mixture fed to around the passage hole and reagent L4 fed through reagent feed pipe 24 can be uniformly mixed near the passage hole of partition unit 22 by feed-assisting agitating blade 54-2. The reaction mixture mixed with reagent L4 by feed-assisting agitating blade 54-2 can be fed to third mixing vessel unit 10-2. The fed reaction mixture moves along the outer periphery of disc turbine blade 52-3 placed in third mixing vessel unit 10-2, and is transferred to around the passage hole of partition unit 30 having a filter disposed on third mixing vessel unit 10-2. Further, the reaction mixture is fed by feed-assisting agitating blade 54-3 to fourth mixing vessel unit 10-3 through the passage hole in the center portion of partition unit 30. When moving the inside of third mixing vessel unit 10-2 and fourth mixing vessel unit 10-3, part of the reaction mixture is subjected to filtration by filter 36 disposed in partition unit 30. The filtrate is discharged through filtrate outlet 34 to the outside. The concentrated reaction mixture L2 is discharged through the discharge outlet in the upper portion of fourth mixing vessel unit 10-3.

By the continuous reaction apparatus of the present invention, the following effects can be obtained.

1. By using a flattened-type cylindrical mixing vessel unit having a small height and a circular disc-type agitating blade in combination, not only can the path of flow of the reaction mixture be controlled, but also the reaction mixture can be uniformly subjected to reaction.

2. By using a disperser blade having high mixing efficiency, high mixing effect and high shearing effect can be achieved.

3. Partition units capable of controlling a temperature are disposed on both sides of the flattened-type mixing vessel unit. The partition unit capable of controlling a temperature has a large heating area, and therefore can precisely control the temperature of the reaction mixture.

4. A reagent can be fed using a reagent feed pipe into the partition unit capable of controlling a temperature. A temperature difference between the reagent and the reaction mixture caused when feeding the reagent using a reagent feed pipe can be reduced, so that the occurrence of an uneven reaction can be suppressed.

5. By using a partition unit having a filtration function, the liquid amount in the reaction mixture and the concentration of the reaction mixture can be controlled. Thus, not only can the reaction be controlled, but also the reaction mixture can be cleaned.

6. The passage hole formed in the center portion of the partition unit has a special shape. Further, a feed-assisting agitating blade is placed in the passage hole. By virtue of this, the flow of the reaction mixture from a mixing vessel unit to the next mixing vessel unit can be promoted. In addition, when a reagent is fed from the center portion of the partition unit, uniform mixing of the reaction mixture with the reagent can be promoted.

7. The reaction mixture can be easily sampled through the sampling port formed in the side wall of the mixing vessel unit, and therefore it is possible to precisely control the continuous reaction apparatus.

A reaction mixture in a liquid state can be subjected to reaction while uniformly stirring the reaction mixture by utilizing the continuous reaction apparatus of the present invention.

The continuous reaction apparatus of the present invention can be preferably applied particularly to the production of a toner by a wet process. Hereinbelow, an example in which the continuous reaction apparatus of the present invention is applied to the production of a toner is described in detail.

For utilizing the continuous reaction apparatus of the present invention, it is preferred that toner particles are produced in an aqueous medium (hereinafter, such a method of producing toner particles is referred to simply as "wet process"). The wet process indicates a method for producing a toner for electrostatic image development, in which an aqueous dispersing medium, such as water, is used in the production step for toner particles. Examples of wet processes include (a) a suspension polymerization method, (b) an emulsion polymerization flocculation method, and (c) a dissolution suspension method. These methods are individually as described below.

(a) Suspension Polymerization Method

A polymerizable monomer, a polymerization initiator, and a colorant and others are suspended or dispersed in an aqueous medium, and then the polymerizable monomer is polymerized, forming toner particles.

(b) Emulsion Polymerization Flocculation Method (Emulsion Flocculation Method)

A polymerizable monomer is added to an aqueous medium containing a polymerization initiator and an emulsifying agent and others, and the resultant mixture is emulsified. The resultant emulsion is stirred to polymerize the polymerizable monomer. To the resultant dispersion of polymer primary particles is added, for example, a colorant. The polymer primary particles are caused to suffer flocculation and fusion, forming toner particles. Alternatively, a binder resin is dispersed in a dispersing medium using a surfactant. To the resultant dispersion of resin particles is added, for example, a colorant. The resin particles are caused to suffer flocculation and fusion, forming toner particles.

(c) Dissolution Suspension Method

A polymer and a colorant and others are preliminarily dissolved and dispersed in a solvent. The resultant dispersion (which is a dispersion having the same composition as that of the toner) is dispersed in an aqueous medium. The resultant dispersion is heated, or the dispersion is placed under a reduced pressure. Thus, the solvent is removed from the dispersion, forming toner particles.

The present invention can be applied to a method for producing a toner, which comprises the step of continuously producing toner particles. The present invention can be applied to a method for producing toner particles by a wet process, such as the above method (a), (b), or (c). The present invention preferably can be applied to emulsion polymerization flocculation method (b) (or emulsion flocculation method). Among the wet processes, emulsion (polymerization) flocculation method (b) has an advantage in that it is possible to easily control the roundness of the toner particles. In addition, emulsion polymerization flocculation method (b) is advantageous in that toner particles having a small particle diameter and a narrow particle diameter distribution are likely to be obtained. Therefore, when the present invention is applied to emulsion polymerization flocculation method (b), the above-mentioned effect of the present invention (effect such that toner particles having a small particle diameter and a narrow particle diameter distribution can be obtained) is more likely to be exhibited.

The present invention can be applied to a method for producing toner particles by a wet process, such as the above method (a), (b), or (c). The components used to the wet processes in common are individually described below.

The binder resin used in the production of a toner for electrostatic image development is described below.

<Binder Resin>

In the present invention, the binder resin used in the production of a toner can be selected from wide varieties including conventionally known binder resins. In the present invention, with respect to the type of and the production method for the binder resin, there is no particular limitation. Preferred examples of the binder resins include styrene polymers, such as styrene-acrylate copolymers, styrene-methacrylate copolymers, and acrylic acid copolymers of these resins; saturated or unsaturated polyester polymers; and epoxy polymers. The binder resins can be used individually or in combination. When two or more binder resins are used in combination, a low-molecular-weight component and a high-molecular-weight component may be incorporated. Two or more binder resins individually may or may not contain a crosslinking component.

When the polymer primary particles obtained by emulsion polymerization are caused to suffer flocculation to produce a toner, it is especially preferred that at least styrene is used as a copolymerizable component and further at least one member selected from the group consisting of acrylic acid, methacrylic acid, an alkyl acrylate, and an alkyl methacrylate is used as a copolymerizable component.

In the emulsion flocculation method, the binder resin is dispersed in a dispersing medium using a surfactant to prepare resin particles. The prepared resin particles are caused to suffer flocculation to produce a toner. In the case of the emulsion flocculation method, it is preferred to use a polyester resin. Further, as a polyester resin, a noncrystalline polyester resin may be solely used, or a noncrystalline polyester resin and a crystalline polyester resin may be used in combination.

The colorant used in the method for producing a toner for electrostatic image development is described below.

<Colorant>

The colorant may be any of an inorganic pigment, an organic pigment, and an organic dye, and may be a combination of them. The colorant may be either chromatic or achromatic.

As an example of an achromatic colorant, there can be mentioned carbon black. Examples of chromatic colorants include cyan colorants, yellow colorants, and magenta colorants. Specifically, examples of chromatic colorants include aniline blue, phthalocyanine blue, phthalocyanine green, Hansa yellow, rhodamine dyes and pigments, chrome yellow, quinacridone, benzidine yellow, rose bengal, triarllyl-methane dyes, monoazo dyes and pigments, diazo dyes and pigments, and condensed azo dyes and pigments. These dyes and pigments may be used individually or in combination.

In the case of a full-color toner, with respect to the yellow colorant, at least one member selected from the group consisting of benzidine yellow, monoazo dyes and pigments, and condensed azo dyes and pigments is preferably used. With respect to the magenta colorant, at least one member selected from the group consisting of quinacridone and monoazo dyes and pigments is preferably used. With respect to the cyan colorant, phthalocyanine blue is preferably used. Specifically, as a cyan colorant, C. I. Pigment Blue 15:3 is especially preferably used, as a yellow colorant, C. I.

Pigment Yellow 74 and C. I. Pigment Yellow 93 are especially preferably used, and, as a magenta colorant, C. I. Pigment Red 238, C. I. Pigment Red 269, C. I. Pigment Red 57:1, C. I. Pigment Red 48:2, and C. I. Pigment Red 122 are especially preferably used.

The amount of the colorant contained is, relative to 100 parts by weight of the binder resin, preferably in the range of from 1 to 25 parts by weight, further preferably 1 to 15 parts by weight, especially preferably 3 to 12 parts by weight.

Next, the charge control agent used in the method for producing a toner for electrostatic image development is described below.

<Charge Control Agent>

For imparting the charge amount and charge stability, a charge control agent may be added to the toner used in the present invention. As a charge control agent, a conventionally known compound is used. The charge control agent may be either positively charged or negatively charged. Examples of charge control agents include metal complexes of a hydroxycarboxylic acid, metal complexes of an azo compound, naphthol compounds, metal compounds of a naphthol compound, nigrosine dyes, quaternary ammonium salts, and mixtures thereof.

The amount of the charge control agent contained is, relative to 100 parts by weight of the binder resin, preferably in the range of from 0.01 to 5 parts by weight, further preferably 0.05 to 3 parts by weight, especially preferably 0.1 to 2 parts by weight.

Next, the wax component usable in the method for producing a toner for electrostatic image development is described below.

<Wax>

For improving the fixing properties, a wax may be added to the toner used in the present invention. Examples of waxes include olefin waxes, such as low-molecular-weight polyethylene, low-molecular-weight polypropylene, and copolymer polyethylene; paraffin waxes; ester waxes having a long-chain aliphatic group, such as behenyl behenate, a montanate, and stearyl stearate; vegetable waxes, such as hydrogenated castor oil and a carnauba wax; ketones having a long-chain alkyl group, such as distearyl ketone; silicone having an alkyl group; higher fatty acids, such as stearic acid; long-chain aliphatic alcohols, such as eicosanol; carboxylic acid esters or partial esters of polyhydric alcohol obtained from a polyhydric alcohol, such as glycerol or pentaerythritol, and a long-chain fatty acid, such as stearic acid or montanic acid; higher fatty acid amides, such as oleic acid amide and stearic acid amide; and low-molecular-weight polyester. The carboxylic acid (partial) ester is preferably a (partial) ester of a fatty acid having 15 to 30 carbon atoms and a mono- to penta-hydric alcohol. With respect to the alcohol component constituting the ester, a monohydric alcohol having 10 to 30 carbon atoms is preferred, or a polyhydric alcohol having 3 to 10 carbon atoms is preferred.

For improving the fixing properties of the toner, the melting point of the wax is preferably 40° C. or higher, further preferably 50° C. or higher, especially preferably 60° C. or higher. Further, the melting point of the wax is preferably 120° C. or lower, further preferably 110° C. or lower, especially preferably 100° C. or lower. When the melting point of the wax is too low, it is likely that, after the toner is fixed, the wax is exposed to the surface, causing the surface to be sticky. When the melting point of the wax is too high, the toner is poor in the fixing properties at low temperatures.

The amount of the wax contained is, relative to 100 parts by weight of the binder resin, preferably in the range of from 1 to 30 parts by weight, further preferably 2 to 20 parts, especially preferably 4 to 15 parts by weight.

Hereinbelow, a specific embodiment of the method for producing a toner for electrostatic image development will be described in detail taking the above-mentioned emulsion (polymerization) flocculation method (b) as an example.

<Description of the Emulsion (Polymerization) Flocculation Method>

The emulsion (polymerization) flocculation method has at least the following steps:

an emulsion polymerization step, or an emulsifying step for a binder resin, (1) a step of feeding a colorant and polymer primary particles or a resin particle dispersion to prepare a mixture dispersion (hereinafter, referred to simply as "step (1)" or "mixing/dispersing step"), (2) a step of feeding the mixture dispersion to form flocculate particles (hereinafter, referred to simply as "step (2)" or "flocculation step"), (3) a step of further adding shell particles to the flocculate particles to form flocculate particles having a core/shell structure (hereinafter, referred to simply as "step (3)" or "encapsulation step"), (4) a step of feeding the flocculate particles to form fused particles (hereinafter, referred to simply as "step (4)" or "fusion step"), and a cleaning and drying step.

Specifically, a colorant and, if necessary, a charge control agent, and particles of, e.g., a wax or a dispersion thereof are mixed into and dispersed in the polymer primary particles obtained by emulsion polymerization, or the dispersion containing resin particles obtained by the emulsifying step for a binder resin to obtain a dispersion. The particles in the dispersion are caused to suffer flocculation to obtain flocculate particles. Further, if necessary, for example, resin fine particles are deposited on the flocculate particles. Then, the flocculate particles or the flocculate particles having resin fine particles or the like deposited thereon are subjected to fusion to obtain a toner. The thus obtained toner particles are cleaned and dried to obtain a toner for electrostatic image development.

<Emulsion Polymerization Step>

The emulsion polymerization step is described below.

<Emulsifying Agent Used in the Emulsion Polymerization>

As an example of the emulsifying agent used in the emulsion polymerization, there can be mentioned at least one emulsifying agent selected from a cationic surfactant, an anionic surfactant, and a nonionic surfactant.

Specific examples of cationic surfactants include dodecylammonium chloride, dodecylammonium bromide, dodecyltriethylammonium bromide, dodecylpyridinium chloride, dodecylpyridinium bromide, and hexadecyltrimethylammonium bromide.

Specific examples of anionic surfactants include fatty acid soaps, such as sodium stearate and sodium dodecanoate, sodium dodecyl sulfate, sodium dodecylbenzenesulfonate, and sodium lauryl sulfate.

Specific examples of nonionic surfactants include polyoxyethylene dodecyl ether, polyoxyethylene hexadecyl ether, polyoxyethylene nonyl phenyl ether, polyoxyethylene lauryl ether, polyoxyethylene sorbitan monooleate ether, and monodecanoyl sucrose.

Among these surfactants, anionic surfactants are preferred, and alkali metal salts of a linear alkylbenzenesulfonic acid are especially preferred.

<Method for Producing Polymer Primary Particles>

With respect to the polymer primary particles used in the emulsion polymerization flocculation method, preferred are ones having a glass transition point (hereinafter, frequently abbreviated to "Tg") of 40 to 80° C. and having a volume average particle diameter of 0.02 to 3 µm. The polymer primary particles are obtained by subjecting a monomer to emulsion polymerization. With respect to the method for preparing the polymer primary particles, there is no particular limitation, but the polymer primary particles are preferably obtained by subjecting a monomer mixture to seed emulsion polymerization using wax fine particles as a seed.

<Monomer Used in the Emulsion Polymerization>

In the emulsion polymerization, a monomer having a Brønsted acid group (hereinafter, frequently referred to simply as "acid group") or a monomer having a Brønsted basic group (hereinafter, frequently referred to simply as "basic group") and a monomer having neither Brønsted acid group nor Brønsted basic group (hereinafter, frequently referred to as "other monomer") are successively incorporated to advance polymerization. In this instance, a plurality of monomers can be separately added. Alternatively, a plurality of monomers are preliminarily mixed together, and the resultant mixture of the monomers may be added. Further, the composition of the monomer can be changed during the addition of the monomer. The monomer may be incorporated as such, or the monomer is preliminarily mixed with, for example, water or an emulsifying agent to prepare an emulsion, and then the prepared emulsion can be incorporated. With respect to the emulsifying agent, one or two or more members selected from the above-mentioned surfactants can be used in combination.

Examples of the "monomers having an acid group" used in the present invention include monomers having a carboxyl group, such as acrylic acid, methacrylic acid, maleic acid, fumaric acid, and cinnamic acid; monomers having a sulfonic acid group, such as sulfonated styrene; and monomers having a sulfonamide group, such as vinylbenzenesulfonamide.

Examples of the "monomers having a basic group" include aromatic vinyl compounds having an amino group, such as aminostyrene; nitrogen-containing, heterocyclic group-containing monomers, such as vinylpyridine and vinylpyrrolidone; and (meth)acrylates having an amino group, such as dimethylaminoethyl acrylate and diethylaminoethyl methacrylate.

These monomers having an acid group and monomers having a basic group may be individually present in the form of a salt formed together with their respective counter ion. The amount of the monomer having an acid group or a basic group incorporated into the monomer mixture forming the polymer primary particles is, relative to 100 parts by weight of the binder resin, preferably in the range of from 0 to 10 parts by weight, further preferably 0 to 3 parts by weight, especially preferably 0 to 1.5 parts by weight. Among the monomers having an acid group or a basic group, acrylic acid or methacrylic acid is especially preferred.

Examples of the "other monomers" include styrenes, such as styrene, methylstyrene, chlorostyrene, dichlorostyrene, p-tert-butylstyrene, p-n-butylstyrene, and p-n-nonylstyrene; (meth)acrylates, such as methyl acrylate, ethyl acrylate, propyl acrylate, n-butyl acrylate, isobutyl acrylate, hydroxyethyl acrylate, ethylhexyl acrylate, methyl methacrylate, ethyl methacrylate, propyl methacrylate, n-butyl methacrylate, isobutyl methacrylate, hydroxyethyl methacrylate, and ethylhexyl methacrylate; and amides, such as acrylamide, N-propylacrylamide, N,N-dimethylacrylamide, N,N-dipropylacrylamide, N,N-dibutylacrylamide, and acrylic acid amide. Of these, especially preferred are styrene and butyl acrylate.

<Crosslinking Agent Used in the Emulsion Polymerization>

It is preferred that a crosslinking agent is further added to the polymer primary particles. In this case, it is preferred that a crosslinking agent is further added to the above-mentioned monomer. As a crosslinking agent, a radically polymerizable multifunctional monomer is used.

Examples of crosslinking agents include divinylbenzene, hexanediol diacrylate, ethylene glycol dimethacrylate, diethylene glycol dimethacrylate, diethylene glycol diacrylate, tri ethylene glycol diacrylate, neopentyl glycol dimethacrylate, neopentyl glycol acrylate, and diallyl phthalate. Further, as a crosslinking agent, a monomer having a reactive group in the pendant group, for example, glycidyl methacrylate, methylolacrylamide, or acrolein can be used. Of these, preferred are radically polymerizable difunctional monomers, and, further specifically, especially preferred are divinylbenzene and hexanediol diacrylate.

The amount of the multifunctional monomer incorporated into the monomer mixture is, relative to 100 parts by weight of the binder resin, preferably in the range of from 0.05 to 10 parts by weight, further preferably 0.1 to 5 parts by weight, especially preferably 0.2 to 3 parts by weight.

<Glass Transition Point of the Polymer Used in the Emulsion Polymerization>

These monomers can be used individually or in combination. In this instance, the glass transition point of the polymer is preferably 40 to 80° C. When the glass transition point of the polymer is higher than 80° C., it is likely that the fixing temperature becomes too high or a problem of deterioration of the OHP transparency occurs. On the other hand, when the glass transition point of the polymer is lower than 40° C., the toner is likely to be poor in storage stability. A further preferred glass transition point is 50 to 70° C., and an especially preferred glass transition point is 55 to 65° C.

<Polymerization Initiator and Chain Transfer Agent Used in the Emulsion Polymerization>

A polymerization initiator may be added to the polymerization system before, simultaneously with, or after adding a monomer. If necessary, these methods for addition may be used in combination. The amount of the initiator contained is, relative to 100 parts by weight of the binder resin, preferably in the range of from 0 to 10 parts by weight, further preferably 1 to 7 parts by weight, especially preferably 2 to 5 parts by weight. In the emulsion polymerization, if necessary, a known chain transfer agent can be used. Specific examples of chain transfer agents include t-dodecylmercaptan, 2-mercaptoethanol, diisopropylxanthogen, carbon tetrachloride, and trichlorobromomethane. The chain transfer agents may be used individually or in combination.

<Emulsion Polymerization Temperature>

The above-mentioned monomer and water are mixed together in the presence of, for example, a polymerization initiator and subjected to polymerization. The polymerization temperature is 40 to 150° C., preferably 50 to 120° C., further preferably 60 to 100° C.

<Particle Diameter of Primary Particles Obtained by the Emulsion Polymerization>

The thus obtained polymer primary particles have a volume average particle diameter in the range of from 0.01 to 3 µm, preferably 0.02 to 2.5 µm, further preferably 0.05 to 2 µm, especially preferably 0.1 to 1.5 µm. The average particle diameter can be measured using, for example, UPA. When the particle diameter of the polymer primary particles is smaller than 0.01 µm, control of the flocculation rate is likely to be difficult. When the particle diameter of the polymer primary particles is larger than 3 µm, it is likely that the toner obtained by flocculation of the polymer primary particles has too large a particle diameter, so that the particles are unsuitable for producing a toner having a particle diameter of 3 to 8 µm.

<Preparation of a Resin Particle Dispersion>

A resin particle dispersion is prepared by dispersing a binder resin in an aqueous dispersing medium, such as water or an alcohol, using a surfactant. As a dispersing method, for example, a homogenizer, a ball mill, a sand mill, or a DYNO-mill can be used. Further, a phase inversion emulsifying method can be used in which a base is added to an organic phase comprising a hydrophobic organic solvent having a binder resin dissolved to neutralize the phase, and then an aqueous medium is added to the resultant organic phase so that the organic phase and the aqueous phase suffer phase inversion, dispersing the binder resin in the aqueous medium.

<Emulsifying Agent Used in Dispersing the Resin Particles>

With respect to the emulsifying agent, there is no particular limitation, but examples of emulsifying agents include anionic surfactants, such as sulfate ester salt surfactants, sulfonate surfactants, phosphate surfactants, and soap surfactants; cationic surfactants, such as amine salt surfactants and quaternary ammonium salt surfactants; and nonionic surfactants, such as polyethylene glycol surfactants, alkylphenol ethylene oxide addition product surfactants, and polyhydric alcohol surfactants. The surfactants may be used individually or in combination.

<Particle Diameter of the Resin Particles>

The volume average particle diameter of the obtained resin particles is 0.01 to 3 µm, preferably 0.02 to 2.5 µm, further preferably 0.05 to 2 µm, especially preferably 0.1 to 1.5 µm. The average particle diameter can be measured using, for example, UPA.

<Solids Content of the Dispersion of Polymer Primary Particles or Resin Particles>

The solids content of the dispersion of polymer primary particles or resin particles is preferably 3 to 40% by mass, further preferably 7 to 30% by mass.

<Colorant Particles>

The dispersion of polymer primary particles and a colorant are mixed with each other to obtain a mixture dispersion. Then, the polymer primary particles in the obtained mixture dispersion are caused to suffer co-flocculation, obtaining flocculate particles. The colorant is preferably used in the form of an emulsion obtained by preliminarily emulsifying the colorant in water in the presence of an emulsifying agent (the above-mentioned surfactant). The volume average particle diameter of the colorant particles is preferably 0.01 to 3 µm, further preferably 0.05 to 2 µm, especially preferably 0.1 to 1 µm. The amount of the colorant used is, relative to 100 parts by weight of the polymer primary particles, 1 to 25 parts by weight, preferably 1 to 15 parts by weight, further preferably 3 to 12 parts by weight.

<Wax>

In the production of the toner, it is preferred to use a wax. When a wax is not incorporated, the toner is likely to be poor in the fixing properties. Further, when a wax is not incorporated, paper is likely to wind round a fixing roll upon fixing the toner. A wax similar to those described above in connection with the "components used common to the wet processes for the method for producing toner particles" is preferably used.

In the emulsion polymerization flocculation method, a wax is dispersed in an emulsifying agent (the above-mentioned surfactant) so as to form an emulsion. Thus, a wax fine particle dispersion is obtained. Emulsion polymerization using the obtained wax fine particle dispersion as a seed is conducted, producing polymer primary particles including the wax therein. Alternatively, the wax fine particle dispersion, polymer primary particles (which may include a wax therein), and a colorant are caused to suffer co-flocculation in the flocculation step. The emulsion polymerization flocculation method is not limited to these methods.

In the production of the toner, it is preferred that seed polymerization using a wax as a seed is conducted to obtain polymer primary particles including the wax therein. That is, the polymer primary particles used in the production of the toner preferably comprise particles obtained by seed polymerization using a wax as a seed. The reason for this is that the seed polymerization using a wax as a seed can prevent the wax from being exposed to the surface of the toner particles.

The average particle diameter of the wax fine particles which are used as a seed and that of the wax fine particles which are used for co-flocculation are common, and the average particle diameter is preferably 0.01 to 3 µm, further preferably 0.1 to 2 µm, especially preferably 0.1 to 1.5 µm. The average particle diameter of the wax fine particles can be measured using, for example, LA-500, manufactured by Horiba, Ltd. When the average particle diameter of the wax emulsion is larger than 3 µm, control of the particle diameter upon flocculation is likely to be difficult. When the average particle diameter of the wax emulsion is smaller than 0.01 µm, preparation of the dispersion is likely to be difficult.

<Charge Control Agent>

In the production of the toner, it is preferred to use a charge control agent. In the emulsion (polymerization) flocculation method, when obtaining polymer primary particles, a charge control agent can be used as a seed. Thus, a toner containing a charge control agent is obtained. Alternatively, a charge control agent can be dissolved or dispersed in a monomer or a wax. Further alternatively, in the flocculation step, polymer primary particles and a colorant as well as charge control agent primary particles are caused to suffer flocculation, forming flocculate particles. Further alternatively, polymer primary particles and a colorant are caused to suffer flocculation. The resultant flocculate particles have substantially the appropriate particle diameter as toner particles, and then charge control agent primary particles are added to the flocculate particles to cause flocculation. In these cases, the charge control agent can be dispersed in water using the above-mentioned surfactant. The charge control agent is preferably used in the form of an emulsion (charge control agent primary particles). The average particle diameter of the charge control agent primary particles is preferably 0.01 to 3 µm, further preferably 0.05 to 2 µm, especially preferably 0.1 to 1 µm.

<Apparatus Used in the Emulsion (Polymerization) Flocculation Step>

Toner particles can be continuously produced by the apparatus of the present invention. When the above-mentioned emulsion (polymerization) flocculation method (b) is applied to the apparatus, the method for producing toner particles has at least the following steps (1), (2), and (3).

(1) Step of feeding a colorant and polymer primary particles to prepare a mixture dispersion (mixing/dispersing step).

(2) Step of feeding the mixture dispersion to form flocculate particles (flocculation step).

(3) Step of feeding the flocculate particles to form fused particles (fusion step).

Any of steps (1) to (3) preferably comprises a continuously feeding step and a continuously withdrawing step.

Any of steps (1) to (3) may be continuous. It is preferred that at least step (2) has the continuously feeding step and continuously withdrawing step. That is, it is preferred that step (2) has the step of continuously feeding the mixture dispersion and the step of continuously withdrawing the flocculate particles. It is more preferred that further step (3) also has the continuously feeding step and continuously withdrawing step. It is more preferred that further step (1) also has the continuously feeding step and continuously withdrawing step.

<Step (1): Mixing/Dispersing Step>

In the mixing/dispersing step, at least a colorant and a dispersion of polymer primary particles or resin particles, and further, if necessary, a wax, a charge control agent, and other components are mixed together and dispersed. The mixing/dispersing step is needed for causing the mixture to be fed to the flocculation step to be in the state of being uniformly dispersed. The dispersion of polymer primary particles obtained in the above emulsion polymerization step, or the resin particle dispersion is fed into the mixing/dispersing step. The components other than the polymer primary particles and resin particles may be either in the state of particles or in the state of being preliminarily dispersed in a medium. These components are preferably fed in the form of a dispersion, for example, in the form of a slurry or an emulsion to the vessel for flocculation. The reason for this is that the residence time in the mixing step can be appropriately controlled in this case. Alternatively, the components can be fed not in the form of a slurry or an emulsion but in the form of particles. In this case, the components may suffer secondary flocculation. As a result, it is likely that a coarse powder is generated in the toner, causing a white streak or the like in an image formed using the resultant toner.

In the mixing step, the volume average particle diameter of the above-mentioned components is preferably 3 μm or less, further preferably 1 μm or less, especially preferably 0.5 μm or less. In the mixing step, it is preferred that the components are fed in the form of an aqueous dispersion. In the mixing step, when the volume average particle diameter of the components is in the above range and the components are fed in the form of an aqueous dispersion, it is easy to control the average particle diameter and particle diameter distribution of the flocculate particles in the subsequent flocculation step. Further, the resultant toner has a sharp charge amount distribution, so that an image free of fog can be advantageously obtained.

With respect to the dispersing medium, there is no particular limitation as long as it is an aqueous medium, but preferred is water. With respect to the dispersion concentration, there is no particular limitation. However, the dispersion concentration is, in terms of a solids content, 3% by mass or more, preferably 7% by mass or more, more preferably 10% by mass or more. The dispersion concentration is, in terms of a solids content, 40% by mass or less, preferably 30% by mass or less, more preferably 20% by mass or less. When the dispersion concentration is less than the above range, control of the particle diameter and particle size distribution is likely to be difficult. When the dispersion concentration is more than the above range, an increase of the viscosity is likely to occur, making it impossible to uniformly disperse the components.

With respect to the vessel used in the mixing/dispersing step, there is no particular limitation as long as the components can be uniformly mixed with one another. For example, a general reactor can be used. Taking continuous mixing into consideration, it is preferred to use a mixing apparatus having an inlet for continuously feeding the individual components and a withdrawal outlet for continuously withdrawing the components. When a change in viscosity of the mixture being mixed is small, or the mixing time is short, the components can be fed while mixing the components using a mixing machine, such as an in-line mixer placed at the pipe. When the viscosity of or a change in viscosity of the mixture being mixed is large, or a longer mixing time is needed, the continuous mixing vessel proposed by the present invention is preferably used. When the continuous mixing vessel in the present invention is used, the mixing vessel units with the required number according to the time required for mixing can be placed. In addition, an inlet for raw material liquids, such as a pigment dispersion, a wax dispersion, and a charge control agent, can be formed according to the order of mixing of the raw material liquids. Further, by setting the temperature conditions required for mixing, the mixing state in the continuous mixing vessel can be optimized.

The raw material liquids may be added at the same time, but can be successively added.

The mixing/dispersing step may be unified with the below-mentioned flocculation step. In such a case, while adding the components other than the above-mentioned polymer primary particles or resin particles and mixing them, the mixture dispersion is caused to suffer flocculation.

<Step (2): Flocculation Step>

In the flocculation step, at least the above-mentioned colorant and polymer primary particles or resin particles, and further, if necessary, wax, charge control agent, and other components are caused to suffer flocculation. In the flocculation step, prior to the fusion step, for example, the polymer primary particles are caused to suffer flocculation so that the resultant particles have substantially the size of toner particles.

In the flocculation step, while adding the components other than the polymer primary particles or resin particles and mixing them, the components may be caused to suffer flocculation. Further, the flocculation step may comprise an encapsulation step for further adding a shell agent to the flocculate particles to form toner particles having a core/shell structure.

<Mixing Apparatus for Flocculation>

When step (2) is continuously performed, it is preferred to use the continuous reaction apparatus of the present invention. The continuous reaction apparatus comprising mixing vessel units and partition units can be placed along the flow direction of the dispersion of polymer primary particles or resin particles. If necessary, a partition unit having a reagent feed pipe, or a mixing vessel unit having a sampling port can be disposed. Further, the number of the mixing vessel units can be increased or decreased according to the mixing time and flocculation time. A temperature control system is connected to the partition unit capable of controlling a temperature, completing a continuous reaction apparatus for flocculation.

<Conditions for Continuous Flocculation Operation>

When step (2) is continuously performed, the components may be fed to a vacant vessel at the initial stage of the continuous operation. Alternatively, a vessel is filled with a dispersing medium containing no particles and others in advance, and the components may be fed to the vessel to stabilize the concentrations of the components in the vessel. Further alternatively, a vessel is filled with one of or two or more of the components in advance, and the other components may be fed to the vessel to stabilize the concentrations of the components in the vessel. Further alternatively, a flocculate mixture similar to the flocculate mixture in a stable state during the continuous operation is prepared by another method. A vessel is filled with the prepared flocculate mixture. Then, the components may be fed to the vessel to stabilize the concentrations of the components in the vessel. In step (2), the above-mentioned components are fed to the vessel, and then the components in the vessel are caused to suffer flocculation by, for example, heating, adjusting pH, adding a salt, or adding a curing agent.

In the continuous reaction apparatus of the present invention used in step (2), the temperature of the reaction mixture in each mixing vessel unit can be precisely controlled by the temperature control made by the partition unit. When flocculation is conducted by heating, the temperature of the reaction mixture is preferably a temperature lower than the glass transition point of the polymer primary particles by 10° C. or higher, more preferably a temperature lower than the glass transition point by 5° C. or higher. Further, the temperature of the reaction mixture is preferably a temperature higher than the glass transition point of the polymer by 10° C. or lower, more preferably a temperature higher than the glass transition point by 5° C. or lower. When the temperature of the reaction mixture is lower than the above range, the particle diameter of the flocculate particles is likely to be less than the target particle diameter. When the temperature of the reaction mixture is higher than the above range, the particle diameter of the flocculate particles is likely to be larger than the target particle diameter. When there is a distribution in the temperature in the flocculation step, the expression "temperature of the reaction mixture" used here means an average value of the highest temperature and the lowest temperature.

When the flocculation step is performed by heating, from the viewpoint of the production efficiency, the residence time of the reaction mixture in the vessel is preferably 2 hours or less, especially preferably 1 hour or less. The expression "residence time" used here means an average residence time when the temperature of the components contained in the reaction mixture satisfies the above-mentioned temperature conditions. By such a heating treatment, the colorant and polymer primary particles, and further, if necessary, wax, charge control agent, and other components are unified together. The term "residence time" used here means a period of time from a point when the component is first fed in the case where the timings of feeding the individual components to the vessel are different.

With respect to the residence time of the flocculate mixture in each mixing vessel unit, there is no particular limitation. The residence time of the flocculate mixture in each mixing vessel unit can be controlled according to the flocculation time required for the whole apparatus and the number of the mixing vessels. The residence time of the flocculate mixture is preferably from 1 to 10 minutes. When the residence time of the flocculate mixture is too short, there is a danger that the flocculation is unsatisfactory, so that the number of the required mixing vessels is inevitably increased. Conversely, when the residence time of the flocculate mixture is too long, there is a danger that the flocculate mixture in the mixing vessel becomes poor in uniformity.

In step (2), the temperature of the reaction mixture can be controlled to be in the above range. By virtue of this, the components contained in the reaction mixture can be caused to suffer flocculation without adding an electrolyte. Alternatively, the components contained in the reaction mixture can be caused to suffer flocculation by adding an electrolyte. When the components are caused to suffer flocculation by adding an electrolyte, flocculation can be made at the above-mentioned temperature or lower. The timing of actually feeding an electrolyte may be any one of or both of step (1) and step (2). That is, an electrolyte may be fed in advance in step (1).

The electrolyte used in step (2) may be either an organic salt or an inorganic salt. With respect to the valence of the electrolyte used in step (2), there is no particular limitation, but the electrolyte is preferably divalent or multivalent. Specifically, examples of electrolytes include NaCl, KCl, LiCl, $Na_2SO_4$, $K_2SO_4$, $Li_2SO_4$, $MgCl_2$, $CaCl_2$, $MgSO_4$, $CaSO_4$, $ZnSO_4$, $Al_2(SO_4)_3$, $Fe_2(SO_4)_3$, $CH_3COONa$, and $C_6H_5SO_3Na$. Of these, inorganic salts having divalent or multivalent metal cations are especially preferred. By using an electrolyte, it is easy to control the average particle diameter and particle diameter distribution of the flocculate particles. Further, by using an electrolyte, the resultant toner has a sharp charge amount distribution, making it possible to obtain an image free of fog.

The amount of the electrolyte contained varies depending on, for example, the type of the electrolyte and the intended particle diameter of the flocculate particles. However, the amount of the electrolyte contained is, relative to 100 parts by weight of the mixture dispersion, in terms of a solids content, 0.05 to 25 parts by weight, preferably 0.05 to 15 parts by weight, further preferably 0.05 to 10 parts by weight.

When flocculation is performed by adding an electrolyte, the following problems may occur.
(In the case where the amount of the electrolyte contained is less than the above range)
A flocculation reaction slowly proceeds.
A fine powder of 1 μm or less remains after the flocculation reaction.
The average particle diameter of the obtained flocculate particles is less than the intended particle diameter.
(In the case where the amount of the electrolyte contained is more than the above range)
Rapid flocculation is likely to occur, making it difficult to control the particle diameter.
The obtained flocculate particles contain a coarse powder or particles having an indefinite shape.

When flocculation is conducted by adding an electrolyte, the flocculation temperature is preferably a temperature lower than the glass transition point of the polymer primary particles by 20° C. or higher, more preferably a temperature lower than the glass transition point by 10° C. or higher. Further, the flocculation temperature is preferably a temperature higher than the glass transition point of the polymer by 10° C. or lower, more preferably the glass transition point of the polymer or lower.

In the present invention, the temperature control in the flocculation step is important for controlling the average particle diameter and particle diameter distribution of the obtained flocculate. Therefore, a difference between the highest temperature and the lowest temperature in the flocculation step is preferably 20° C. or less, especially preferably 10° C. or less. When the difference between the highest temperature and the lowest temperature is more than the above range, control of the particle diameter is likely to be difficult.

In step (2), a colorant and polymer primary particles, and further, if necessary, a wax, a charge control agent, and other components are mixed together and dispersed. The resultant dispersion may be substantially simultaneously fed to form flocculate particles. Alternatively, at least one member selected from the group consisting of resin fine particles, a colorant, a wax, and a charge control agent may be fed to the dispersion of flocculate particles having a volume average particle diameter increased to 1 µm or more.

In the flocculation step using the continuous reaction apparatus of the present invention, control of the particle diameter is conducted as follows.

The flocculate particles are automatically or manually sampled through the sampling port formed in the side wall of the mixing vessel module.

A particle diameter of the flocculate particles is automatically or manually measured by means of a particle diameter measurement apparatus. From the obtained results of the measurement, the temperature in each mixing vessel unit is automatically or manually adjusted so as to control the size of the flocculate particles to be fed to the next fusion step.

<Step (3): Fusion Step>

In step (3), the flocculate obtained in step (2) is heated. Thus, the colorant and polymer primary particles, and further, if necessary, wax, charge control agent, and other components are fused together to obtain physically unified particles.

<Mixing Apparatus for Fusion>

When step (3) is continuously performed, it is preferred to use the continuous reaction apparatus of the present invention. Mixing vessel units with the required number are disposed along the flow direction of the dispersion of flocculate particles and according to the mixing time and fusion time. Finally, a temperature control system is connected to each continuous mixing vessel unit, completing a continuous reaction apparatus for fusion.

In step (3), it is preferred that the polymer primary particles are heated to a temperature higher than the glass transition point of the polymer to form fused particles. Further, the heating temperature in step (3) is preferably higher than the glass transition point of the polymer primary particles by 10° C. or more, more preferably higher than the glass transition point by 20° C. or more. Further, the heating temperature in step (3) is preferably a temperature higher than the glass transition point of the polymer primary particles by 80° C. or lower, more preferably a temperature higher than the glass transition point by 60° C. or lower. When the heating temperature is lower than the above range, too long a residence time upon fusion is likely to be needed, so that the apparatus is inevitably increased in size, lowering the production efficiency. When the heating temperature is higher than the above range, control of the shape of the flocculate particles is likely to be difficult. When there is a distribution in the temperature in the fusion step, the expression "heating temperature" used here means an average value of the highest temperature and the lowest temperature.

In step (3), from the viewpoint of the production efficiency, the average residence time of the flocculate particles heated to the temperature in the above range is preferably 2 hours or less, especially preferably 1 hour or less. By such a heating treatment, the polymer primary particles and colorant and others are fused together and unified. Thus, the shape of the fused particles, that is, the shape of toner particles becomes nearly a sphere. Further, for the above-mentioned reason, it is preferred that the temperature in the vessel at the withdrawal outlet is the temperature in the vessel at the inlet or higher.

In the fusion step using the continuous reaction apparatus of the present invention, control of the particles is conducted as follows.

An emulsifying agent, a pH adjustor, and a flocculation inhibitor comprising an electrolyte are first added through the reagent feed pipe. The temperature of the partition unit is controlled. The temperature of the mixing vessel is increased to a target fusion temperature. Further, the flocculate particles are automatically or manually sampled through the sampling port formed in the side wall of the mixing vessel unit. A roundness of the flocculate particles is automatically or manually measured by means of a particle diameter measurement apparatus. Based on the results of the measurement, the temperature of the partition unit on the downstream side adjacent to the mixing vessel unit is automatically or manually controlled. After the target roundness of the flocculate particles has been achieved, the flocculate mixture in the mixing vessel unit is cooled using the temperature control system of the partition unit. The flocculate mixture is temporarily stored in a storage tank or fed to the cleaning step.

When step (3) is continuously performed, the dispersion having dispersed the fused particles obtained in step (3) is continuously withdrawn from the vessel.

<Relationship Between Step (2) and Step (3): Relationship Between the Flocculation Step and the Fusion Step>

It is preferred that the vessel used in step (2) and the vessel used in step (3) have the following relationships.

(a) A plurality of vessels are unified.

(b) A plurality of vessels are continuously connected.

(c) A plurality of vessels are connected through a transfer pipe.

Among the above relationships, (b) or (c) is preferred.

That is, it is preferred that at least two vessels are connected in series.

In the case of (b), the temperature conditions and shearing force in the part of step (2) and the part of step (3) for the vessel are controlled. Thus, the intended flocculation and fusion can be achieved.

In the case of (c), the dispersion of flocculate particles is transferred to the vessel for fusion (vessel in step (3)). Thus, the dispersion can be heated to fuse the flocculate particles.

In the case of (a), a plurality of vessels are unified. In this case, the flocculation step in step (2) and the fusion step in step (3) cannot be clearly separated, and therefore the fusion temperature used in step (3) persists in step (2). In this case, a suitable flocculation temperature may not be obtained.

It is preferred that the temperature in at least one vessel in step (3) is higher than the temperature in the vessel in step (2). The temperature for step (3) is higher than the temperature for step (2) preferably by 0 to 60° C. or more, especially preferably by 5 to 40° C. or more.

Step (2) requires an appropriately low temperature and a long residence time. When such requirements are not met, for example, a slight irregularity of the flow rate of a pump may make it impossible to control the particle diameter. Step (3) requires a prolonged period of time, and therefore, when an attempt is made to achieve the temperature in step (3) which is lower than that in step (2), too large a vessel may be needed.

<Cleaning and Drying Step>

The fused particles obtained through the above-mentioned steps are subjected to solid-liquid separation according to a known method, and the fused particles are recovered. Then, if necessary, the recovered particles are cleaned and then dried, obtaining intended toner particles.

The toner matrix particles can be cleaned by a belt filter, a filter press, centrifugal hydroextraction, or filtration under reduced pressure. Further, the toner matrix particles can be continuously cleaned using the continuous mixing vessel of the present invention.

<Continuous Cleaning Apparatus>

The continuous reaction apparatus of the present invention can be used as a continuous cleaning apparatus. The continuous cleaning apparatus can be constructed by combining a plurality of sets each comprising a mixing vessel to which cleaning water can be fed and a partition unit having a filtration function. The dispersion of toner particles is mixed with cleaning liquid when passing through the mixing vessel. The dispersion of toner particles mixed with the cleaning liquid is subjected to filtration by the partition unit having a filtration function, so that a filtrate is squeezed out of the particles. Thus, impurities contained in the dispersion of toner particles can be removed. The toner particle dispersion obtained by this cleaning method is subjected to filtration and drying, obtaining toner particles. Further, by adding other shell particles, the surface of the toner particles can be modified. In the step for modifying the surface of the toner particles (encapsulation step), the same vessel as the vessel used in the flocculation step may be used. The encapsulation step may be performed in a batch-wise manner, but may be performed in a continuous manner using the continuous reaction apparatus of the present invention. The operation conditions for the step may be the same as the operation conditions for the above-mentioned continuous flocculation step.

The vessel used in step (2) and the vessel used in step (3) may be either unified or different from each other. These vessels are preferably comprised of different vessels. Particularly, it is preferred that at least two or more vessels are connected in series. That is, it is preferred that the vessel used in step (2) and the vessel used in step (3) are connected in series. By virtue of such arrangement of the vessels, step (2) and step (3) can be clearly separated. Further, such arrangement of the vessels is preferred because the operation conditions for each step can be optimized. Even when the vessels in step (2) and step (3) are unified in respect of the form, it is preferred that step (2) and step (3) are performed in substantially different regions by appropriately selecting, for example, the partition, agitation conditions, or flow control. When step (1), step (2), and step (3) are performed individually in separate vessels, it is preferred that a withdrawal outlet for measuring and controlling the particle diameter is formed at the inlet or outlet of each vessel. Further, an apparatus for monitoring the viscosity in each vessel can be placed at the inlet or outlet of each vessel.

Thus, a toner for electrostatic image development having a relatively small particle diameter (for example, having a volume average particle diameter of 3 to 8 μm) can be produced. In addition, the thus obtained toner has a sharp particle size distribution and a sharp charge amount distribution, making it possible to improve the image quality and increase the speed of printing.

<External Additive>

Further, for controlling the fluidity and development properties, a known external additive may be added to the toner particles. As an external additive, for example, inorganic oxide particles (which are hydrophobicity-treated if necessary), such as silica, alumina, or titania, or vinyl polymer particles can be used. The amount of the external additive contained is preferably in the range of from 0.05 to 5 parts by weight, relative to the toner particles.

<Type of the Toner>

The toner for electrostatic image development produced by the apparatus of the present invention can be applied to, for example, a two-component developing agent, a single-component magnetic developing agent, such as a magnetite-containing toner, and a single-component nonmagnetic developing agent.

<Carrier>

When the toner is used as a two-component developing agent, a carrier to be mixed with the toner to form a developing agent is used. For example, a magnetic material, such as a known iron powder, ferrite, or magnetite carrier, can be used as a carrier. The above magnetic material having a resin coating on the surface, or a magnetic resin carrier can be used. As a resin coating the carrier, for example, a generally known styrene resin, acrylic resin, styrene-acryl copolymer resin, silicone resin, modified silicone resin, or fluororesin can be used, but the resin is not limited to these resins. With respect to the average particle diameter of the carrier, there is no particular limitation, but the average particle diameter of the carrier is preferably 10 to 200 μm. The amount of the carrier used is preferably 5 to 100 parts by weight, relative to 1 part by weight of the toner for electrostatic image development.

<Particle Diameter of the Toner for Electrostatic Image Development>

The particle diameter of the toner for electrostatic image development can be measured using a precision particle size distribution measurement apparatus Coulter Counter Multisizer II, manufactured by Beckman Coulter, Inc., at an aperture diameter of 100 mm. By the apparatus of the present invention, a toner having a volume average particle diameter (Dv) of 3 to 8 μm can be efficiently obtained. Therefore, the apparatus of the present invention is preferably used in the production of a toner for electrostatic image development having a volume average particle diameter of 3 to 8 μm. The apparatus of the present invention is further preferably used in the production of a toner having a volume average particle diameter of 4 to 8 μm. The apparatus of the present invention is especially preferably used in the production of a toner having a volume average particle diameter of 4 to 7 μm. A toner having too large a volume average particle diameter is not suitable for forming an image with high resolution. A toner having too small a volume average particle diameter is difficult to handle as a powder. A toner having too large a volume average particle diameter can be produced in a batch-wise manner without using the apparatus of the present invention. Therefore, it is unlikely that a toner having too large a volume average particle diameter obtains the above-mentioned effects of the present invention.

<Average Roundness of the Toner>

The average roundness of the toner is preferably 0.9 to 1, further preferably 0.92 to 0.99, especially preferably 0.94 to 0.98.

The "average roundness" can be determined using a value measured by Flow-type particle image analyzer FPIA-3000, manufactured by Sysmex Corporation, from the formula below. The "average roundness" is a roundness corresponding to 50% cumulative frequency based on the counts.

$$\text{Roundness} = (\text{Length of the circumference of the circle having the same area as the area of the projected image of particle})/(\text{Length of the circumference of the projected image of particle})$$

<Continuous Toner Production Apparatus 100>

Continuous toner production apparatus 100 comprising the continuous reaction apparatus of the present invention will be described in detail with reference to FIG. 7.

Continuous toner production apparatus 100 comprises a continuous mixing/dispersing section, a continuous flocculation section, and a continuous fusion section. The continuous mixing/dispersing section is a section for mixing together raw materials. The continuous flocculation section is a section comprised mainly of continuous flocculation reaction device 100. The continuous fusion section is a section comprised mainly of continuous fusion reaction device 200.

The continuous mixing/dispersing section comprises storage tanks for the individual raw materials, a constant delivery feed system for the raw materials, a temperature control system for controlling the temperature of liquid, and a mixing system for mixing the raw materials.

In the continuous mixing/dispersing section, the dispersion of polymer primary particles obtained by emulsion polymerization, or the dispersion of resin particles obtained by emulsifying a resin is transferred by constant delivery pump P10 from storage tank 101 to line cooler 104. Line cooler 104 is controlled by temperature controller T110. The particle dispersion is cooled to a target temperature by line cooler 104. The cooled particle dispersion is mixed successively with a wax dispersion, a pigment dispersion, and a charge control agent dispersion by in-line mixer P11. The mixture of these liquids mixed by in-line mixer P11 is fed to the continuous flocculation step. The wax dispersion is fed from wax dispersion storage tank 120 through pump P12 to in-line mixer P11. The pigment dispersion is fed from pigment dispersion storage tank 122 through pump P13 to in-line mixer P11. The charge control agent dispersion is fed from charge control agent dispersion storage tank 124 through pump P14 to in-line mixer P11. With respect to the order of mixing of the wax dispersion, pigment dispersion, and charge control agent dispersion, there is no particular limitation. Further, with respect to the types of these additives, there is no particular limitation.

The continuous flocculation section comprises continuous flocculation reaction device 100, temperature control systems T11 to T19, an addition system, and a measuring system. Continuous flocculation reaction device 100 comprises 10 mixing vessel units and 9 partition units, wherein the mixing vessel units and the partition units are alternately stacked on one another. Temperature control systems T11 to T19 are a system for controlling the temperature of each partition unit. The addition system is a system for adding a flocculant and a flocculation inhibitor so as to control flocculation of the particles. The measuring system is a system for measuring for the flocculate particles and measuring the temperature in the system.

The mixture fed from the continuous mixing/dispersing section is fed through inlet 106 at the lower portion of continuous flocculation reaction device 100 to first mixing vessel unit A11 of continuous flocculation reaction device 100. Simultaneously with this, a flocculant is fed from flocculant storage tank 130 through pump P15 to first mixing vessel unit A11. In first mixing vessel unit A11, the fed liquids are mixed with each other by the disc turbine blade. The resultant mixture is warmed by partition unit B11 capable of controlling the temperature by temperature controller T11. While warming the mixture, the mixture is passed through the passage hole formed in the center portion of partition unit B11. The mixture is fed by the feed-assisting agitating blade to second mixing vessel unit A12.

In second mixing vessel unit A12, the mixture is mixed by the disc turbine blade. Further, the mixture is warmed by partition unit B12 capable of controlling the temperature by temperature controller T12. While warming the mixture, the mixture is passed through the passage hole formed in the center portion of partition unit B12. The mixture is fed by feed-assisting agitating blade to third mixing vessel unit A13.

In third mixing vessel unit A13, the mixture is mixed by the disc turbine blade. Further, the mixture is warmed by partition unit B13 capable of controlling the temperature by temperature controller T13. While warming the mixture, the mixture is passed through the passage hole formed in the center portion of the partition unit B13. The mixture is fed by feed-assisting agitating blade to fourth mixing vessel unit A14.

In fourth mixing vessel unit A14, the mixture is mixed by the disc turbine blade. Further, the mixture is warmed by partition unit B14 capable of controlling the temperature by temperature controller T14. While warming the mixture, the mixture is passed through the passage hole formed in the center portion of partition unit B14. The mixture is fed by the feed-assisting agitating blade to fifth mixing vessel unit A15.

In fifth mixing vessel unit A15, the mixture is mixed by the disc turbine blade. Further, the mixture is warmed by partition unit B15 capable of controlling the temperature by temperature controller T15. While warming the mixture, the mixture is passed through the passage hole formed in the center portion of partition unit B15. The mixture is fed by the feed-assisting agitating blade to sixth mixing vessel unit A16.

The flocculate mixture sample withdrawn through the sampling port formed in the wall of fifth mixing vessel unit A15 is fed to particle diameter measurement apparatus S11 (Multisizer III). A flocculate particle diameter of the sample is measured by particle diameter measurement apparatus S11. Based on the results of the measurement, temperature controllers T14 and T15 are operated to control the temperature of the mixture. Thus, the flocculate particle diameter can be controlled. For example, when the particle diameter measured by particle diameter measurement apparatus S11 is smaller than the target, the temperatures set at temperature controllers T14 and T15 may be increased to promote the growth of the particles. Conversely, when the measured particle diameter is larger than the target, the temperatures set at temperature controllers T14 and T15 may be reduced to suppress the growth of the particles.

The mixture fed to sixth mixing vessel unit A16 is fed through the passage hole in the center portion of partition unit B16 to seventh mixing vessel unit A17. A shell agent fed by constant delivery pump P16 from shell agent storage tank 126 is added to the mixture being fed to seventh mixing vessel unit A17. The shell agent is added through the reagent feed pipe located in the passage hole in the center portion of partition unit B16. The flocculate mixture and the added shell agent are fed to seventh mixing vessel unit A17 while being mixed by the feed-assisting agitating blade.

In seventh mixing vessel unit A17, the mixture is mixed by the disc turbine blade. Further, the mixture is warmed by partition unit B17 capable of controlling the temperature by temperature controller T17. While warming the mixture, the mixture is passed through the passage hole formed in the center portion of partition unit B17. The mixture is fed by the feed-assisting agitating blade to eighth mixing vessel unit A18.

In eighth mixing vessel unit A18, the mixture is mixed by the disc turbine blade. Further, the mixture is warmed by partition unit B18 capable of controlling the temperature by temperature controller T18. While warming the mixture, the mixture is passed through the passage hole formed in the center portion of partition unit B18. The mixture is fed by the feed-assisting agitating blade to ninth mixing vessel unit A19.

The flocculate mixture sample withdrawn through the sampling port formed in the wall of eighth mixing vessel unit A18 is fed to particle diameter measurement apparatus S12 (Multisizer III). A flocculate particle diameter of the sample is measured by particle diameter measurement apparatus S12. Based on the results of the measurement, temperature controllers T17 and T18 are operated to control the temperature of the mixture. Thus, the flocculate particle diameter can be controlled. For example, when the particle diameter measured by particle diameter measurement apparatus S12 is smaller than the target, the temperatures set at temperature controllers T17 and T18 may be increased to promote the growth of the particles. Conversely, when the measured particle diameter is larger than the target, the temperatures set at temperature controllers T17 and T18 may be reduced to suppress the growth of the particles.

The mixture fed to ninth mixing vessel unit A19 is fed through the passage hole in the center portion of partition unit B19 to tenth mixing vessel unit A110. A flocculation inhibitor fed by constant delivery pump P17 from flocculation inhibitor storage tank 128 is added to the mixture being fed to tenth mixing vessel unit A110. The flocculation inhibitor is added through the reagent feed pipe located in the passage hole in the center portion of partition unit B19. The flocculation inhibitor comprises an emulsifying agent or electrolyte solution. The flocculate mixture and the added flocculation inhibitor are fed to tenth mixing vessel unit A110 while being mixed by the feed-assisting agitating blade.

The flocculate mixture mixed with a flocculation inhibitor in tenth mixing vessel unit A110 is fed by feed pump P21 from outlet 108 of the continuous flocculation step through the pipe having heat insulation to the continuous fusion step.

The continuous fusion section comprises continuous fusion reaction device 200, temperature control systems T21 to T29, a cooling system, and a measuring system. Continuous fusion reaction device 200 comprises 10 mixing vessel units and 9 partition units, wherein the mixing vessel units and the partition units are alternately stacked on one another. Temperature control systems T21 to T29 are a system for controlling the temperature of each partition unit. The cooling system is a cooling system for the particle dispersion after being fused. The measuring system is a system for measuring for the flocculate particles and measuring the temperature in the system.

The flocculate mixture fed from the continuous flocculation section is fed through inlet 202 at the lower portion of continuous fusion reaction device 200 to first mixing vessel unit A21 of continuous fusion reaction device 200. In first mixing vessel unit A21, the fed flocculate mixture is mixed by the disc turbine blade. The flocculate mixture is warmed by partition unit B21 capable of controlling the temperature by temperature controller T21. While warming the flocculate mixture, the flocculate mixture is passed through the passage hole formed in the center portion of partition unit B21. The flocculate mixture is fed by the feed-assisting agitating blade to second mixing vessel unit A22. While such mixing and heating operations are repeated, the flocculate mixture is fed to seventh mixing vessel unit A27. The flocculate mixture withdrawn through the sampling port formed in the wall of seventh mixing vessel unit A27 is fed to particle shape measurement apparatus S21 (FPIA3000). A particle diameter and a roundness of the sample are measured by particle shape measurement apparatus S21. Based on the results of the measurement, temperature controllers T27 to T29 or temperature controllers T21 to T26 are operated to control the roundness of the particles. For example, when the roundness measured by particle shape measurement apparatus S21 has reached the target, the temperatures set at temperature controllers T27 to T29 are reduced to set the temperature controllers in a cooling mode. When the roundness measured by particle shape measurement apparatus S21 is higher than the target, temperature controllers T27 to T29 are set in a quick cooling mode, simultaneously with reducing the temperatures set at temperature controllers T21 to T26 to control the rate of the formation of sphere. When the roundness measured by particle shape measurement apparatus S21 is lower than the target, the roundness is controlled by maintaining temperature controllers T27 to T29 in a heating mode so as to extend the fusion step.

The flocculate mixture discharged from tenth mixing vessel unit A210 is cooled by line cooler 204 and fed by feed pump P22 to the cleaning step.

Cleaning of the toner can be performed by a general means, for example, a belt filter, a filter press, centrifugal hydroextraction, or filtration under reduced pressure. Alternatively, the toner can be cleaned using a continuous cleaning apparatus comprising the continuous mixing vessel of the present invention shown in FIG. 7.

Figure 8:
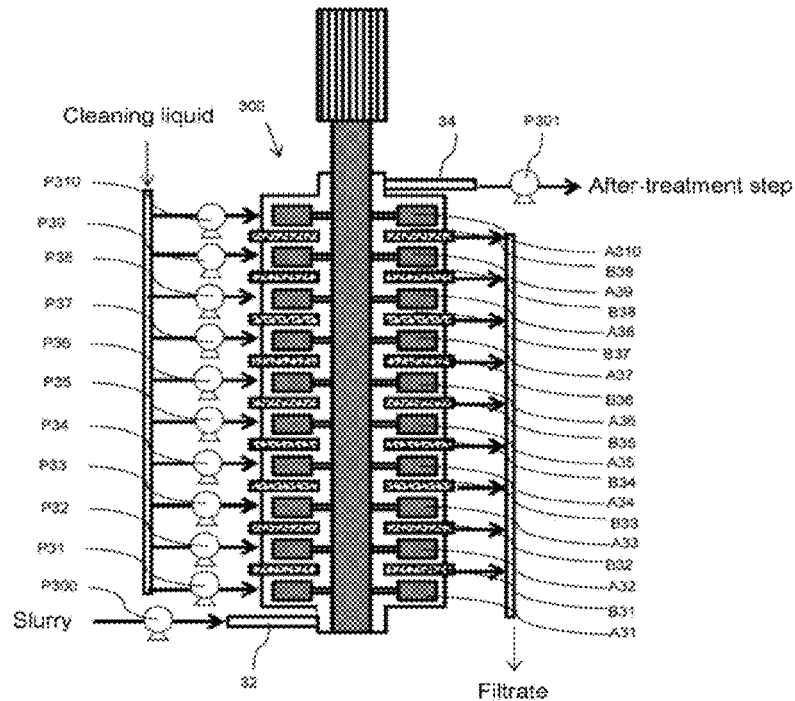
FIG. 8 A diagrammatic view of the continuous cleaning apparatus.

Hereinbelow, the continuous cleaning apparatus comprising the continuous reaction apparatus of the present invention will be described in detail with reference to FIG. 8.

The continuous cleaning section (continuous cleaning apparatus) comprises continuous cleaning apparatus 300, a cleaning water feed system, a filtrate withdrawal pipe, and a flow rate controller for particle dispersion. Continuous cleaning apparatus 300 comprises 10 mixing vessel units having a cleaning water inlet and 9 partition units having a both-side filter, wherein the mixing vessel units and the partition units are alternately stacked on one another.

The dispersion of toner particles fed from the continuous flocculation section is fed to first mixing vessel A31 by flow rate controller P300 comprised of a constant delivery pump. The toner particle dispersion is fed through inlet 32 formed in the bottom of continuous cleaning apparatus 300. The fed toner particle dispersion is mixed with cleaning water quantitatively fed by constant delivery pump P31 through the inlet formed in the wall of mixing vessel unit A31. Mixing is made by the disc turbine blade. The mixed liquid is subjected to filtration using a filter disposed in filtration partition unit B31. The resultant filtrate is discharged out of continuous cleaning system 300. The toner particle dispersion is fed through the passage hole formed in the center portion of filtration partition unit B31 to second mixing vessel unit A32. In the subsequent mixing vessel units A32 to A310, like mixing vessel unit A31, cleaning water is quantitatively fed from the inlet formed in each mixing vessel unit, simultaneously with filtration using the filters disposed in the filtration partition units on both sides of the mixing vessel units, and the resultant filtrate is discharged out of the system. The toner particle mixture cleaned by mixing vessel unit A310 is quantitatively fed by constant delivery pump P301 through withdrawal port 43 to the subsequent treatment step. In the continuous cleaning step for the toner, the flow rate of the toner particle dispersion is controlled by the flow rate controller, and, simultaneously, the flow rate of the cleaning liquid which has been used in cleaning is controlled by the constant delivery pump. The flow rate controller is disposed at the inlet or outlet for dispersion of the continuous cleaning system. As a result, the concentration of the toner particle dispersion can be controlled. Further, by controlling the flow rate of the cleaning liquid, a stable cleaning effect can be obtained. In the continuous cleaning apparatus for the toner, according to cleaning targets, such as an electrical conductivity of the dispersion, the number of the required units or the number of the continuous cleaning systems can be controlled.

Figure 9:
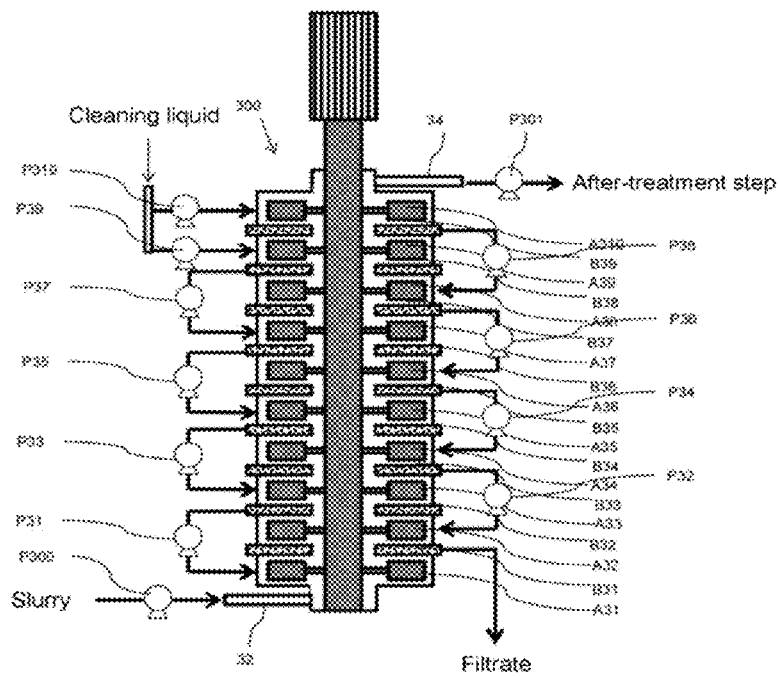
FIG. 9 A diagrammatic view of the continuous cleaning apparatus.

As shown in FIG. 9, continuous cleaning apparatus 310 is advantageous in that the filtrate discharged from a certain unit can be utilized as cleaning water for another unit positioned on the downstream side. By using such continuous cleaning apparatus 310, it is possible to reduce the amount of the cleaning water used.

The toner particle dispersion cleaned in the continuous cleaning section can be as such subjected to filtration, and then dried. Thus, toner matrix particles are obtained. By adding a shell agent to the toner particle dispersion, toner matrix particles having a core/shell structure in which the surface is coated with a shell agent can be formed. The apparatus used in the encapsulation step (coating step) for shell agent may be a reaction vessel in a batch-wise manner generally used, but the continuous reaction apparatus for flocculation of the present invention can be used. From the viewpoint of the production efficiency, the continuous reaction apparatus for flocculation of the present invention is preferably used.

The continuous reaction apparatus may be constructed by connecting a plurality of units having different functions in series. The continuous reaction apparatus may be constructed from a single system having a plurality of functions. The continuous reaction apparatus may be constructed by connecting a plurality of systems having different functions in series.

By using the continuous reaction apparatus of the present invention, all of or part of the toner production step can be continuously performed. Further, by changing the combination of a plurality of units having different functions, the simple and optimum continuous reaction apparatus can be constructed according to the purpose.

In the continuous reaction apparatus of the present invention, units having a smaller volume are used, and therefore the continuous reaction apparatus being compact and having the increased number of the mixing stages can be constructed. Thus, it is possible to subject the reaction mixture to uniform reaction.

In the continuous reaction apparatus of the present invention, by appropriately selecting the agitating blade, not only can the mixing efficiency be improved, but also the shearing force can be increased. The apparatus of the present invention can be applied to various continuous reaction processes. The apparatus of the present invention can be particularly preferably applied to a method for producing a toner by a wet process. The apparatus of the present invention can be preferably used in continuously performing the toner production process by an emulsion flocculation method.

Second Embodiment of the Present Invention

Hereinbelow, the continuous reaction apparatus of the present invention will be described in detail.

Figure 10:
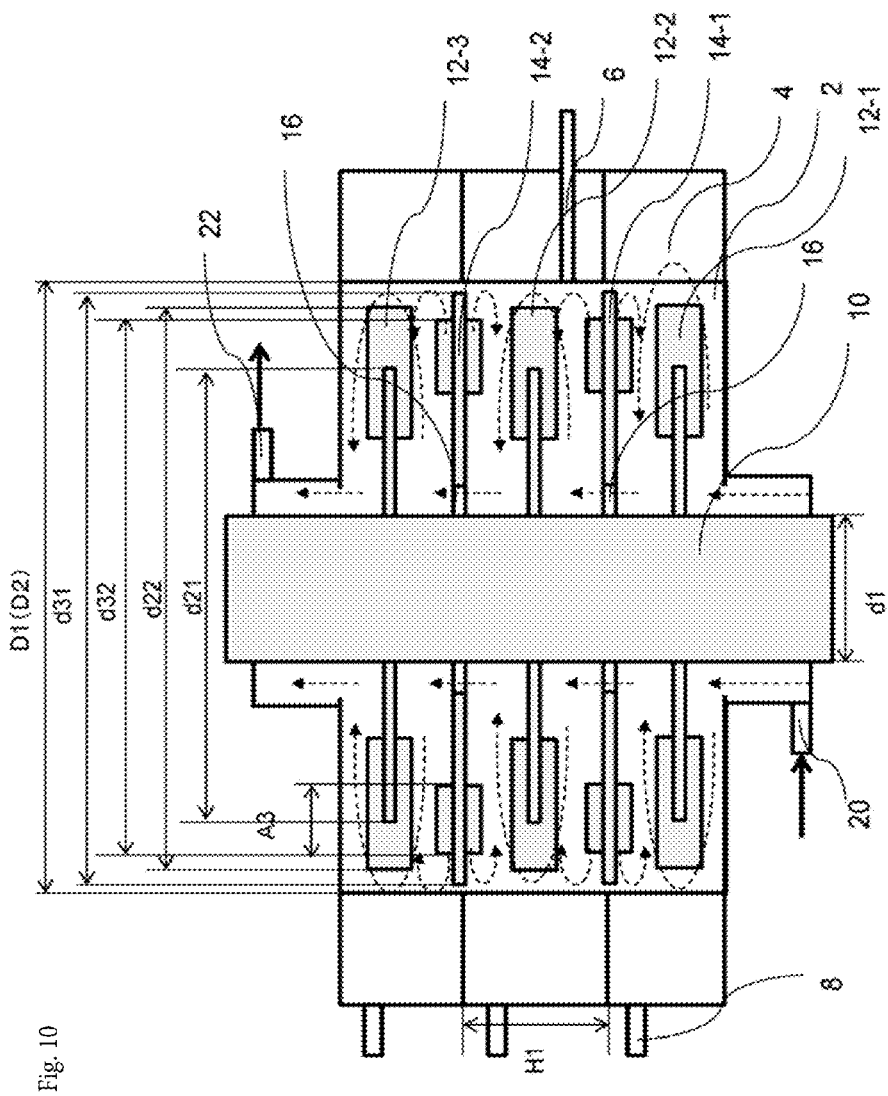
FIG. 10 A cross-sectional view of the continuous reaction apparatus.

FIG. 10 is a cross-sectional view of the continuous reaction apparatus.

Figure 11:
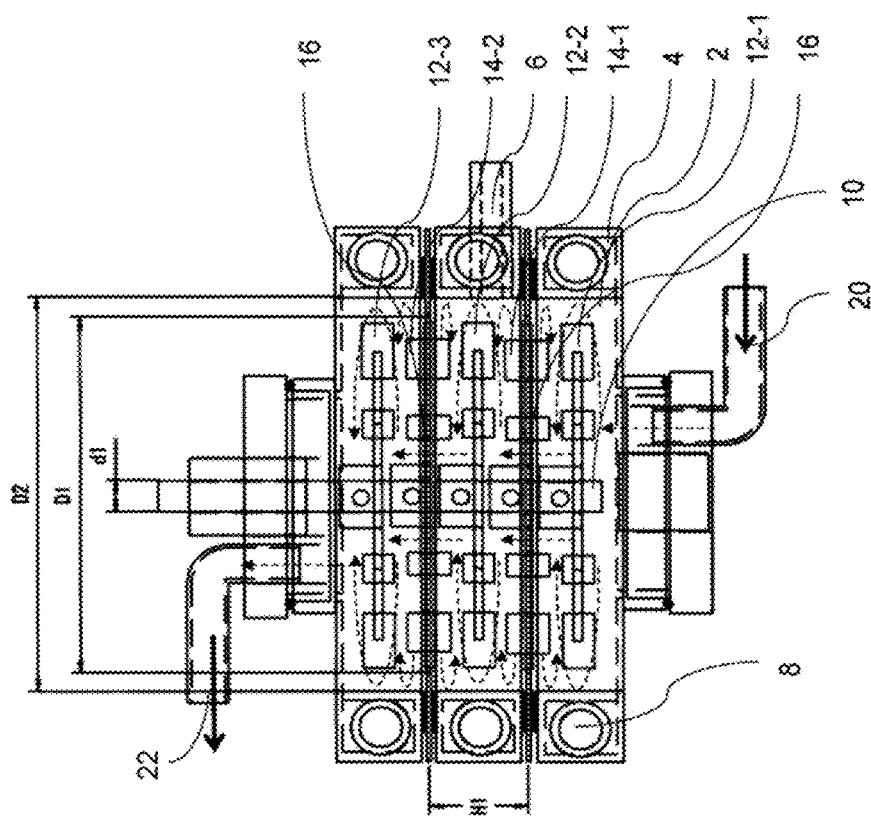
FIG. 11 A detailed cross-sectional view of the continuous reaction apparatus.

FIG. 11 is a detailed cross-sectional view of the continuous reaction apparatus.

Figure 12:
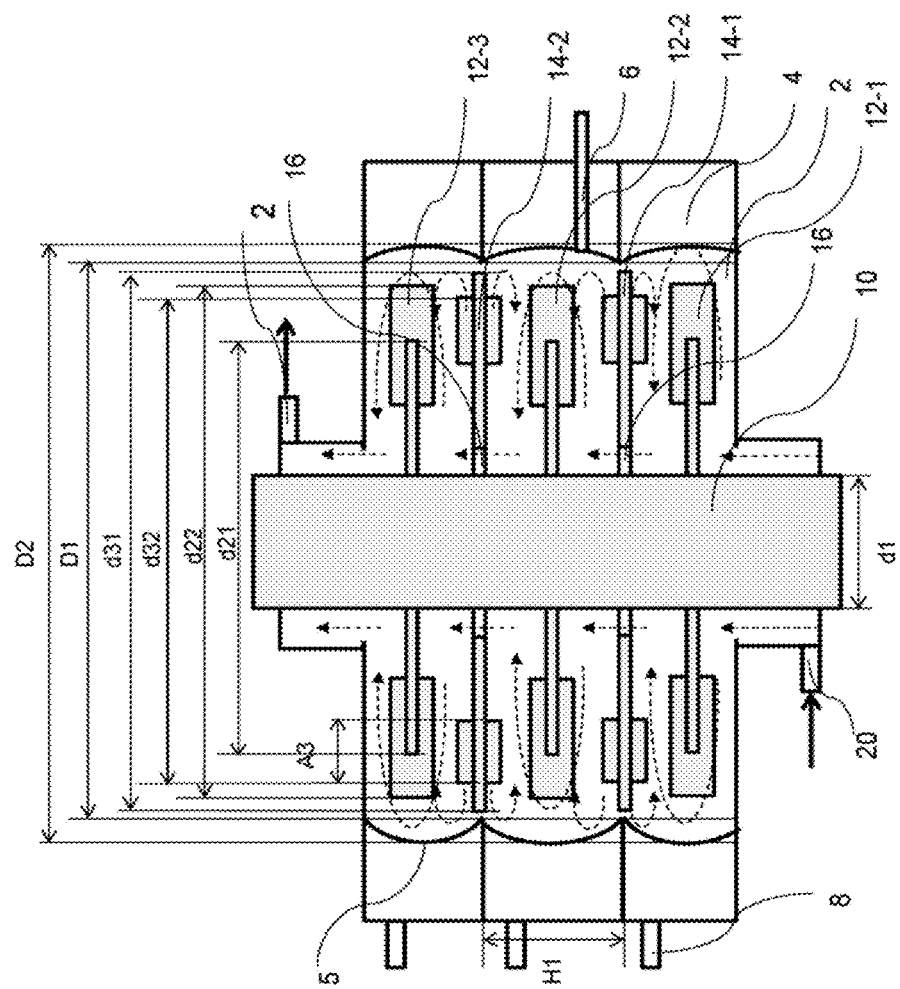
FIG. 12 A cross-sectional view of the continuous reaction apparatus.

FIG. 12 is a cross-sectional view of the continuous reaction apparatus.

Figure 13:
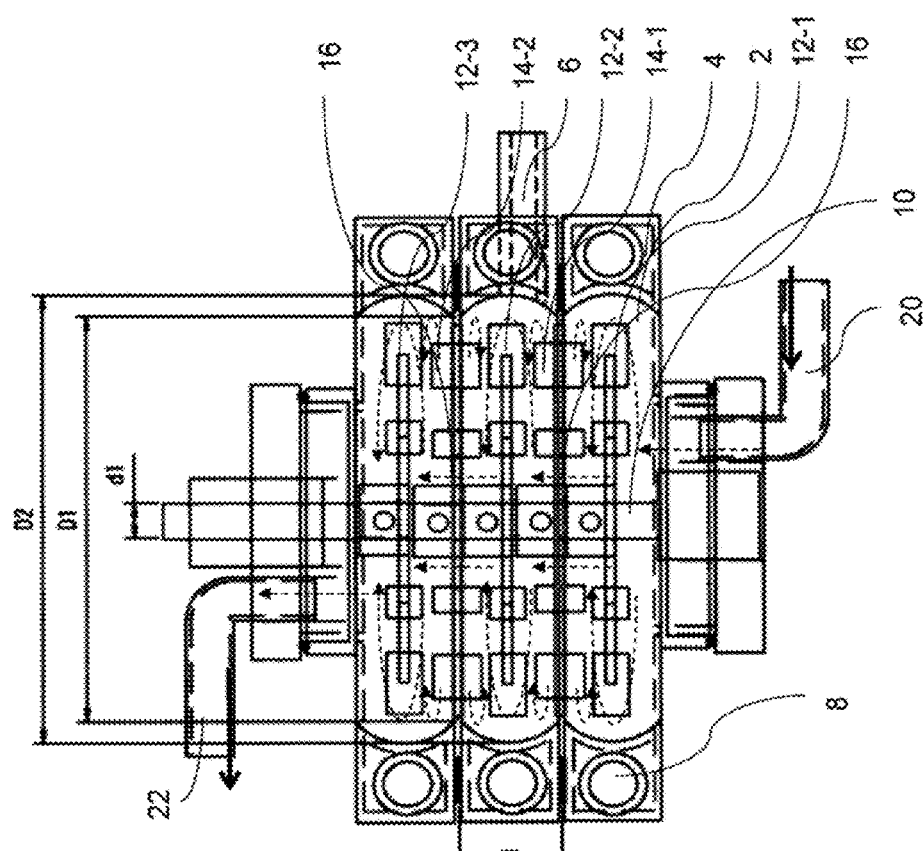
FIG. 13 A detailed cross-sectional view of the continuous reaction apparatus.

FIG. 13 is a detailed cross-sectional view of the continuous reaction apparatus.

Figure 14:
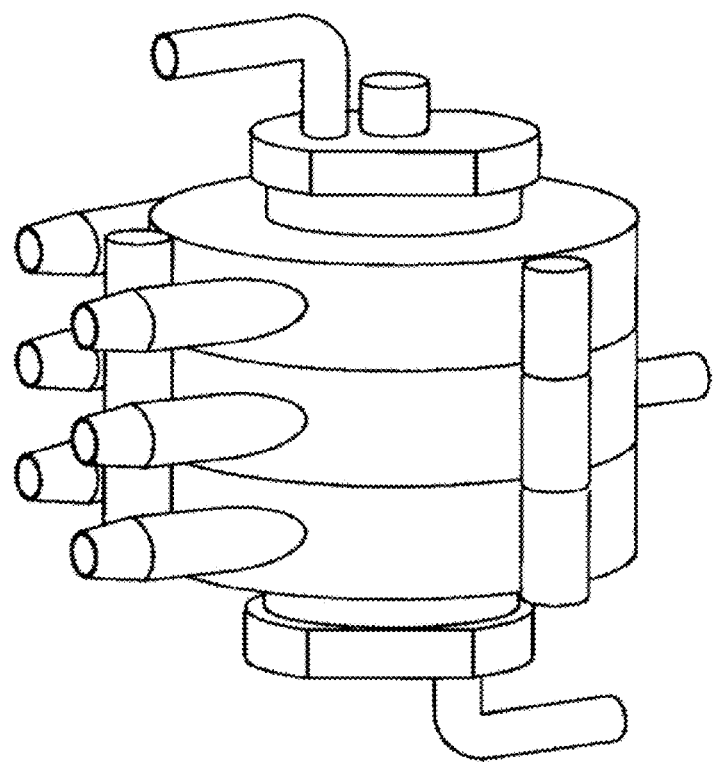
FIG. 14 A perspective view of the continuous reaction apparatus.

FIG. 14 is a perspective view of the continuous reaction apparatus.

Figure 15:
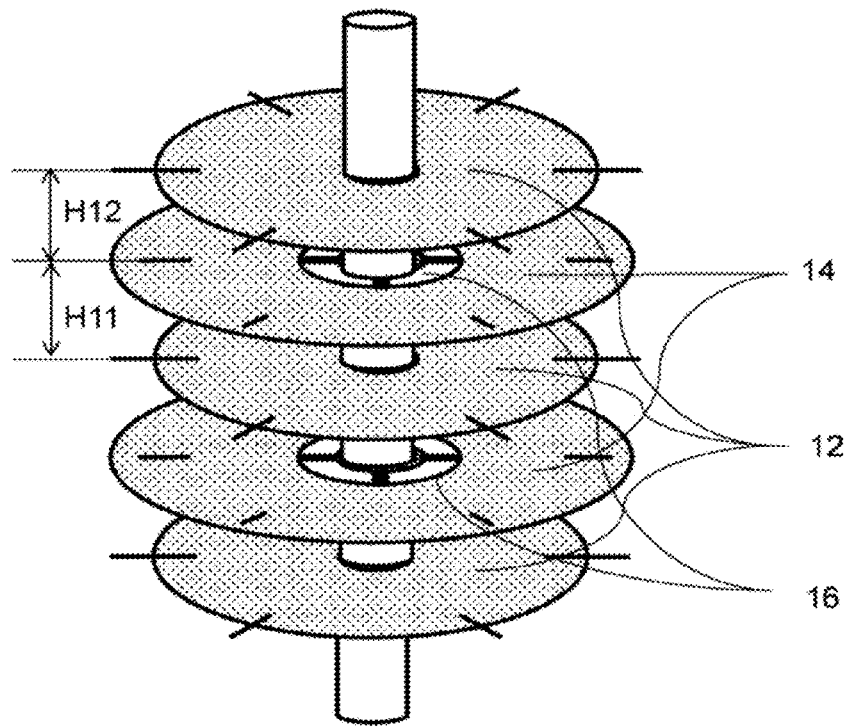
FIG. 15 A perspective view of the composite agitating blade.

FIG. 15 is a perspective view of the composite agitating blade.

Figure 16:
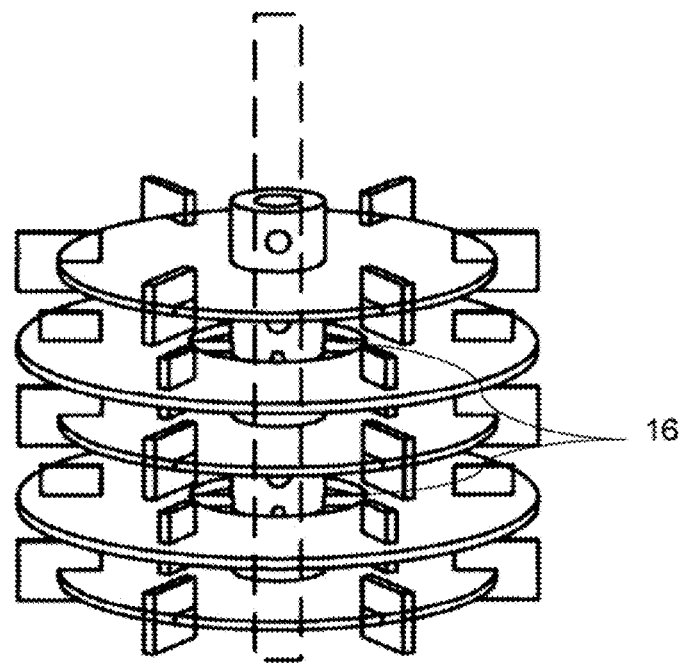
FIG. 16 A detailed perspective view of the composite agitating blade.

FIG. 16 is a detailed perspective view of the composite agitating blade.

Figure 17:
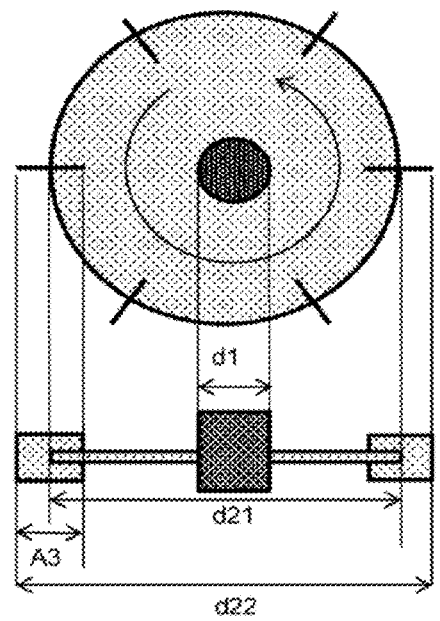
FIG. 17 A plain view and a cross-sectional view of the mixing blade.

FIG. 17 is a plain view and a cross-sectional view of the mixing blade.

Figure 18:
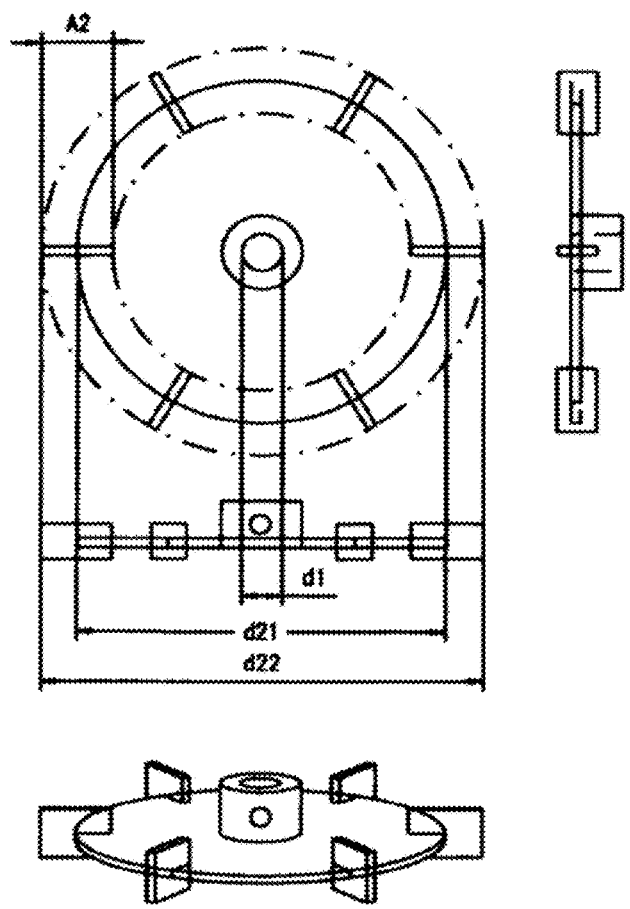
FIG. 18 A plain view, a cross-sectional view, and a perspective view of the mixing blade.

FIG. 18 is a plain view, a cross-sectional view, and a perspective view of the mixing blade.

Figure 19:
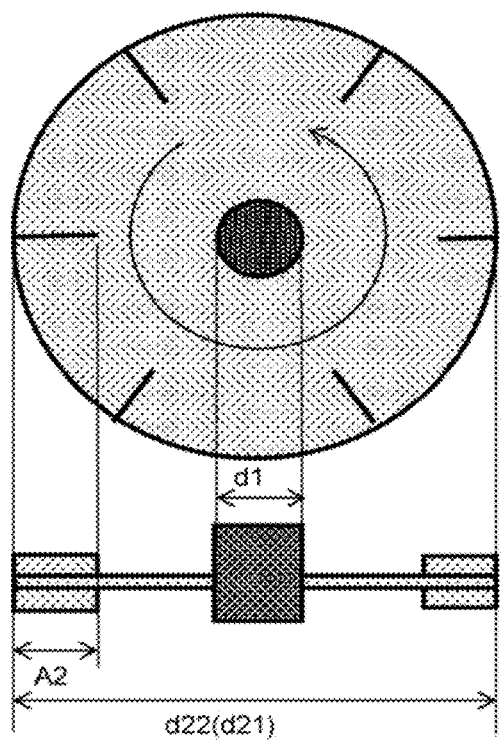
FIG. 19 A plain view and a cross-sectional view of the mixing blade.

FIG. 19 is a plain view and a cross-sectional view of the mixing blade.

Figure 20:
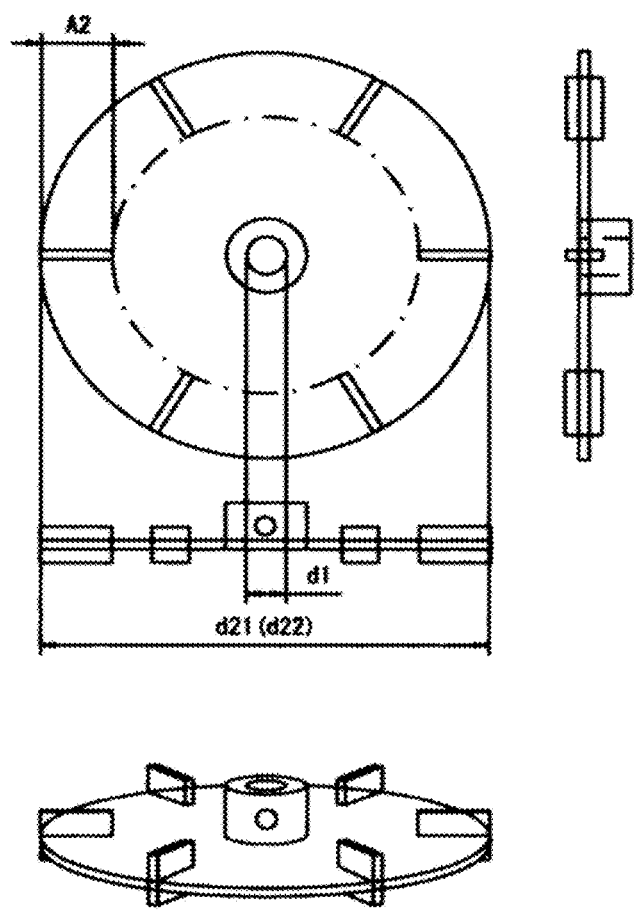
FIG. 20 A plain view, a cross-sectional view, and a perspective view of the mixing blade.

FIG. 20 is a plain view, a cross-sectional view, and a perspective view of the mixing blade.

Figure 21:
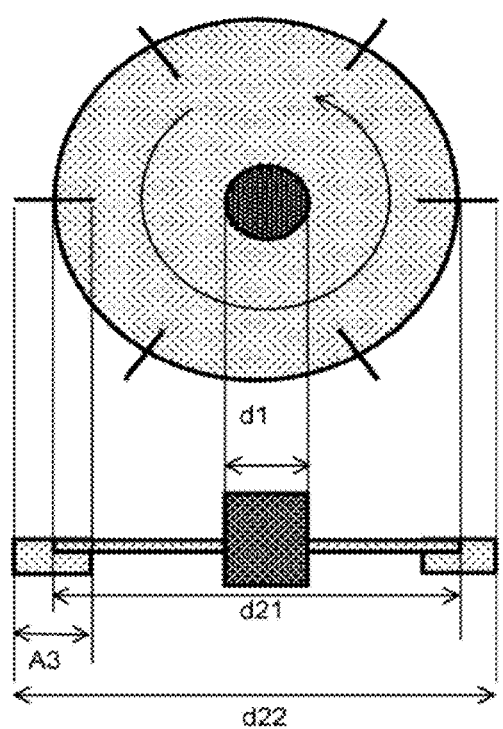
FIG. 21 A plain view and a cross-sectional view of the mixing blade.

FIG. 21 is a plain view and a cross-sectional view of the mixing blade.

Figure 22:
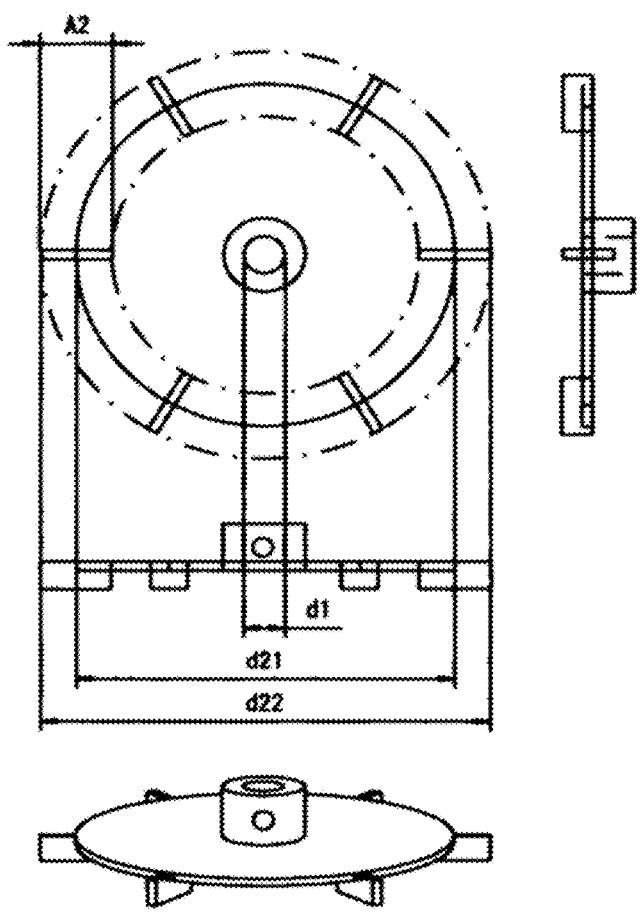
FIG. 22 A plain view, a cross-sectional view, and a perspective view of the mixing blade.

FIG. 22 is a plain view, a cross-sectional view, and a perspective view of the mixing blade.

Figure 23:
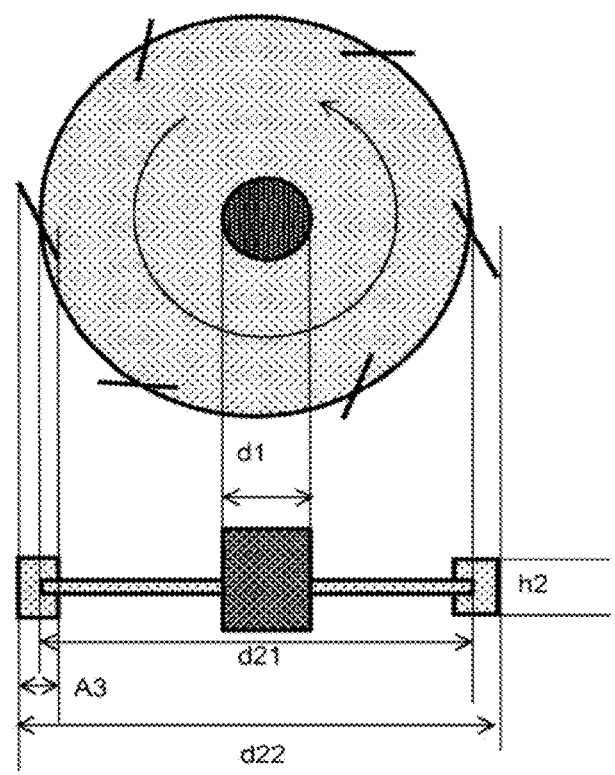
FIG. 23 A plain view and a cross-sectional view of the mixing blade.

FIG. 23 is a plain view and a cross-sectional view of the mixing blade.

Figure 24:
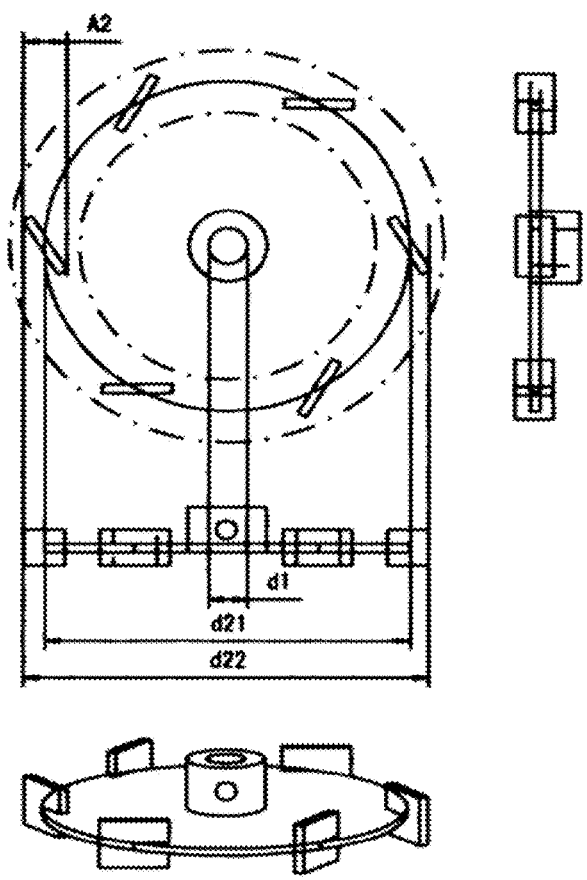
FIG. 24 A plain view, a cross-sectional view, and a perspective view of the mixing blade.

FIG. 24 is a plain view, a cross-sectional view, and a perspective view of the mixing blade.

Figure 25:
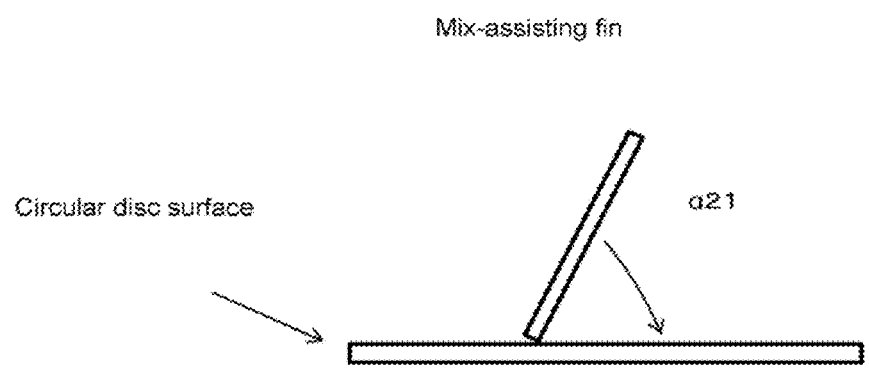
FIG. 25 An explanatory view illustrating angle 21 of the mix-assisting fin to the circular disc surface.

FIG. 25 is an explanatory view illustrating angle α21 of the mix-assisting fin to the circular disc surface.

Figure 26:
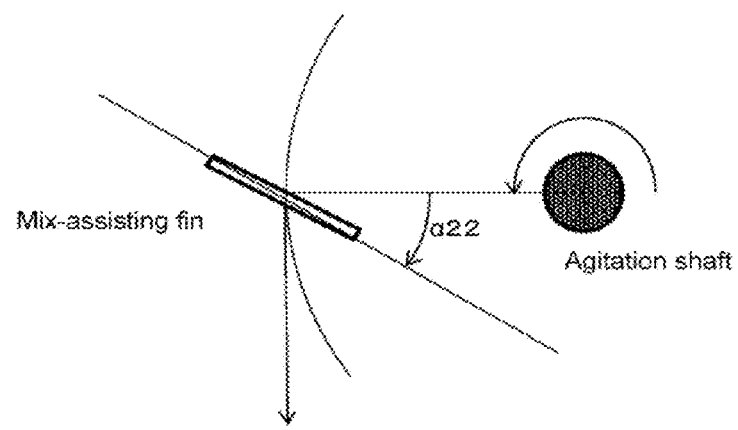
FIG. 26 An explanatory view illustrating angle 22 of the mix-assisting fin to the radial direction of the circular disc.

FIG. 26 is an explanatory view illustrating angle α22 of the mix-assisting fin to the radial direction of the circular disc.

Figure 27:
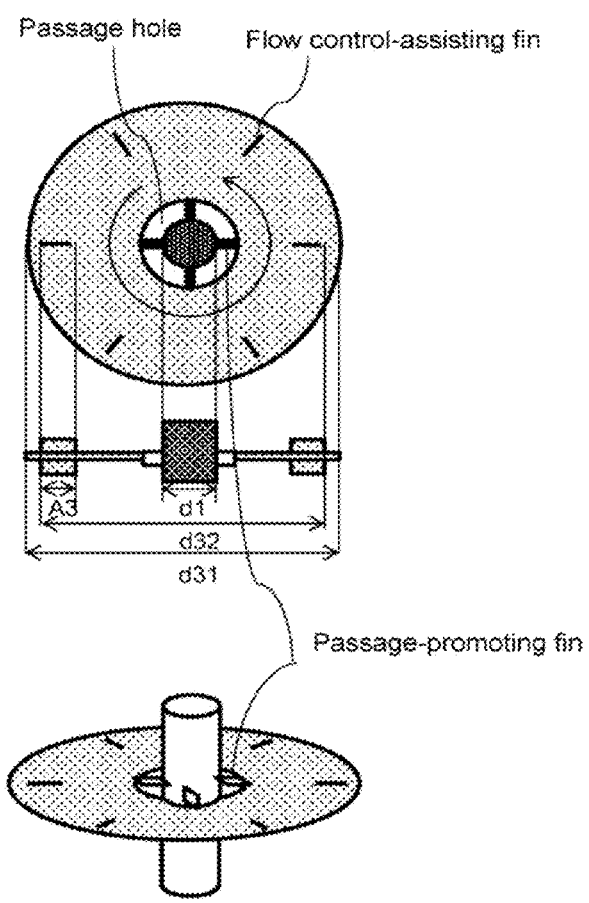
FIG. 27 A plain view, a cross-sectional view, and a perspective view of the passage blade.

FIG. 27 is a plain view, a cross-sectional view, and a perspective view of the passage blade.

Figure 28:
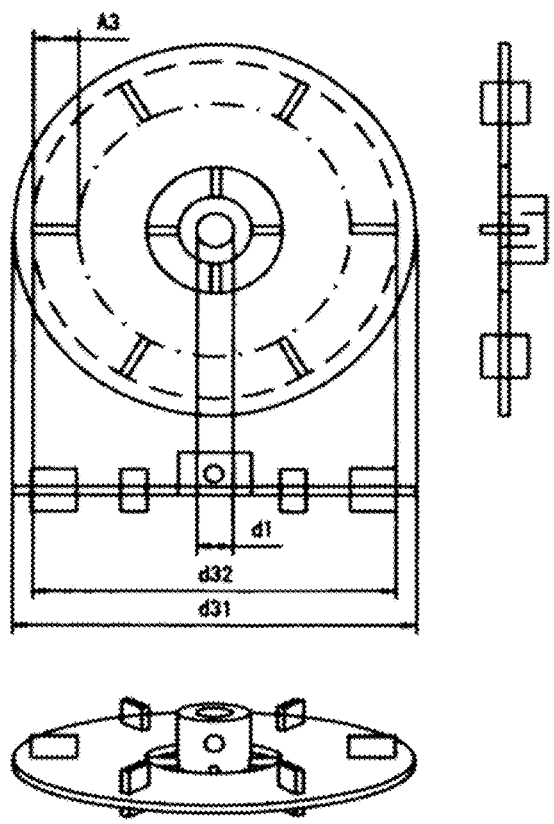
FIG. 28 A plain view, a cross-sectional view, and a perspective view of the passage blade.

FIG. 28 is a plain view, a cross-sectional view, and a perspective view of the passage blade.

Figure 29:
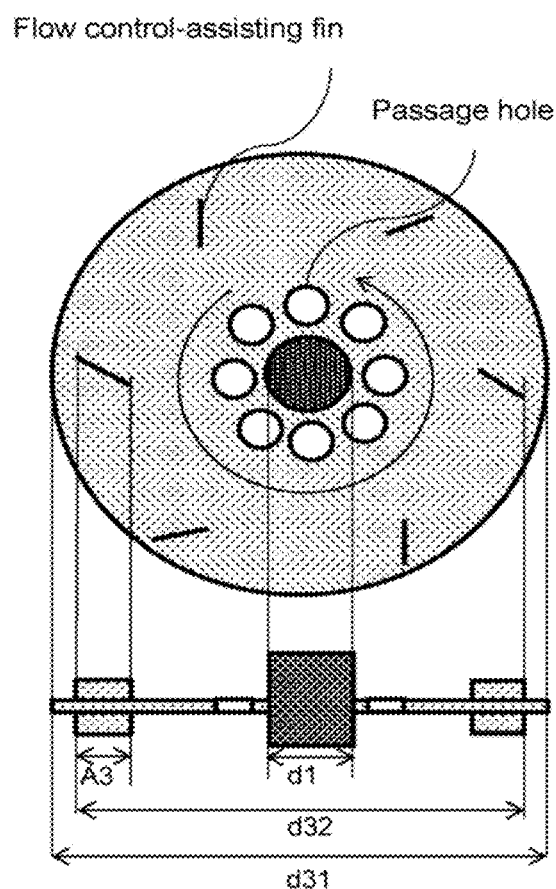
FIG. 29 A plain view and a cross-sectional view of the passage blade.

FIG. 29 is a plain view and a cross-sectional view of the passage blade.

Figure 30:
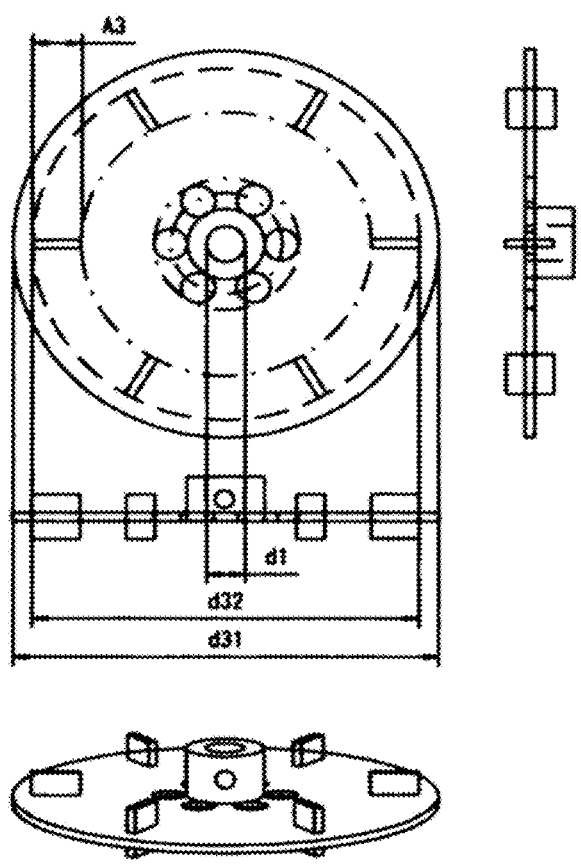
FIG. 30 A plain view, a cross-sectional view, and a perspective view of the passage blade.

FIG. 30 is a plain view, a cross-sectional view, and a perspective view of the passage blade.

Figure 31:
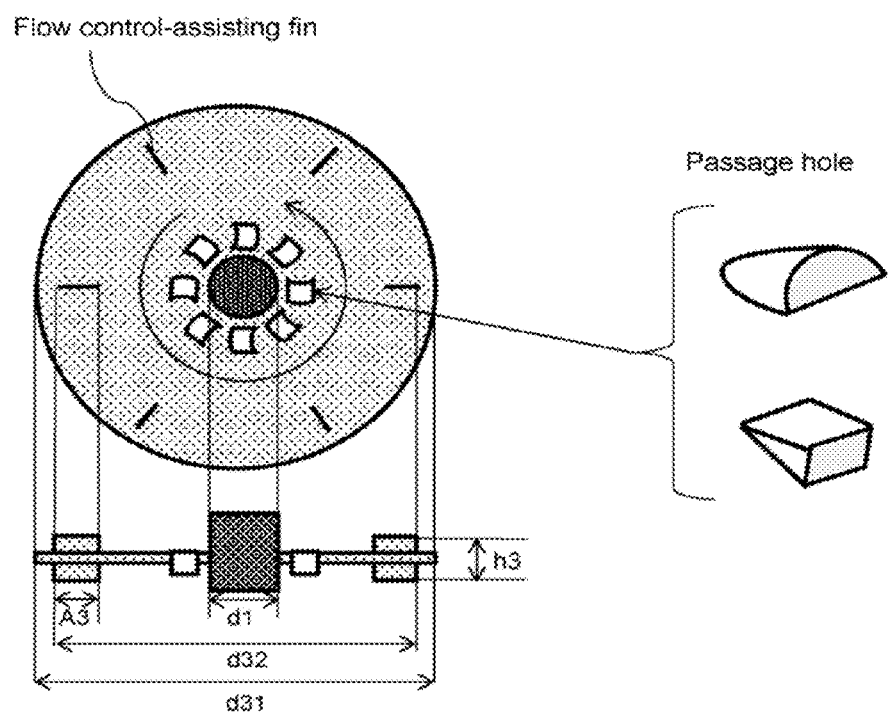
FIG. 31 A plain view and a cross-sectional view of the passage blade.

FIG. 31 is a plain view and a cross-sectional view of the passage blade.

Figure 32:
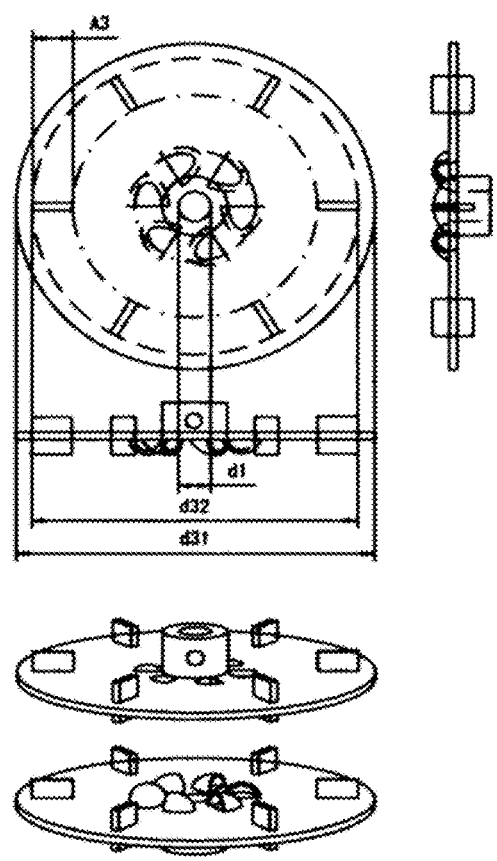
FIG. 32 A plain view, a cross-sectional view, and a perspective view of the passage blade.

FIG. 32 is a plain view, a cross-sectional view, and a perspective view of the passage blade.

Figure 33:
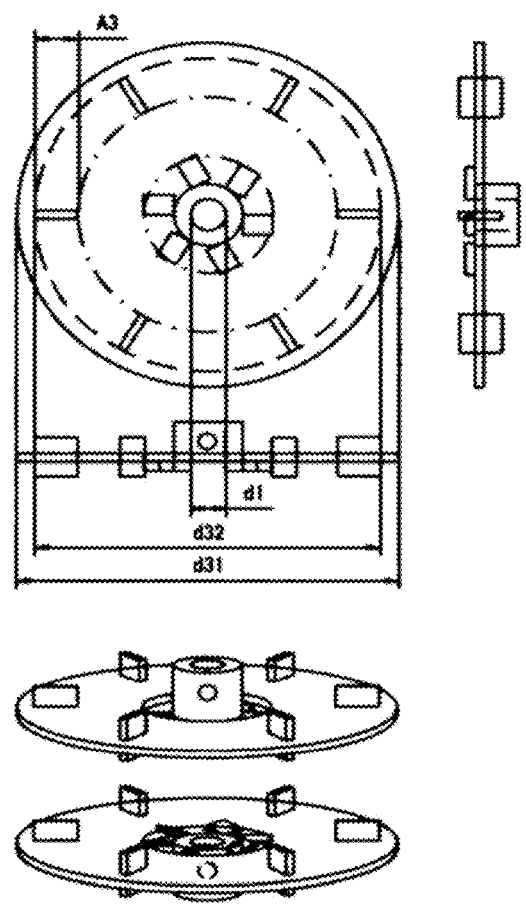
FIG. 33 A plain view, a cross-sectional view, and a perspective view of the passage blade.

FIG. 33 is a plain view, a cross-sectional view, and a perspective view of the passage blade.

Figure 34:
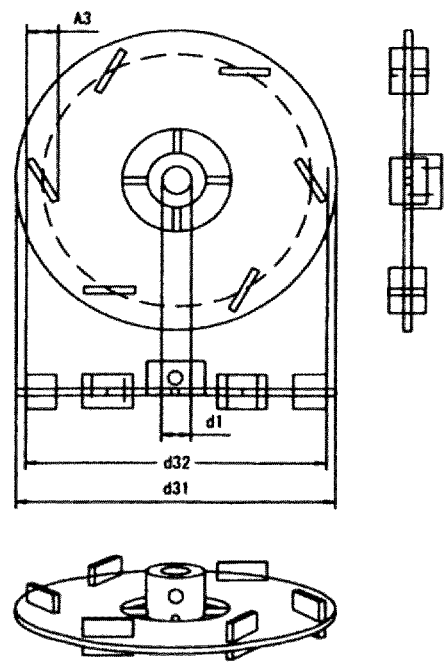
FIG. 34 A plain view, a cross-sectional view, and a perspective view of the passage blade.

FIG. 34 is a plain view, a cross-sectional view, and a perspective view of the passage blade.

Figure 35:
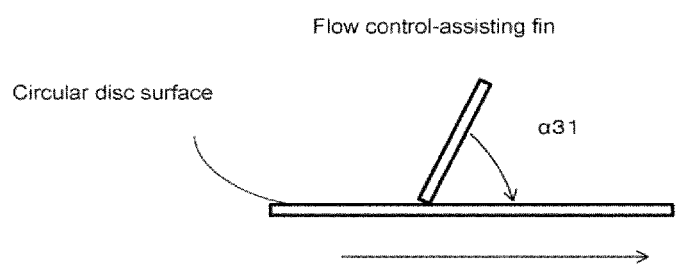
FIG. 35 An explanatory view illustrating angle $\alpha 31$ of the flow control-assisting fin to the circular disc surface.

FIG. 35 is an explanatory view illustrating angle α31 of the flow control-assisting fin to the circular disc surface.

Figure 36:
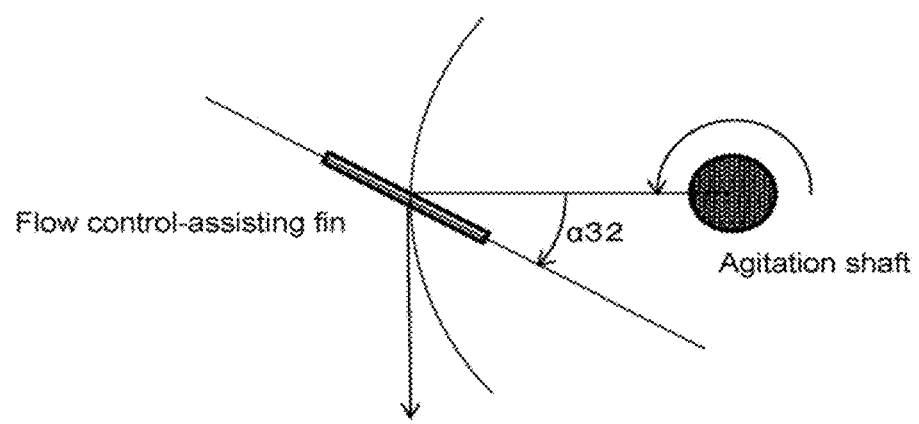
FIG. 36 An explanatory view illustrating angle $\alpha 32$ of the flow control-assisting fin to the radial direction of the circular disc.

FIG. 36 is an explanatory view illustrating angle α32 of the flow control-assisting fin to the radial direction of the circular disc.

Figure 37:
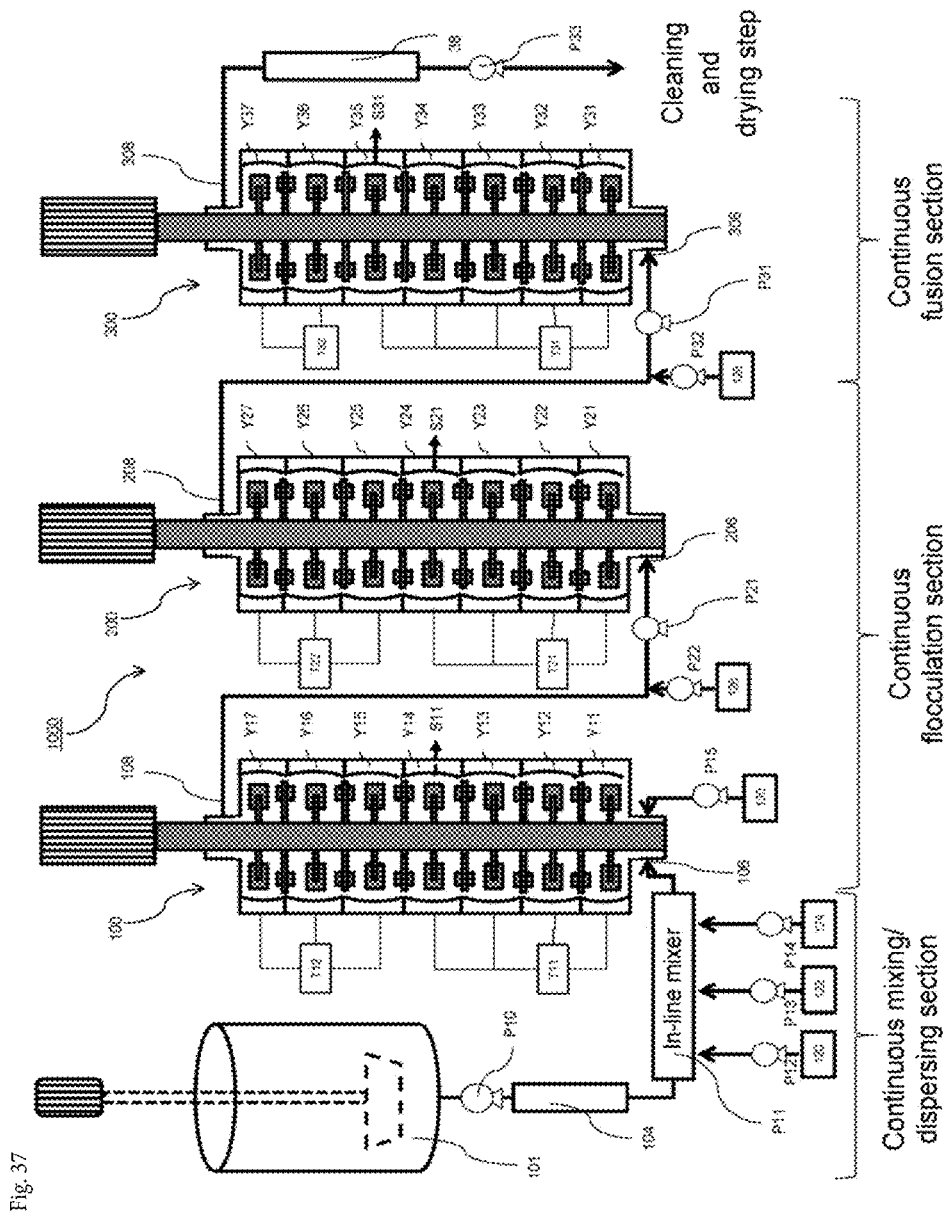
FIG. 37 A flow diagram for the continuous flocculation granulation system.

FIG. 37 is a flow diagram for the continuous flocculation granulation system.

As shown in FIGS. 10 to 34, the continuous reaction apparatus of the present invention comprises a cylindrical reaction vessel and a composite agitating blade. The composite agitating blade comprises two types of circular disc-type agitating blades which are classified depending on whether or not the blade has a passage hole. The two types of circular disc-type agitating blades are alternately stacked on one another.

The circular disc-type agitating blades are classified into two types depending on whether or not the blade has a passage hole near a connecting portion of the blade to the agitation shaft. In the following description, the circular disc-type agitating blade having a passage hole is frequently referred to as "passage blade", and the circular disc-type agitating blade having no passage hole is frequently referred to as "mixing blade".

The composite agitating blade is described in detail below.

As shown in FIGS. 10 to 13, the continuous reaction apparatus of the present invention has a composite agitating blade. The composite agitating blade has an agitation shaft. Passage blade 14 and mixing blade 12 in the state of being alternately stacked on one another are fitted to the agitation shaft. By virtue of these two types of circular disc-type agitating blades, the path of flow of the liquid to be mixed continuously flowing the reaction vessel can be controlled. Consequently, the stable mixing time and mixing effect can be secured.

The most basic construction of the composite agitating blade in the present invention is a construction in which one passage blade 14 is disposed between two mixing blades 12. The number of the circular disc-type agitating blades constituting the composite agitating blade can be appropriately selected according to the height of the reaction vessel in the continuous reaction apparatus. The number of the circular disc-type agitating blades is not limited. For improving the controlling properties for the path of flow of the reaction mixture and the mixing uniformity, it is preferred that the number of the circular disc-type agitating blades disposed is larger. The number of the circular disc-type agitating blades is preferably 3 or more.

A distance between adjacent passage blades 14 is taken as H1 (see FIG. 12).

A distance between adjacent mixing blade 12 and passage blade 14 along the flow direction of the liquid to be mixed (reaction mixture) is taken as H11 (see FIG. 15).

A distance between adjacent passage blade 14 and mixing blade 12 along the flow direction of the liquid to be mixed (reaction mixture) is taken as H12 (see FIG. 15).

For surely obtaining a longer path for mixing and mixing uniformity, it is preferred that H1 is smaller than maximum inner diameter D2 of the reaction vessel.

For making more uniform the volumes of agitation spaces between the adjacent blades, it is preferred that passage blades 14 and agitating blades 12 are disposed at equal intervals. A difference between distance H11 and distance H12 is preferably as small as possible, and it is more preferred that distance H11 and distance H12 are the same.

The circular disc-type agitating blade having no passage hole (mixing blade) is described in detail below.

As shown in FIGS. 17 to 24, the circular disc-type agitating blade having no passage hole (mixing blade) is an agitating blade for mixing. Like a disc turbine, a blade turbine, or a disperser, this agitating blade has a plurality of mix-assisting fins vertically set on the outer periphery of the circular disc. By virtue of this agitating blade, high mixing effect and high shearing effect can be achieved.

For improving the mixing effect, it is preferred that the mix-assisting fins are disposed on the outer periphery of the circular disc.

It is preferred that, when the outer diameter of the circular disc is taken as d21 and the outer diameter of the agitation shaft is taken as d1, the mix-assisting fins are located outside a circle having a radius of (d21+d1)/4 on the circular disc.

Further, the mix-assisting fins may be disposed inside the outer periphery on the circular disc. For further improving the agitation efficiency, the mix-assisting fins may be disposed in the region outside the outer periphery on the circular disc. When the turning diameter of the edges of the mix-assisting fins symmetrically placed on the circular disc is taken as d22, outer diameter d21 of the circular disc is preferably equal to or less than d22.

With respect to the form of the mix-assisting fin, there is no particular limitation. The form of the mix-assisting fin is preferably a flat plate form or a roof tile form for applying a satisfactory shearing force to the liquid to be mixed.

As shown in FIG. 25, angle $\alpha 21$ of the mix-assisting fin to the circular disc surface in the direction of rotation is preferably 45° or more, most preferably 90°.

As shown in FIG. 26, the flow of the liquid to be mixed can be controlled by appropriately selecting angle $\alpha 22$ of the mix-assisting fin to the radial direction of the circular disc (segment of a line connecting the center of the agitation shaft and the center of the mix-assisting fin). For example, when angle $\alpha 22$ is 0 to 90°, the liquid to be mixed tends to flow outside the mix-assisting fin. On the other hand, when angle $\alpha 22$ is 90 to 180°, the liquid to be mixed tends to flow inside the mix-assisting fin.

It is preferred that the mix-assisting fins are disposed at equal intervals on the outer periphery of one surface of the circular disc. The number of the mix-assisting fins disposed is preferably 4 or more, more preferably 6 or more. When the number of the mix-assisting fins disposed is reduced, there is a danger that the agitation effect becomes poor. Conversely, when the number of the mix-assisting fins disposed is increased, the contact resistance of the fins with the liquid to be mixed is increased. In this case, the liquid to be mixed is likely to stay between the adjacent mix-assisting fins, causing the mixing to be nonuniform. Therefore, the number of the mix-assisting fins disposed is preferably 14 or less, more preferably 10 or less.

The mix-assisting fins may be symmetrically placed on both sides of the circular disc, but may be asymmetrically placed. For example, with respect to the mix-assisting fins placed on both sides of the circular disc, by appropriately selecting the form, position, and angle, the flow around the outer periphery of the circular disc can be controlled.

The circular disc-type agitating blade having a passage hole (hereinafter, frequently referred to as "passage blade") is described in detail below.

As shown in FIGS. 27 to 34, the passage blade has a circular disc and an agitation shaft. A passage hole through which the liquid to be mixed can pass is formed near a connecting portion of the circular disc to the agitation shaft. The liquid to be mixed can pass through the passage hole formed in the substantially central portion of the circular disc and move from the surface side of the passage blade toward the back side. Further, flow control-assisting fins are disposed near the outer periphery of both sides of the circular disc of the passage blade. The flow of the liquid to be mixed along the surface of the circular disc can be controlled by the flow control-assisting fin. The occurrence of short-pass of the liquid to be mixed flowing along both surfaces of the passage blade can be prevented by the flow control-assisting fin.

For further increasing the circumferential velocity upon rotation, it is preferred that the flow control-assisting fin is located near the outer periphery of the circular disc. By locating the flow control-assisting fin near the outer periphery of the circular disc, a flow parallel to the surface of the circular disc can be generated. Thus, the liquid to be mixed can be more efficiently fed from the surface side of the passage blade toward the back side.

It is preferred that, when the outer diameter of the circular disc of the passage blade is taken as d31 and the outer diameter of the agitation shaft is taken as d1, the flow control-assisting fin is located outside a circle having a radius of (d31+d1)/4 on both sides of the circular disc.

For more stably generating a flow parallel to the surface of the circular disc, it is preferred that the flow control-assisting fin is located within the surface of the circular disc. Specifically, when the turning diameter of the edges of the flow control-assisting fins symmetrically placed on both sides of the circular disc is taken as d32 and the outer diameter of the circular disc is taken as d31, it is preferred that turning diameter d32 is equal to or less than d31.

With respect to the form of the flow control-assisting fin, there is no particular limitation as long as the liquid to be mixed can be satisfactorily fed along the surface of the circular disc. The form of the flow control-assisting fin is preferably a flat plate form or a roof tile form.

As shown in FIG. 35, angle α31 of the flow control-assisting fin to the surface of the circular disc in the direction of rotation is preferably 45 to 90°. When angle α31 is in the above range, a flow parallel to the surface of the circular disc can be promoted to improve the discharge efficiency. For further improving the discharge efficiency in the parallel direction, the form of the flow control-assisting fin is preferably a roof tile form.

As shown in FIG. 36, the flow control-assisting fin may be disposed along the radial direction of the circular disc, but may be disposed at a certain angle to the radial direction of the circular disc. Angle α32 of the flow control-assisting fin to the radius of the circular disc (segment of a line connecting the center of the agitation shaft and the center of the flow control-assisting fin) is preferably 0 to 90°. When angle α32 is 0 to 90°, a flow of the liquid to be mixed toward the outside of the circular disc can be efficiently generated. Especially, when angle α32 is 45° or more, a flow of the liquid toward the outside of the circular disc can be more efficiently generated.

It is preferred that the flow control-assisting fins are symmetrically placed on the outer periphery of one surface of the circular disc. The number of the flow control-assisting fins disposed is preferably 4 or more, more preferably 6 or more. When the number of the flow control-assisting fins disposed is less than 4, the parallel flow generated from the ends of the passage blades is likely to be uneven. Further, when the number of the flow control-assisting fins disposed is less than 4, there is a danger that short-pass of the liquid to be mixed on both surfaces of the passage blade is likely to occur. Conversely, when the number of the flow control-assisting fins disposed is increased, the contact resistance of the fins with the liquid to be mixed is increased. In this case, the liquid to be mixed is likely to stay between the adjacent flow control-assisting fins, causing the mixing to be nonuniform, and thus the generation of a deposit on the surface of the circular disc is likely to occur. Therefore, the number of the flow control-assisting fins disposed is preferably 18 or less, more preferably 14 or less.

It is preferred that the flow control-assisting fins are symmetrically placed on both sides of the circular disc. In this case, a flow in a transverse direction on both sides of the circular disc can be evenly generated.

The passage hole is described in detail below.

The passage hole is preferably formed in a position close to the center portion of the circular disc. Specifically stated, it is preferred that, when the outer diameter of the agitation shaft is taken as d1 and the outer diameter of the circular disc-type agitating blade having a passage hole is taken as d31, the passage hole is formed inside a circle having a radius of (d31+d1)/4 on the surface of the circular disc.

When the passage hole is formed outside the above region, the path of flow of the liquid to be mixed is reduced, and therefore there is a danger that retention of the mixture is caused and further the mixing is nonuniform.

It is preferred that the passage hole is formed in a position very close to the agitation shaft or in a position in contact with the agitation shaft. It is preferred that the passage hole is formed evenly around the agitation shaft. Taking into consideration the strength of connection between the circular disc and the agitation shaft, at least one or more connecting portions between the agitation shaft and the circular disc need to be secured around the agitation shaft.

With respect to the shape of the passage hole, there is no particular limitation, but it is preferred that the strength of connection between the circular disc and the agitation shaft is secured.

As shown in FIGS. 27 and 28, the shape of the passage hole may be a doughnut shape which is a circle surrounding the agitation shaft. The shape of the passage hole may be a shape having a connecting rod connecting the agitation shaft and the circular disc.

As shown in FIGS. 29 and 30, the shape of the passage hole may be a shape of a plurality of circles arranged in a ring form around the agitation shaft. The shape of the passage hole may be a shape of a plurality of arches arranged in a ring form around the agitation shaft.

As shown in FIG. 31, the shape of the passage hole may be an uneven shape.

As shown in FIG. 32, the passage hole may be provided with a passage-promoting fin. By providing the passage hole with a passage-promoting fin, an effect of promoting the flow of the liquid to be mixed and preventing the back flow of the liquid can be obtained.

By disposing the circular disc-type agitating blades having a passage hole (passage blades), almost all the liquid to be mixed moves between the circular disc-type agitating blades through the passage holes. Thus, it is possible to more precisely control the path of flow of the liquid to be mixed.

The continuous reaction apparatus is described in detail below.

As shown in FIGS. 10 to 13, the continuous reaction apparatus of the present invention has inlet 20 and withdrawal outlet 22 for the liquid to be mixed at both ends of the cylindrical reaction vessel near the agitation shaft. A jacket structure for temperature control is formed outside the continuous reaction apparatus. The jacket structure, if necessary, is divided into several chambers, enabling more precise temperature control.

The reaction vessel may be either of a single structure or comprised of a plurality of units. For facilitating control of the height of the reaction vessel according to the continuous mixing time, a mixing vessel unit system is preferred. The mixing time can be precisely controlled by changing the number of the mixing vessel units.

The inside of the reaction vessel may be of a cylindrical form having a flat inner wall as shown in FIG. 10, or of an uneven structure like inner wall 5 shown in FIG. 12.

As shown in FIG. 12, the reaction vessel may have an uneven structure comprising inner wall 5 having a plurality of expanding ring structures. Such a structure is more preferred especially when the end of the passage blade and the convex portion of inner wall 5 of the reaction vessel are set at the same height because an effect of preventing the occurrence of short-pass of the liquid to be mixed on both surfaces of the passage blade can be obtained.

In the continuous reaction apparatus, it is preferred that minimum inner diameter D1 of the reaction vessel, maximum inner diameter D2 of the reaction vessel, outer diameter d31 of the circular disc-type agitating blade having a passage hole (passage blade), and outer diameter d21 of the circular disc-type agitating blade having no passage hole (mixing blade) satisfy the following formulae (1), (2), (3), and (4).

$$0.99D1 \geq d31 \geq 0.8D1 \quad (1)$$

$$0.99D2 \geq d21 \geq 0.7D2 \quad (2)$$

$$d31 \geq d21 \quad (3)$$

$$D1 \geq 0.8D2 \quad (4)$$

When the requirement of the formula (1) is satisfied, the gap between the passage blade and the inner wall of the reaction vessel is reduced, so that the occurrence of short-pass of the mixture on both surfaces of the passage blade can be more effectively prevented.

When the requirement of the formula (2) is satisfied, a stable path of flow of the liquid to be mixed can be secured near the mixing blade.

When the requirement of the formula (3) is satisfied, the composite agitating blade comprising the mixing blade and the passage blade can be directly placed in and removed from the reaction vessel. In this case, the placement and maintenance of the composite agitating blade are facilitated.

When the requirement of the formula (4) is satisfied, a certain turning radius of the circular disc-type agitating blade (passage blade) can be secured, and therefore the occurrence of short-pass of the liquid at the end of the passage blade can be more effectively prevented.

The continuous reaction apparatus may be either of a vertical type or of a horizontal type. Taking easiness of the placement and maintenance into consideration, a vertical type is preferred. Further, in the case of a vertical type, there is an advantage in that the area in which the apparatus is placed can be reduced. With respect to the setting angle of the continuous reaction apparatus, the apparatus may slope at an angle in the range of from the right angle to 40 degrees to the horizontal.

With respect to the flow direction of the liquid to be mixed, there is no particular limitation. However, when the continuous reaction apparatus is of a vertical type, it is preferred that the liquid flows from the lower portion toward the upper portion.

With respect to the material for the continuous reaction apparatus, there is no particular limitation, but the inner surface of the reaction vessel is preferably substantially stainless steel and/or glass. Particularly, the inner surface of the reaction vessel is preferably smooth stainless steel and/or glass. When the inner surface of the reaction vessel is the above-mentioned material, it is possible to prevent, for example, the component fed or reaction product from depositing on the wall surface of the vessel.

The continuous reaction apparatus comprising a composite agitating blade and a reaction vessel is described below (see FIGS. 12 and 13). The composite agitating blade comprises two types of circular disc-type agitating blades (a mixing blade and a passage blade). The reaction vessel has an inner wall of an uneven structure having a plurality of ring structures in which the inner wall expands outwards. The functions of the individual agitating blades and the flow of the liquid to be mixed are described in detail.

The liquid to be mixed is fed into the continuous reaction apparatus from inlet 20 formed in the bottom of the continuous reaction apparatus near the agitation shaft. The fed liquid to be mixed is mixed and agitated by mixing blade 12-1. The liquid to be mixed moves along the end of mixing blade 12-1 and is fed to the space between mixing blade 12-1 and passage blade 14-1. The fed liquid to be mixed is inhibited from flowing by the end of passage blade 14-1, and hence cannot flow along the end of passage blade 14-1 into the other side of passage blade 14-1. Therefore, almost all the liquid to be mixed passes through passage hole 16 near the connecting portion of passage blade 14-1 to agitation shaft 10, and is transferred to the next space between mixing blade 12-2 and passage blade 14-1. The liquid to be mixed repeatedly moves along the end of the mixing blade and passes through the passage hole formed in the passage blade. The liquid to be mixed is mixed while maintaining a certain path of flow. Finally, the liquid to be mixed is withdrawn through withdrawal outlet 22 formed in the upper portion of the continuous reaction apparatus.

The liquid to be mixed can be withdrawn through withdrawal outlet 6 formed in the outer wall of the reaction vessel while flowing the liquid to be mixed through the inside of the reaction vessel.

The temperature of the liquid to be mixed flowing through the inside of the reaction vessel can be controlled by flowing water through a plurality of jackets disposed on the outer wall of the reaction vessel.

The maximum outer diameter of the composite agitating blade is smaller than the minimum inner diameter of the reaction vessel, and hence the composite agitating blade can be removed without dismounting the continuous reaction apparatus. Therefore, maintenance of the apparatus, such as cleaning, is easy. Further, operations, such as dealing with the occurrence of clogging, and switching the grade of the liquid to be mixed, are easy.

In the continuous reaction apparatus of the present invention, the path of flow of the liquid to be mixed can be stably secured.

In the continuous reaction apparatus of the present invention, the liquid to be mixed can be continuously and uniformly mixed.

The continuous reaction apparatus of the present invention is advantageous in that operations of the maintenance of the apparatus are easy.

<Continuous Flocculation Granulation System 1000>

Continuous flocculation granulation system 1000 comprising the continuous reaction apparatus of the present invention is described in detail below.

As shown in FIG. 37, continuous flocculation granulation system 1000 comprises the following three sections.

A continuous mixing/dispersing section mixes together raw material particles, such as polymer primary particles or resin particles, pigment particles, wax particles, and charge control agent particles.

A continuous flocculation section comprises continuous reaction apparatus 100 and continuous reaction apparatus 200. Continuous reaction apparatus 100 is an apparatus for causing the mixture particles obtained in the continuous mixing/dispersing section to suffer flocculation. Continuous reaction apparatus 200 is an apparatus for coating the surface of the flocculate particles with shell particles to achieve encapsulation.

A continuous fusion section comprises continuous reaction apparatus 300. Continuous reaction apparatus 300 is an apparatus for subjecting the flocculate particles obtained in the continuous flocculation section to suffer fusing by heat to control the surface of the particles.

The continuous mixing/dispersing section comprises storage tanks for the individual raw materials, a constant delivery feed system, a temperature control system for controlling the temperature of liquid, and a mixing system for mixing the raw materials.

In the continuous mixing/dispersing section, the dispersion of polymer primary particles obtained by emulsion polymerization, or the dispersion of resin particles obtained by emulsifying a resin is transferred by pump P10 from storage tank 101 through the pipe to line cooler 104. Line cooler 104 is controlled by a temperature controller. The temperature of liquid is controlled to a target temperature by line cooler 104. The particle dispersion having a controlled temperature is mixed successively with a wax dispersion, a pigment dispersion, and a charge control agent dispersion by in-line mixer P11. The mixture of these liquids mixed by in-line mixer P11 is fed to the continuous flocculation step. The wax dispersion is fed from wax dispersion storage tank 120 through pump P12 to in-line mixer P11. The pigment dispersion is fed from pigment dispersion storage tank 122 through pump P13 to in-line mixer P11. The charge control agent dispersion is fed from charge control agent dispersion storage tank 124 through pump P14 to in-line mixer P11. With respect to the order of mixing of the wax dispersion, pigment dispersion, and charge control agent dispersion, there is no particular limitation. Further, with respect to the types of these additives, there is no particular limitation.

The continuous flocculation section comprises mainly continuous reaction apparatus 100 and continuous reaction apparatus 200. Continuous reaction apparatus 100 is an apparatus for causing the mixture particles obtained in the continuous mixing/dispersing section to suffer flocculation to obtain flocculate particles constituting a core. Continuous reaction apparatus 200 is an apparatus for coating the surface of the flocculate particles constituting a core with shell particles to achieve encapsulation.

Continuous reaction apparatus 100 comprises 7 mixing vessel units, a composite agitating blade, temperature controllers T11, T12, an addition system, a measuring system for the particle diameter of flocculate particles, and a measuring system for the temperature in the apparatus. The composite agitating blade comprises 7 mixing blades and 6 passage blades. These two types of blades are alternately located. Temperature controllers T11, T12 control the temperature of each mixing vessel unit. The addition system is a system for adding a flocculant and a flocculation inhibitor so as to control flocculation of the particles. The intervals of the blades are controlled so that the positions of the passage blades disposed are individually near the boundary portions between the mixing vessel units. The intervals of the blades are controlled so that the positions of the mixing blades disposed are individually the middle portions of the mixing vessel units.

The mixture fed from the mixing/dispersing section is fed through inlet 106 at the lower portion of continuous reaction apparatus 100 to first mixing vessel unit Y11 of continuous reaction apparatus 100. Simultaneously with this, a flocculant is fed from flocculant storage tank 130 through pump P15 to first mixing vessel unit Y11. The flocculant is fed from the lower portion of continuous reaction apparatus 100 to first mixing vessel unit Y11. The mixture and flocculant are warmed by the jacket of first mixing vessel unit Y11 while being mixed by the mixing blade (disc turbine blade) disposed in the first mixing vessel unit Y11. The temperature of the jacket of first mixing vessel unit Y11 is controlled by temperature controller T11. The mixture is fed to second mixing vessel unit Y12 through the passage hole formed in the center portion of the passage blade disposed at the middle portion between first mixing vessel unit Y11 and second mixing vessel unit Y12. The mixture flows from second mixing vessel unit Y12 to seventh mixing vessel unit Y17 of continuous reaction apparatus 100 through the path of flow similar to that in first mixing vessel unit Y11. While the mixture is flowing, the temperature of the mixture flowing from first mixing vessel unit Y11 to fourth mixing vessel unit Y14 is controlled by temperature controller T11. The temperature of the mixture flowing from fifth mixing vessel unit Y15 to seventh mixing vessel unit Y17 is controlled by temperature controller T12. During the flowing of the mixture, a flocculate mixture sample is taken from sampling port S11 formed in the outer wall of fourth mixing vessel unit Y14. A flocculate particle diameter of the taken sample is measured by a particle diameter measurement apparatus (Multisizer III). Based on the results of the measurement, the temperature of the mixture is controlled by temperature controllers T11 and T12, and further the flocculate particle diameter is controlled. For example, when the particle diameter of the particles taken from sampling port S11 is smaller than the target, the temperatures set at temperature controllers T11, T12 are increased to promote the growth of the particles. Conversely, when the measured flocculate particle diameter is larger than the target, the temperatures set at temperature controllers T11, T12 can be reduced to suppress the growth of the particles.

The flocculate mixture containing core flocculate particles which have grown to have the target particle diameter can be withdrawn through withdrawal outlet 108 formed in seventh mixing vessel unit Y17. The withdrawn flocculate mixture flows through the pipe having heat insulation. A shell agent is fed by constant delivery pump P22 from shell agent storage tank 126 to the flocculate mixture flowing through the pipe. Further, the flocculate mixture is fed by feed pump P21 through inlet 206 of continuous reaction apparatus 200 to first mixing vessel unit Y21.

Like continuous reaction apparatus 100, continuous reaction apparatus 200 comprises 7 mixing vessel units, a composite agitating blade, temperature controllers T21, T22, an addition system, a measuring system for the particle diameter of flocculate particles, and a measuring system for the temperature in the apparatus. The composite agitating blade comprises 7 mixing blades and 6 passage blades. These two types of blades are alternately located. Temperature controllers T11, T12 control the temperature of each mixing vessel unit. The addition system is a system for adding a flocculant and a flocculation inhibitor so as to control flocculation of the particles. The intervals of the blades are controlled so that the positions of the passage blades disposed are individually near the boundary portions between the mixing vessel units. The intervals of the blades are controlled so that the positions of the mixing blades disposed are individually the middle portions of the mixing vessel units.

The mixture of the core flocculate particles and the shell particles fed to first mixing vessel unit Y21 of continuous reaction apparatus 200 is mixed by the mixing blade (disc turbine blade) disposed in first mixing vessel unit Y21. The mixture fed to first mixing vessel unit Y21 is warmed by the jacket of first mixing vessel unit Y21 having the temperature controlled by temperature controller T21. The mixture is fed to second mixing vessel unit Y22 through the passage hole formed in the center portion of the passage blade disposed at the middle portion between first mixing vessel unit Y21 and second mixing vessel unit Y22. The mixture flows from second mixing vessel unit Y22 to seventh mixing vessel unit Y27 of continuous reaction apparatus 200 through the path of flow similar to that in first mixing vessel unit Y21. While the mixture is flowing, the temperature of the mixture flowing from first mixing vessel unit Y21 to fourth mixing vessel unit Y24 is controlled by temperature controller T21. The temperature of the mixture flowing from fifth mixing vessel unit Y25 to seventh mixing vessel unit Y27 is controlled by temperature controller T22. During the flowing of the mixture, a flocculate mixture sample is taken from sampling port S21 formed in the outer wall of fourth mixing vessel unit Y24. A flocculate particle diameter of the taken sample is measured by a particle diameter measurement apparatus (Multisizer III). Based on the results of the measurement, the temperature of the mixture is controlled by temperature controllers T21 and T22, and further the flocculate particle diameter is controlled. For example, when the particle diameter of the particles taken from sampling port S21 is smaller than the target, the temperatures set at temperature controllers T21, T22 are increased to promote the growth of the particles. Conversely, when the measured flocculate particle diameter is larger than the target, the temperatures set at temperature controllers T21, T22 can be reduced to suppress the growth of the particles.

The flocculate mixture containing core flocculate particles which have grown to have the target particle diameter can be withdrawn through withdrawal outlet 208 formed in seventh mixing vessel unit Y27 of continuous reaction apparatus 200. The withdrawn flocculate mixture flows through the pipe having heat insulation. A flocculation inhibitor is fed by constant delivery pump P32 from storage tank 128 to the flocculate mixture flowing through the pipe. The flocculation inhibitor contains a surfactant or electrolyte solution. Further, the flocculate mixture is fed by feed pump P31 through inlet 306 of continuous reaction apparatus 300 to first mixing vessel unit Y31.

Like continuous reaction apparatuses 100, 200, continuous reaction apparatus 300 comprises 7 mixing vessel units, a composite agitating blade, temperature controllers T31, T32, a measuring system for the flocculate particles, and a measuring system for the temperature in the apparatus. The composite agitating blade comprises 7 mixing blades and 6 passage blades. These two types of blades are alternately located. Temperature controllers T31, T32 control the temperature of each mixing vessel unit. The intervals of the blades are controlled so that the positions of the passage blades disposed are individually near the boundary portions between the mixing vessel units. The intervals of the blades are controlled so that the positions of the mixing blades disposed are individually the middle portions of the mixing vessel units.

The mixture of the core flocculate particles and the shell particles fed to first mixing vessel unit Y31 of continuous reaction apparatus 300 is mixed by the mixing blade (disc turbine blade) disposed in first mixing vessel unit Y31. The mixture fed to first mixing vessel unit Y31 is warmed by the jacket of first mixing vessel unit Y31 having the temperature controlled by temperature controller T31. The mixture is fed to second mixing vessel unit Y32 through the passage hole formed in the center portion of the passage blade disposed at the middle portion between first mixing vessel unit Y31 and second mixing vessel unit Y32. The mixture flows from second mixing vessel unit Y32 to seventh mixing vessel unit Y37 of continuous reaction apparatus 300 through the path of flow similar to that in first mixing vessel unit Y31. While the mixture is flowing, the temperature of the mixture flowing from first mixing vessel unit Y31 to fifth mixing vessel unit Y35 is controlled by temperature controller T31. The temperature of the mixture flowing from sixth mixing vessel unit Y36 to seventh mixing vessel unit Y37 is controlled by temperature controller T32. During the flowing of the mixture, a flocculate mixture sample is taken from sampling port S31 formed in the outer wall of fifth mixing vessel unit Y35. A roundness of particles of the taken sample is measured by a particle shape measurement apparatus (FPIA3000). Based on the results of the measurement, the roundness of the particles is controlled by appropriately changing the temperatures set at temperature controllers T31 and T32. For example, when the measured roundness of the particles has reached the target, the temperature set at temperature controller T32 is reduced to set the temperature controller in a cooling mode. When the measured roundness of the particles is higher than the target, the temperature set at temperature controller T32 is reduced to set the temperature controller in a quick cooling mode, simultaneously with reducing the temperature set at temperature controller T31 to control the rate of the formation of sphere. When the measured roundness of the particles is lower than the target, the roundness is controlled by maintaining temperature controller T32 in a heating mode so as to extend the fusion step.

The flocculate mixture withdrawn from liquid withdrawal port 308 of seventh mixing vessel unit Y37 of continuous reaction apparatus 300 is further cooled by line-form cooler 38 and fed by feed pump P33 to the cleaning step.

Cleaning of the toner can be performed using, for example, a belt filter, a filter press, a centrifugal hydroextractor, or an apparatus for filtration under reduced pressure.

The toner particle dispersion cleaned in the cleaning step is as such subjected to filtration and drying. Thus, toner particles are obtained.

The continuous reaction apparatus may be of a single system having a plurality of functions, or may be of a system in which a plurality of systems having different functions are connected in series, and is not particularly limited. The continuous reaction apparatus may comprise mixing vessel units with the required number and agitating blades according to the mixing vessel units.

By using the continuous mixing system proposed by the present invention, all of the toner granulation step can be continuously performed.

According to the target particle diameter of the toner, required number of mixing vessel units and the agitating blades according to the mixing vessel units can be assembled. Thus, the optimum system can be easily constructed.

After the continuous reaction apparatus is once constructed, the agitating blade can be removed without dismounting the mixing vessel units. Therefore, cleaning and maintenance of the apparatus are easy.

The apparatus of the present invention can be applied to various continuous reaction processes. The apparatus of the present invention can be particularly preferably applied to a method for producing a toner by a wet process. Further, the apparatus of the present invention can be preferably applied to continuously performing the toner production process by an emulsion flocculation method.

EXAMPLES

Hereinbelow, the present invention will be described in more detail with reference to the following Examples, which should not be construed as limiting the scope of the present invention. In the following Examples, the term "part(s)" means "part(s) by mass". The actual tests were conducted by the methods described below.

A particle diameter, a roundness, an electrical conductivity, and thermal properties were measured as described below.

<Median Diameter (D50)>

A volume-based median diameter (D50) of the particles of less than 1 micron was measured under the conditions shown below in accordance with the procedure described in the instruction book.

Measurement apparatus: Model MicrotracNanotrac 150, manufactured by Nikkiso Co., Ltd. (hereinafter, referred to simply as "Nanotrac"), and analysis software MicrotracParticle Analyzer Ver 10.1.2-019EE, manufactured by Nikkiso Co., Ltd.

Solvent: Ion-exchanged water having an electrical conductivity of 0.5 µS/cm

Refractive index of the solvent: 1.333

Measuring time: 600 seconds

Refractive index of the particles: 1.59

Transmission property: Transmission

Shape of the particles: True sphere

Density of the particles: 1.04

<Median Diameter (Dv50)>

A volume-based median diameter (Dv50) of the particles of 1 micron or more was measured under the conditions shown below.

Measurement apparatus: Multisizer III, manufactured by Beckman Coulter, Inc. (aperture diameter: 100 µm; hereinafter, referred to simply as "Multisizer")

Dispersing medium: ISOTON II, manufactured by Beckman Coulter, Inc.

Dispersoid concentration: 0.03%

<Average Roundness>

An average roundness was measured using a flow-type particle analyzer (FPIA3000, manufactured by Sysmex Corporation) by dispersing a dispersoid in a dispersing medium (Serushisu, manufactured by Sysmex Corporation) so that the concentration became 5,720 to 7,140 counts/µl, and making a measurement in an HPF mode under conditions such that the amount per HPF analysis was 0.35 µl and the amount per HPF detection was 2,000 to 2,500 counts.

<Weight Average Molecular Weight (Mw)>

With respect to the THF-soluble component of the polymer primary particle dispersion, a measurement by gel permeation chromatography (GPC) was performed under the following conditions.

Apparatus: GPC apparatus HLC-8020, manufactured by Tosoh Corp.

Column: PL-gel Mixed-B 10µ, manufactured by Polymer Laboratories Ltd.

Solvent: THF

Concentration of a sample: 0.1% by weight

Calibration curve: Standard polystyrene

Example 1

<Preparation of Wax Dispersion A1>
<Preparation of Wax/Long-Chain Polymerizable Monomer Dispersion A1>

100 Parts of a paraffin wax (HNP-9, manufactured by Nippon Seiro Co., Ltd.; melting point: 82° C.), 10.4 parts of stearyl acrylate, 7.0 parts of a 20% aqueous solution of sodium dodecylbenzenesulfonate (NEOGEN S20D, manufactured by Dai-ichi Kogyo Seiyaku Co., Ltd.; hereinafter, referred to simply as "20% aqueous DBS solution"), and 253.0 parts of desalted water were heated to 90° C., and stirred using a homomixer (MARK IIf Model, manufactured by Tokushu Kika Kogyo Co., Ltd.) for 10 minutes. Then, while heating at 90° C., circulation emulsification was started under pressure conditions at 20 MPa using a high-pressure emulsifier. A particle diameter was measured by Nanotrac, and dispersion was continued until the median diameter (D50) became 500 nm or less to prepare emulsion A2. The median diameter (D50) was found to be 250 nm.

<Preparation of Polymer Primary Particle Dispersion B1>

A reactor equipped with a stirring apparatus (having three blades), a heating and cooling apparatus, a condenser, and an apparatus for charging the raw materials and auxiliaries was provided. 36.1 Parts of wax dispersion A1 and 259 parts of desalted water were charged into the reactor, and the resultant mixture was heated to 90° C. in a nitrogen gas flow while stirring.

Then, while stirring, a mixture of the below-shown monomers and aqueous emulsifying agent solution was added to the reactor over 300 minutes. A point in time when the dropwise addition of the mixture of monomers and aqueous emulsifying agent solution was started is the polymerization start time. After 30 minutes from the initiation of polymerization, the below-shown aqueous initiator solution 1 was added to the reactor over 270 minutes. Aqueous initiator solution 2 was further added over 60 minutes. Then, while stirring, the inside of the reactor was maintained at a temperature of 90° C. for one hour.

| [Monomers] | |
|---|---|
| Styrene | 67.8 Parts |
| Butyl acrylate | 32.2 Parts |
| Acrylic acid | 1.5 Parts |
| Trichlorobromomethane | 1.0 Part |
| Hexanediol diacrylate | 0.7 Part |
| [Aqueous emulsifying agent solution] | |
| 20% Aqueous DBS solution | 1.0 Part |
| Desalted water | 67.1 Parts |
| [Aqueous initiator solution 1] | |
| 8% Aqueous solution of hydrogen peroxide | 15.5 Parts |
| 8% Aqueous solution of L-(+)ascorbic acid | 15.5 Parts |
| [Aqueous initiator solution 2] | |
| 8% Aqueous solution of L-(+)ascorbic acid | 14.2 Parts |

After completion of the polymerization reaction, the reaction mixture was cooled to obtain milky-white polymer primary particle dispersion B1. With respect to dispersion B1, a particle diameter was measured using Nanotrac. The median diameter (D50) was found to be 300 nm. The weight average molecular weight (Mw) was found to be 157,000.

<Production of Toner Matrix Particles C1>

Figure 38:
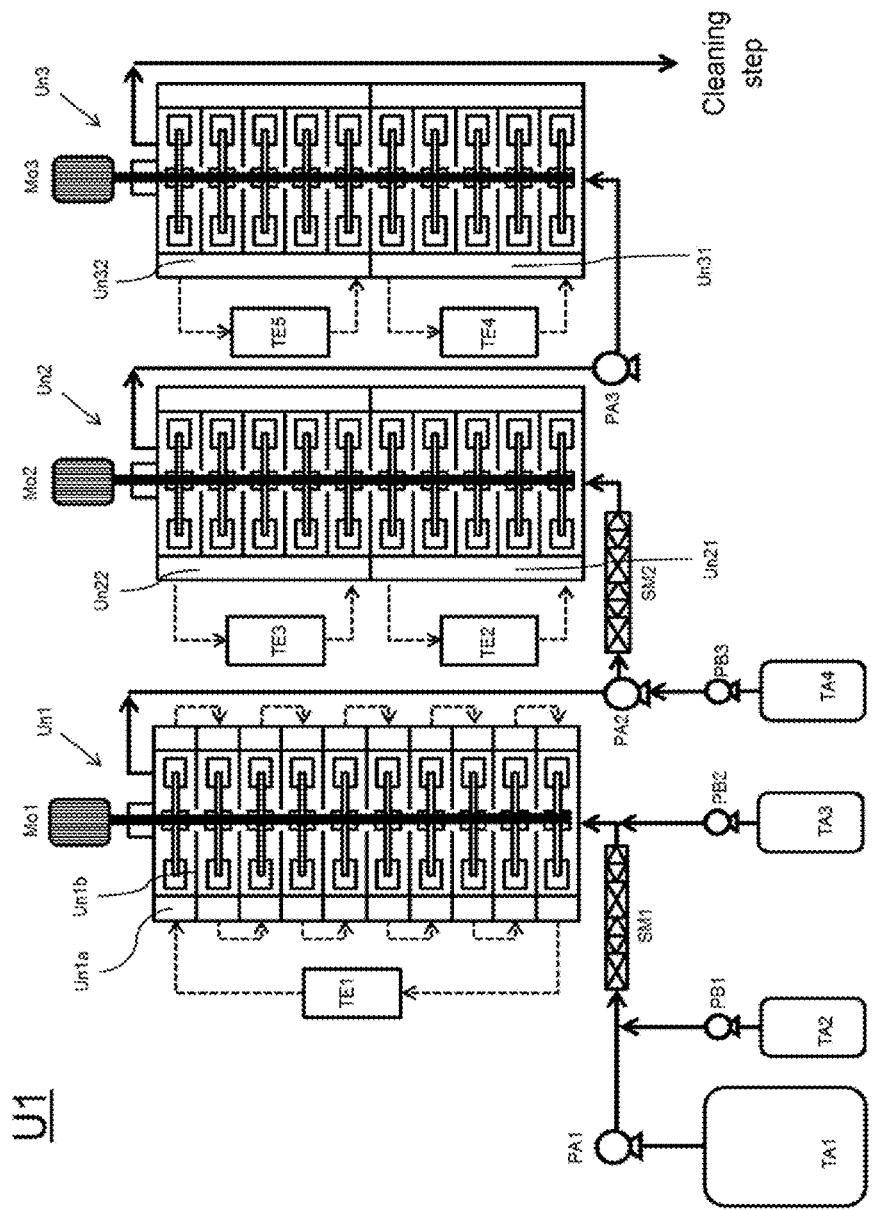
FIG. 38 A diagrammatic view of the continuous flocculation process.

Using continuous flocculation apparatus U1 shown in FIG. 38, flocculation of latex particles was performed.

Continuous flocculation apparatus U1 comprises three continuous flocculation mixing vessel units Un1 to Un3 having the same structure, a temperature controller, a feed pipe, a feed pump, and an additive mixing apparatus.

Continuous flocculation mixing vessel units (Un1 to Un3) individually comprise a plurality of mixing vessel units and partition units. The mixing vessel units and partition units are alternately stacked on one another. A disc turbine blade is disposed in each mixing vessel unit. The disc turbine blades are fixed to the same agitation rod. The agitation rods are rotated by external motors (Mo1 to Mo3).

The side of the mixing vessel unit used in the present Example is provided with a jacket capable of flowing circulating water through the inside of the jacket. The temperature of the circulating water flowing through the inside of the jacket can be controlled by a warm water controller attached to the jacket. Thus, the temperature of the dispersion finally flowing the inside of the mixing vessel unit can be controlled.

The present Example is described in detail below.

Polymer primary particle dispersion B1 is fed by constant delivery pump PA1 (feed rate: 25 g/minute) from storage tank TA1 to static mixer SM1. A cyan pigment dispersion (EP700, manufactured by Dainichiseika Color & Chemicals Mfg. Co., Ltd.) is fed by constant delivery pump PB1 (feed rate: 1 g/minute) from storage tank TA2 to a portion between storage tank TA1 and static mixer SM1. Polymer primary particle dispersion B1 and the cyan pigment dispersion are uniformly mixed by static mixer SM1. The resultant mixture is further mixed with a 0.5% aluminum sulfate solution fed by constant delivery pump PB2 (feed rate: 4 g/minute) from storage tank TA3. The mixture is fed into the apparatus from the lower portion of continuous flocculation mixing vessel unit Un1.

Continuous flocculation mixing vessel unit Un1 comprises 10 mixing vessel units and 9 partition units. The mixing vessel units and partition units are alternately stacked on one another. Continuous flocculation mixing vessel unit Un1 is of a 10-stage structure. Continuous flocculation mixing vessel unit Un1 has a total volume of 500 ml. The number of revolutions of agitation motor Mo1 of continuous flocculation mixing vessel unit Un1 was set at 400 rpm. Warm water at 55° C. is fed from thermostatic chamber TE1 to the jacket disposed on the side of the mixing vessel unit. The warm water flows successively the mixing vessel units from the mixing vessel unit of the upper stage to the mixing vessel unit of the lower stage. Thus, the particle dispersion flowing the inside of the mixing vessel units can be heated.

The heated particle dispersion is withdrawn by feed pump PA2 through a withdrawal outlet in the upper portion of continuous flocculation mixing vessel unit Un1. A 20% DBS solution is fed by constant delivery pump PB3 (feed rate: 1 g/minute) from storage tank TA4. The particle dispersion withdrawn from continuous flocculation mixing vessel unit Un1 and the 20% DBS solution are uniformly mixed by static mixer SM2. The resultant mixture is fed into the apparatus from the lower portion of continuous flocculation mixing vessel unit Un2.

Continuous flocculation mixing vessel unit Un2 has two subunits (Un21, Un22) having the same structure. The two subunits (Un21, Un22) are directly connected to each other. The subunits have the same structure. Each subunit comprises 5 mixing vessel units and 4 partition units. The mixing vessel units and partition units are alternately stacked on one another. Continuous flocculation mixing vessel unit Un2 is of a 5-stage structure. Continuous flocculation mixing vessel unit Un2 has a total volume of 150 ml. The number of revolutions of agitation motor Mo2 of continuous flocculation mixing vessel unit Un2 was set at 250 rpm. Warm water at 95° C. is fed from thermostatic chambers TE2, TE3 to the jackets disposed on the sides of the individual subunits (Un21, Un22). By feeding warm water from the lower portion of the jacket to the inside of the jacket, the particle dispersion flowing the inside of the subunit is heated.

The particle dispersion is heated while flowing successively through subunits Un21, Un22. The heated particle dispersion is withdrawn by feed pump PA3 through a withdrawal outlet in the upper portion of continuous flocculation mixing vessel unit Un2.

Figure 39:
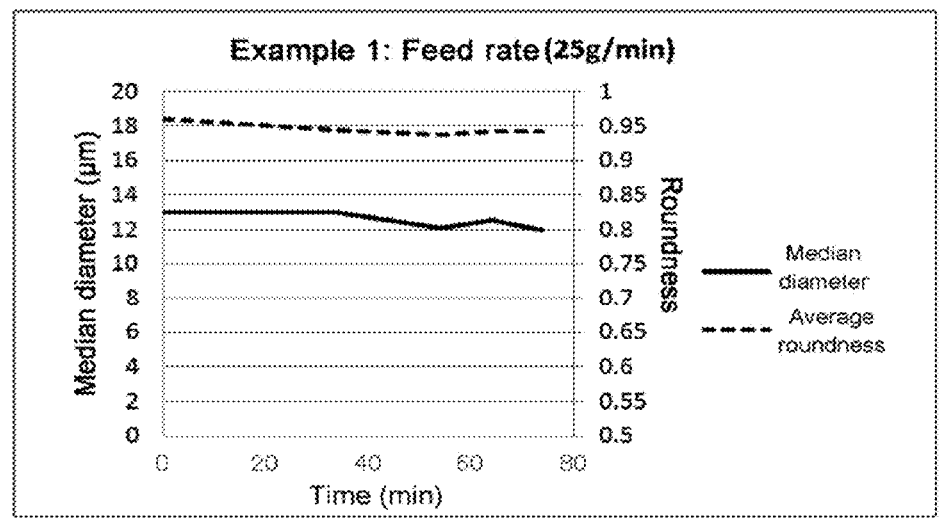
FIG. 39 Graph showing the results of Example 1.

The particle dispersion withdrawn by feed pump PA3 is fed from the lower portion of continuous flocculation mixing vessel unit Un3 into the unit. Continuous flocculation mixing vessel unit Un3 has the same structure as that of continuous flocculation mixing vessel unit Un2. A disc turbine blade is disposed inside continuous flocculation mixing vessel unit Un3. The number of revolutions of the disc turbine blade was 250 rpm. The temperature set at thermostatic chamber TE4 of subunit Un31 of continuous flocculation mixing vessel unit Un3 was 95° C. The temperature set at thermostatic chamber TE5 of subunit Un32 was 10° C. The particle dispersion heated by subunit Un31 was quickly cooled by subunit Un32, and then discharged from continuous flocculation mixing vessel unit Un3 through the discharge outlet in the upper portion of subunit Un32. The discharged particle dispersion was continuously recovered as a dispersion of toner matrix particles C1. Using Multisizer III, a volume-based median diameter (Dv50) of the particles contained in the recovered dispersion was measured. Using a flow-type particle analyzer, an average roundness of the particles contained in the recovered dispersion was measured. The results of the measurement are shown in FIG. 39 and Table 1 below.

Example 2

Using the same apparatus and the same procedure as those in Example 1, a dispersion of toner matrix particles C2 was continuously recovered. In Example 2, however, the feed rate was doubled, and the numbers of revolutions in continuous flocculation apparatuses U1 to 3 were respectively set at 500 rpm, 400 rpm, and 400 rpm.

Using Multisizer III, a volume-based median diameter (Dv50) of the particles contained in the recovered dispersion was measured. Using a flow-type particle analyzer, an average roundness of the particles contained in the recovered dispersion was measured. The results of the measurement are shown in FIG. 40 and Table 1 below.

TABLE 1

|  | Example 1 | Example 2 |
|---|---|---|
| Method for producing toner matrix particles | Continuous | Continuous |
| Feed rate of dispersion | 25 g/min | 50 g/min |
| Process tune (min) | 45 | 23 |
| Number of revolutions (upon flocculation) | 400 rpm | 500 rpm |
| Number of revolutions (upon aging or cooling) | 250 rpm | 400 rpm |
| Average of median diameter values (Dv50) | 12.5 μm | 10.6 μm |
| Average of average roundness values | 0.95 | 0.94 |

Figure 40:
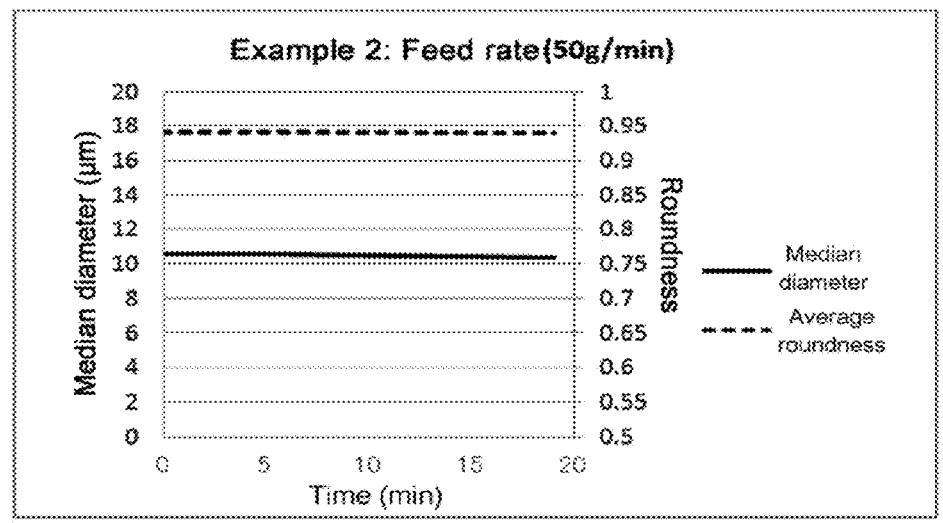
FIG. 40 Graph showing the results of Example 2.

In FIGS. 39 and 40, the time means a length of time (calculated value) obtained by subtracting the time during which the polymer primary particle dispersion passes through the process from the time of feeding the polymer primary particle dispersion.

As can be seen from the results shown in FIGS. 39 and 40 and Table 1, by the continuous flocculation process in the present invention, toner matrix particles can be stably produced with high efficiency. Further, the particle diameter and shape of the toner matrix particles can be controlled by changing the operation conditions.

DESCRIPTION OF REFERENCE NUMERALS 10-(1 to 4): Mixing vessel unit
20: Partition unit having a temperature controller
22: Partition unit having a reagent feed inlet
24: Reagent feed pipe
26-(1 to 2): Circulating water connecting inlet 30: Filtration partition unit having a filter
32: Cleaning water inlet
34: Filtrate withdrawal port
50: Agitation shaft
52-(1 to 4): Circular disc-type agitating blade
54-(1 to 3): Feed-assisting agitating blade
A (**): Mixing vessel unit
B (**): Partition unit
T (**): Temperature control system
P (**): Feed pump
100: Continuous flocculation reaction device 100
200: Continuous fusion reaction device 200
101: Particle dispersion storage tank
12; 12-1; 12-2; 12-3: Mixing blade
14; 14-1; 14-2: Passage blade
16: Passage hole
10: Agitation shaft
100: Continuous reaction apparatus
200: Continuous reaction apparatus
300: Continuous reaction apparatus
1000: Continuous flocculation granulation system

The invention claimed is:

1. A continuous reaction apparatus comprising a cylindrical reaction vessel which reacts a reaction mixture while mixing the reaction mixture,
the reaction vessel having formed in one end thereof an inlet configured for continuously feeding the reaction mixture,
the reaction vessel having formed in another end thereof a withdrawal outlet configured for continuously withdrawing the reaction mixture,
the reaction vessel having an agitating blade disposed inside thereof,
the agitating blade comprising an agitation shaft and a plurality of circular disc-type agitating blades, wherein the circular disc-type agitating blades are fitted to the agitation shaft in a state that the circular disc-type agitating blades are stacked on one another,
wherein each circular disc-type agitating blade comprises two types of blades which are a passage blade and a mixing blade,
wherein the passage blade is a blade having a passage hole near a connecting portion to the agitation shaft,
wherein the mixing blade is a blade having no passage hole near the connecting portion to the agitation shaft,
wherein the passage blade and the mixing blade are alternately fitted to the agitation shaft.

2. The continuous reaction apparatus according to claim 1, wherein, when an outer diameter of the agitation shaft is taken as d1 and an outer diameter of the circular disc of the passage blade is taken as d31, the one or more passage holes are present inside a region of a circle having a radius of (d1+d31)/4 from a center of the passage blade.

3. The continuous reaction apparatus according to claim 1, wherein the passage blade has a circular disc,
the circular disc having a flow control-assisting fin in a plate form disposed at an outer periphery portion of the circular disc,
wherein the flow control-assisting fin is located inside the outer periphery portion of the circular disc,
wherein, when an outer diameter of the agitation shaft is taken as d1 and an outer diameter of the circular disc is taken as d31, the flow control-assisting fin is located outside a region of a circle having a radius of (d1+d31)/4 from a center of the circular disc,
wherein four or more of the flow control-assisting fins are disposed on the circular disc and intervals between the flow control-assisting fins are equal,
wherein an angle α31 of the flow control-assisting fin to the circular disc is 45 to 90°.

4. The continuous reaction apparatus according to claim 1, wherein the passage blade has a circular disc,
the circular disc having a flow control-assisting fin in a plate form disposed at the outer periphery portion of the circular disc,
wherein an angle α32 of the flow control-assisting fin to a segment of a line connecting a center of the agitation shaft and the center of the flow control-assisting fin is 0 to 90°.

5. The continuous reaction apparatus according to claim 1, wherein the mixing blade is a disc turbine, a blade turbine, or a disperser.

6. The continuous reaction apparatus according to claim 1, wherein the reaction vessel is in a shape of a straight cylinder having the same inner diameter from the upper end to the lower end, or in a shape of a cylinder having a plurality of ring structures in which the inner wall surface expands outwards,
wherein, when a minimum inner diameter of the reaction vessel is taken as D1 and a maximum inner diameter of the reaction vessel is taken as D2, a relationship of the following formula (1) is satisfied:

$$D2 \geq D1 \geq 0.8D2 \quad (1).$$

7. The continuous reaction apparatus according to claim 1, wherein, when a minimum inner diameter of the reaction vessel is taken as D1, a maximum inner diameter of the reaction vessel is taken as D2, an outer diameter of the passage blade is taken as d31, and an outer diameter of the mixing blade is taken as d21, a relationship of the following formulae (2), (3), and (4) is satisfied:

$$0.99D1 \geq d31 \geq 0.8D1 \quad (2)$$

$$0.99D2 \geq d21 \geq 0.7D2 \quad (3)$$

$$d31 \geq d21 \quad (4).$$

8. The continuous reaction apparatus according to claim 1, wherein the reaction vessel is in a shape of a cylinder having a plurality of ring structures in which the inner wall surface expands outwards,
wherein the passage blade is located in a position at the same height as the height of the portion of the reaction vessel having a minimum inner diameter.

9. The continuous reaction apparatus according to claim 1, wherein the reaction vessel has a plurality of mixing vessel units having a jacket structure, wherein the mixing vessel units are arranged in series.

10. The continuous reaction apparatus according to claim 1, wherein the reaction vessel comprises a plurality of inlets configured for feeding a liquid, and the inlets are formed in a side wall of the reaction vessel.

11. A continuous granulation system comprising a plurality of the continuous reaction apparatuses according to claim 1, wherein the continuous reaction apparatuses are connected in series.

12. A method for producing a toner, comprising continuously producing toner particles by a wet process performed with the continuous reaction apparatus according to claim 1.

13. An apparatus for producing a toner, comprising the continuous reaction apparatus according to claim 1.

14. An apparatus comprising:
- a continuous mixing/dispersing section configured for continuously mixing raw material liquids;
- a continuous flocculation section configured for continuously causing the resultant mixture to suffer flocculation to form flocculate particles;
- a continuous fusion section configured for fusing the surface of the flocculate particles by heat to control the shape of particles, forming toner particles;
- a cleaning section configured for cleaning the dispersion of toner matrix particles;
- a drying section configured for drying the toner matrix particles;
- an external addition section configured for adding an external additive to the toner matrix particles to produce toner particles; and
- the continuous reaction apparatus according to claim 1.

15. A method for producing a toner for electrostatic image development, the method comprising:
- flocculating polymer primary particles or resin particles; and
- heating the flocculate obtained in the flocculating,
- wherein at least one of the flocculating and the heating is performed with a continuous reaction apparatus,
- the continuous reaction apparatus comprising a cylindrical reaction vessel which reacts a reaction mixture while mixing the reaction mixture, the reaction vessel having formed in one end thereof an inlet configured for continuously feeding the reaction mixture, the reaction vessel having formed in another end thereof a withdrawal outlet configured for continuously withdrawing the reaction mixture,
- the reaction vessel having an agitating blade disposed inside thereof,
- the agitating blade comprising an agitation shaft and a plurality of disc type agitating blades, wherein the disc type agitating blades are fitted to the agitation shaft in a state that the disc type agitating blades are stacked on one another,
- wherein each disc type agitating blade comprises two types of blades which are a passage blade and a mixing blade,
- wherein the passage blade is a blade having a passage hole near a connecting portion to the agitation shaft,
- wherein the mixing blade is a blade having no passage hole near the connecting portion to the agitation shaft,
- wherein the passage blade and the mixing blade are alternately fitted to the agitation shaft.

16. The method according to claim 15, wherein the reaction vessel is in a shape of a straight cylinder having the same inner diameter from the upper end to the lower end, or in a shape of cylinder having a plurality of ring structures in which the inner wall surface expands outwards,
- wherein, when a minimum inner diameter of the reaction vessel is taken as $D1$ and a maximum inner diameter of the reaction vessel is taken as $D2$, a relationship of the following formula (1) is satisfied:

$$D2 \geq D1 \geq 0.8D2 \tag{1}$$

17. The method according to claim 15, wherein, when a minimum inner diameter of the reaction vessel is taken as $D1$, a maximum inner diameter of the reaction vessel is taken as $D2$, an outer diameter of the passage blade is taken as $d31$, and an outer diameter of the mixing blade is taken as $d21$, a relationship of the following formulae (2), (3), and (4) is satisfied:

$$0.99D1 \geq d31 \geq 0.8D1 \tag{2}$$

$$0.99 \geq D2 d21 \geq 0.7D2 \tag{3}$$

$$d31 \geq d21 \tag{4}$$

* * * * *